US012424937B2

United States Patent
Schmitz et al.

(10) Patent No.: US 12,424,937 B2
(45) Date of Patent: Sep. 23, 2025

(54) SYSTEM, METHOD, AND APPARATUS FOR BI-DIRECTIONAL DC SHORT-CIRCUIT PROTECTION

(71) Applicant: Eaton Intelligent Power Limited, Dublin (IE)

(72) Inventors: Gerd Schmitz, Niederkassel (DE); Wolfgang Meid, Mülheim-Kärlich (DE); Marcel Uedelhoven, Blankenheim (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 226 days.

(21) Appl. No.: 18/277,142

(22) PCT Filed: Feb. 14, 2022

(86) PCT No.: PCT/EP2022/053521
§ 371 (c)(1),
(2) Date: Aug. 14, 2023

(87) PCT Pub. No.: WO2022/171865
PCT Pub. Date: Aug. 18, 2022

(65) Prior Publication Data
US 2024/0128865 A1     Apr. 18, 2024

Related U.S. Application Data

(60) Provisional application No. 63/200,074, filed on Feb. 12, 2021.

(51) Int. Cl.
*H02M 3/155* (2006.01)
*H02M 1/00* (2006.01)
(Continued)

(52) U.S. Cl.
CPC ......... *H02M 3/155* (2013.01); *H02M 1/0009* (2021.05); *H02H 1/0007* (2013.01); *H02H 3/006* (2013.01); *H02H 3/087* (2013.01)

(58) Field of Classification Search
CPC .. H02M 3/155; H02M 1/0009; H02H 1/0007; H02H 3/006; H02H 3/087
(Continued)

(56) References Cited

U.S. PATENT DOCUMENTS 11,289,901 B2 *   3/2022   Birkmayer ............... H02H 9/02
11,348,752 B2 *   5/2022   Telefus .................. H01H 9/563
(Continued)

FOREIGN PATENT DOCUMENTS

| CN | 101301858 A | 11/2008 |
|---|---|---|
| EP | 0642213 A1 | 3/1995 |
| FR | 3048138 A1 | 8/2017 |

OTHER PUBLICATIONS

International Search Report and Written Opinion issued in International Application No. PCT/EP2022/053521, mailed Jun. 1, 2022, 12 pages.

*Primary Examiner* — Yemane Mehari
(74) *Attorney, Agent, or Firm* — Talem IP Law, LLP

(57) ABSTRACT

A self-triggering, bidirectional control electronics component for an electronic switch (50), for the detection and rapid shutdown of currents at a selected threshold value for both current flow directions, includes a threshold switch having a plurality of selectable shutdown threshold values for both current flow directions, the threshold switch coupled to a bidirectional current sensor system (65), arranged in the electronic switch, based on sensing of sensors on an input side of the threshold switch; and a high-speed de-energizing circuit (53) on an output side of the threshold switch including a high non-load circuit voltage for rapid removal of current from a magnetic drive coil (45), the high-speed (Continued)

de-energizing circuit being configured to rapidly remove the current from the magnetic drive coil when the bidirectional current sensor system senses a current greater than or equal to the selected threshold value among the plurality of selectable shutdown threshold values.

16 Claims, 44 Drawing Sheets

(51) Int. Cl.
  *H02H 1/00* (2006.01)
  *H02H 3/00* (2006.01)
  *H02H 3/087* (2006.01)
(58) Field of Classification Search
  USPC .......................................................... 323/282
  See application file for complete search history.

(56) References Cited

U.S. PATENT DOCUMENTS

| | | | |
|---|---|---|---|
| 2019/0006836 A1* | 1/2019 | Danilovic | H02H 7/1252 |
| 2019/0296541 A1* | 9/2019 | Mensch | B60L 3/04 |
| 2019/0334344 A1* | 10/2019 | Alibert | H02H 1/0007 |
| 2021/0296933 A1* | 9/2021 | Danilovic | H02H 3/38 |

* cited by examiner

SYSTEM, METHOD, AND APPARATUS FOR BI-DIRECTIONAL DC SHORT-CIRCUIT PROTECTION

CROSS-REFERENCE TO RELATED APPLICATIONS

This application is the U.S. National Stage Application of International Application No. PCT/EP2022/053521, filed Feb. 14, 2022, which claims priority to U.S. Provisional Patent Application Ser. No. 63/200,074, filed Feb. 12, 2021, entitled "SYSTEM, METHOD, AND APPARATUS FOR BI-DIRECTIONAL DC SHORT-CIRCUIT PROTECTION" (EATN-2027-P01).

Each one of the foregoing applications is incorporated by reference in its entirety for all purposes.

FIELD

Without limitation to a particular field of technology, the present disclosure is directed to DC short-circuit protection.

SUMMARY

Aspects of the present disclosure include a self-triggering, bidirectional control electronics apparatus, device, component, circuit, and the like for a direct current (DC) switch. Aspects also include methods and systems using or operating the apparatus, device, component, circuit, and the like. Aspects of the present disclosure include detection and shutdown of currents at a selected threshold value for either, each, or both current flow directions. Aspects of the present disclosure include having respective switching threshold values for each current direction. In addition, aspects of the present disclosure include applying a switch-off pulse to remove the current from the magnetic drive coil when the current is above the threshold value(s). The current removal may be fast, high-speed, rapid, and the like.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures.

DETAILED DESCRIPTION

Figure 1:
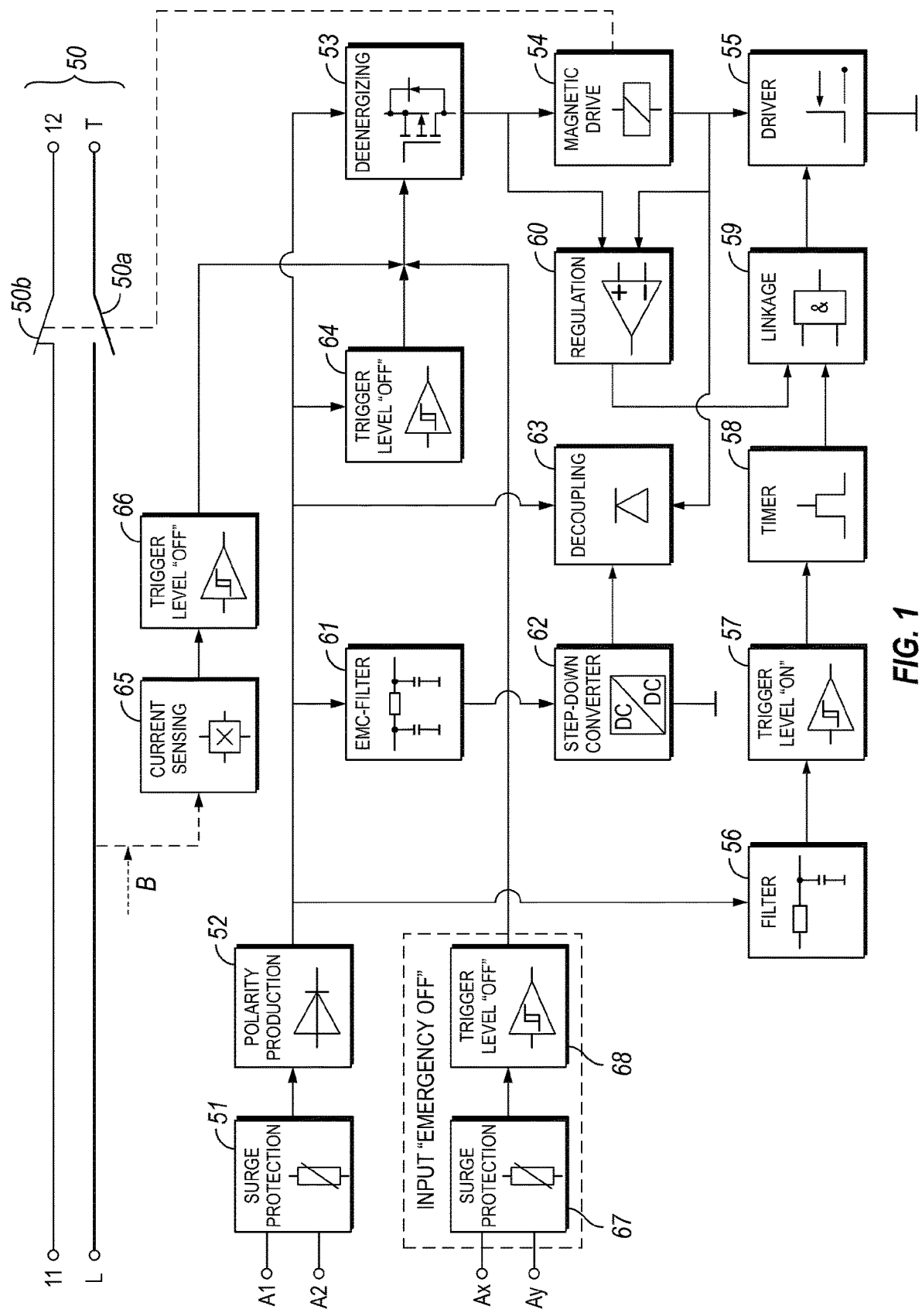
FIG. 1 depicts an example DC switching device utilizing a quick de-energization circuit to perform a quick shutdown of the magnetic drive coil.

Electrical power distribution in many applications, especially in case of high DC currents, is subject to a number of challenges. Applications having a highly variable load, high power throughput, high voltage ratings, and/or distinct protection characteristics according to an electrical power flow direction (e.g., power flow values, duty cycles, and/or sensitivity of protected components that are distinct according to the power flow direction) introduce particular challenges. Certain applications including without limitation mobile applications, power grid operations, and/or electrical power supply operations, have a high cost for high current damage to components and/or down-time of the application. High costs may be incurred due to damage to high power battery packs, external costs due to a loss of service (e.g., for a data center, medical facility, power grid, mini-grid, or the like), costs related to the type of application (e.g., a failure in a mobile application and/or remotely positioned location may increase the time before service or response is available, increasing both the cost of a repair and the time until access by service personnel that might otherwise be capable to minimize ongoing damage to the application). Certain applications have highly variable power throughput requirements depending upon the power flow direction, and further may have distinct sensitivity to the current flow depending upon the power direction. For example, a mobile application may have highly distinct power flow ratings (e.g., including the nominal voltage, power throughput, and/or current ratings) depending upon whether motive power, regenerative power, and/or quick charging power is flowing through the system. In a further example, the mobile application may have separate power electronics, certain components exposed to power in only certain operating conditions (e.g., during charging, motive operations, regeneration, etc.), and/or electrical power control components such as diodes that have distinct sensitivity to the current flow depending upon the power direction. Similarly, applications such as power grid supporting systems and/or electrical power supply operations may have distinct power flow ratings depending upon the operating condition, time of day, and where power is flowing (e.g., grid to battery; battery to grid; and/or power flow from a generating device such as a windmill, turbine, etc. flowing to the battery, grid, a load, or a combination of these).

In another example, a high-voltage battery in an electric vehicle is usually charged with a relatively constant current. In the event of a short circuit during charging, the short-circuit currents that occur are significantly lower than in the case of a full short circuit with a fully charged battery while driving. To minimize the problems fundamentally associated with the occurrence of a short circuit, for example by exceeding the Switching capacity of the switching devices in the DC circuit or due to thermal overloading of the charging cables, it would therefore be desirable for many DC applications to differentiate the threshold value for switching off a short-circuit current according to the current flow direction and/or to optimize it for the respective application.

An example energy storage and DC network includes a combination of a contactor and a relay (e.g., a breaker/relay) for routing and switching in normal operation, combined with separate fuse elements for quick shutdown in emergency situations, such as in the event of a short circuit. This applies, among other things, to so-called "high-voltage on-board networks" in the field of electromobility with nominal voltages of 400 V or higher and DC currents that can be greater than 100 A during operation. In such applications, currents of several kiloamperes can occur in the event of a short circuit, combined with the formation of DC arcs, which without a suitable protective device can lead to considerable destruction within a few milliseconds.

Referencing PCT application WO 2020/016179 (SWITCHING DEVICE AND SWITCHING ARRANGEMENT, filed 15 Jul. 2019, and which is incorporated by reference herein in the entirety for all purposes), a DC switching device suitable for high-voltage networks, such as in electric vehicles, is described. Previously known DC switching devices operate independently of the direction of current flow, for example utilizing the same thresholds for both the driving mode and in charging mode with the direction of current flow reversed. In nominal operation, DC currents of several hundred amperes can occur for rapid charging of the energy storage in larger electric vehicles. When driving, the vehicle's power electronics ensure that the currents to be switched are limited to approx. 30 amps, which enables the switching device to have a long electrical service life of over 100,000 switching operations under load. If, on the other hand, a short circuit occurs in the DC network, typically with currents in the range >1000 A, the switch, by opening the switching contacts very quickly, ensures that the switching arcs that occur, which, due to their extremely high temperatures, are always quickly removed from the contact tips by means of magnetic blowing field forces, regardless of the direction of current flow in order to prevent damage to the switching device. The switching arcs are moved away in the direction of arcing chambers and made to extinguish there, so that the short-circuit current is switched off within a few milliseconds.

The detection of the short circuit is provided by a current sensor element located in close vicinity of the fixed contacts, for example in the form of a Hall effect sensor. If a specified threshold value is exceeded, which can e.g. correspond to a multiple of the nominal current, the coil voltage of the electromagnetic switching drive is immediately deactivated by the control electronics switched off, in such a way that the switching contacts within a time of typically less than 2 open milliseconds and stay open indefinitely (e.g., opening in a manner to prevent re-contacting of the contactor elements). In the event of a short circuit, damage to electrical components can occur very quickly. In the event of a high short-circuit current, the switching contacts may initially be open due to the dynamic current forces (e.g., due to Lorentz forces), as a result of which high-energy arcs are formed immediately. In the case of a magnetic drive coil (e.g., a magnetic drive coil that controls contact of the contactor elements) that has not yet completely discharged, the contact compression spring forces may still be acting during the open operation, which can drive the contacts to reconnect as the Lorentz forces diminish. Contact compression spring forces that may still be acting during the open operation may be due to dynamic contact forces acting much faster than mechanical contact opening, which may be driven by reverse contact springs and simultaneous de-energization of the magnetic drive coil. A reconnection of the contactors shortly after the initial opening can result in severe damage and/or welding of the switching contacts heated by the arc. An example DC switching device utilizes a quick de-energization circuit to perform a quick shutdown of the magnetic drive coil (e.g., reference FIG. 1). An example de-energization circuit utilizes a switch-off pulse to initiate connection of a high freewheeling counter voltage to the magnetic coil circuit, ensuring a rapid discharge of the coil current. The example of FIG. 1 is further described in the '179 reference.

It should be understood that determining if a coil current discharge is high-speed, rapid, quick, fast, or the like depends on the context of the discharge event and system, such as how quickly the component will fail or how robust the protected component is to a high current event. In certain embodiments, high-speed, rapid, quick, fast, or the like may be speeds higher than a nominal reduction, such as faster than several milliseconds (e.g., faster than 2 ms). One of skill in the art can readily determine, having the benefit of the present disclosure, whether coil current discharge characteristics are high-speed, rapid, quick, fast, or the like for a particular system. Without limitation to any other aspect of the present disclosure, certain considerations of the person of skill in the art in determining whether the coil current discharge characteristics are high-speed, rapid, quick, fast, or the like include: capacitance of the energizing coil, the capacitance of the power circuit that the energizing coil is operating, the ability of the protected device(s) to withstand high current events, capital vs. operating cost considerations (e.g., cost of parts vs. operating cost to keep currents within margins), the dynamics of the power circuit(s) under transient condition(s) and during an opening under power event, and/or the dynamics of powered component(s).

Referencing FIG. 1, an example listing of components depicted includes:
50 DC switches
50a switch main circuit
50b auxiliary switch
51 Overvoltage Protection
52 Reverse polarity protection
53 fast de-energizing circuit
54 magnetic drive coil
55 Power-up driver
56 Inbound Filters
57 Threshold switch input voltage
58 timer
59 Switch-on link
60 Switch-on voltage control circuit
61 filter circuit
62 DC-DC step-down converter
63 Decoupling
64 Threshold switch control voltage
65 current sensor
66 Threshold switch for current sensing
67 Overvoltage protection external emergency shutdown
68 Threshold switch for external emergency shutdown In the example switch control electronics of FIG. 1, there is no differentiation according to the current flow direction for switch-off control, including for switching off a short-circuit current. Examples of the present disclosure reference DC circuits and switching for clarity of the present description. However, embodiments of the switch control electronics described herein are useful for switching direct current (DC) circuits and/or alternating current (AC) circuits.

An example DC switching device of the present disclosure includes control/release electronics which provide bidirectional short-circuit detection with switch-off threshold values of different levels for the two current flow directions, including quick de-energization of the magnetic drive. In certain embodiments, bidirectional switch-off threshold values may be based on one or more current characteristics, according to the respective direction, such as: a current value flowing; a rate of change of the current value; a time-based value for the current flow; a relative position of the current value to a threshold value; a rate of change of relative position of the current value to the threshold value; and/or combinations of these. In certain embodiments, both the threshold values and/or the current characteristics considered for switching may be varied according to the current flow direction.

Disconnection threshold values dependent on the current direction can be implemented, for example, using a parallel arrangement of two (2) comparators. The signal coming from the current sensor arranged in the immediate vicinity of the main current path, preferably in the form of a Hall sensor, which is a measure of the amount of the current flowing at the moment, simultaneously goes to one of the inputs on both comparators. In current flow mode, the Hall voltage signal is compared with a fixed reference signal for each of the two inputs of the two comparators. The level of the reference signal is dimensioned in relation to the current sensor signal in such a way that, in the nominal operating case for both current directions, the output signal of both comparators is in the state of non-activation of the downstream fast de-excitation of the magnetic drive coil for switching off the DC load. In the event that the load current reaches a threshold value, and/or another threshold as set forth herein, in one direction of current flow, for example a value corresponding to a short circuit, and/or any other condition indicating that an immediate power cut-off is to be performed, the changed Hall voltage level has the effect of one of the two comparators change the state of the output signal in such a way that the fast de-energizing circuit is activated. In the other comparator, however, the changed Hall voltage due to the reference voltage simultaneously applied there does not cause any input voltage difference that would result in a change in the state of the output signal. If in the case of the other direction of current flow the short-circuit current threshold value is reached, which can be different from the threshold value for reversed polarity, a change in state occurs at the signal output of the second comparator, while there is no change in the first comparator.

Such a signal constellation can advantageously be implemented in that the Hall signal is applied to the inverting signal input in one of the two comparators, while it is applied to the non-inverting signal input in the other comparator. The desired values or the reference voltage can be implemented using a voltage divider, which divides the control voltage of the control electronics accordingly. Such a voltage divider can, for example, take place via a series connection of ohmic resistors, which specifies a fixed constellation for the reference voltages applied to the two comparators. For applications where variable threshold values are useful for switching off a short-circuit current, a voltage divider can also be designed as a chain of variable resistors, e.g., B. in the form of a potentiometer or Zener diode arrangement. It will be seen that other threshold types (e.g., current rate of change, integration of current values, and/or comparisons of current values to threshold values) can be implemented with appropriate analog or digital electronics (e.g., capacitors, inductors, reference voltage and/or current values coupled to the circuit, solid state components, and/or utilization of control electronics) integrated with the circuit(s) of the DC switching device.

Figure 2:
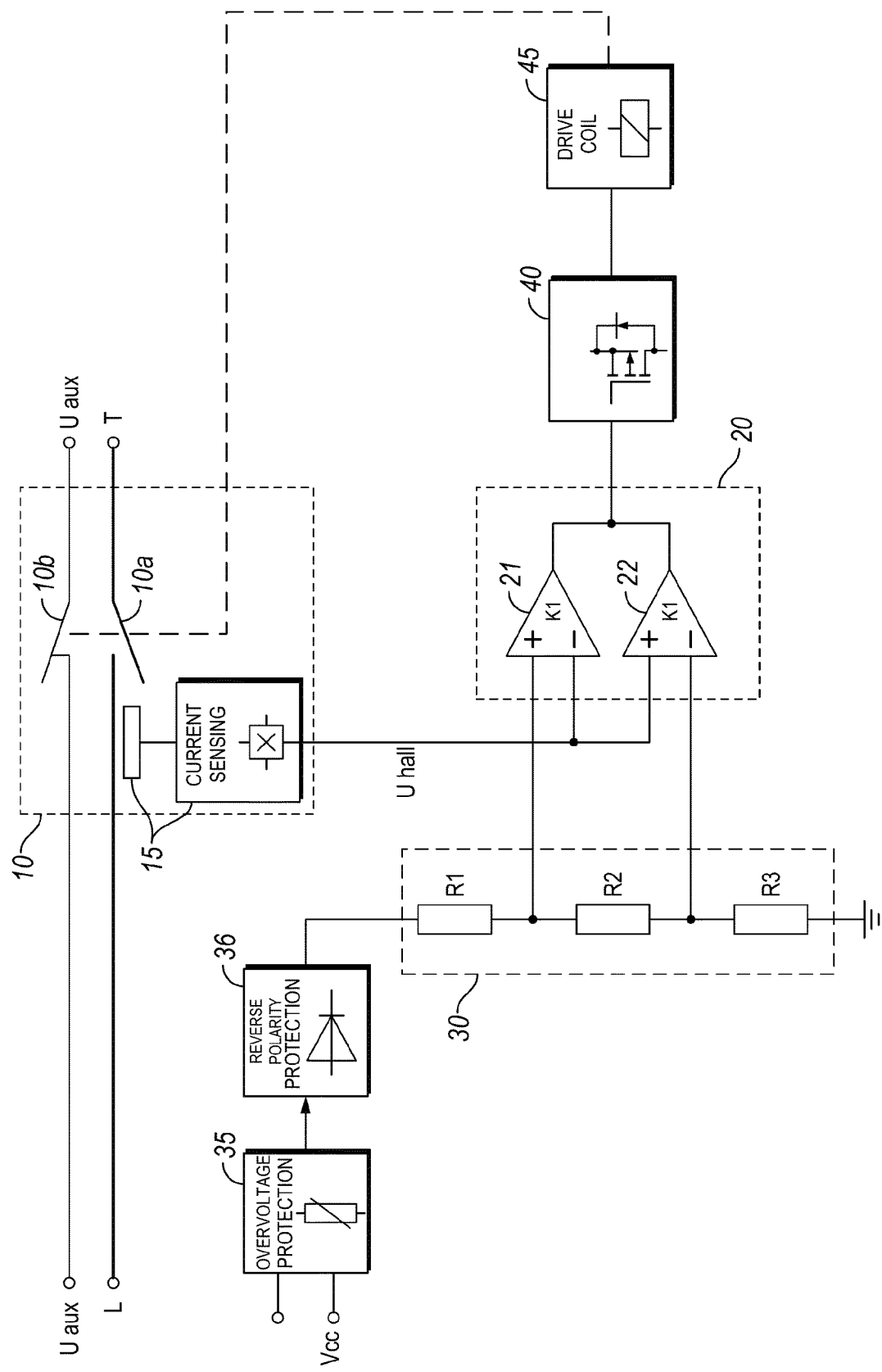
FIG. 2 shows an example embodiment of control electronics for a DC switching device.

Referencing FIG. 2, an example listing of components depicted includes:
- 10 DC switch
- 10a Main circuit switch
- 10b Auxiliary switch
- 15 Hall sensor
- 21 Comparator K1
- 22 Comparator K2
- 30 Voltage divider
- 35 Overvoltage protection
- 36 Reverse polarity protection
- 40 Rapid de-energization circuit
- 45 Drive coil FIG. 2 shows an example embodiment of control electronics for a DC switching device. The mode of operation is explained using the following example embodiment. The current to be monitored is measured with a bipolar Hall sensor 15 which is mounted in the DC switching device 10 in the immediate vicinity of the main current path 12. In the de-energized case, a Hall voltage UH-0 is present at the sensor output, which in this example is 50% of the supply voltage Vcc. As the DC current increases, the Hall voltage also increases in one direction of the current, while for an increasing current in the opposite direction the Hall voltage decreases. The Hall voltage goes as an input signal simultaneously to two (2) comparators 21 (e.g., inverting), 22 (e.g., non-inverting) arranged in parallel in a comparator portion 20 of the control electronics. In the example, one comparator is an inverting input, and the other comparator is a non-inverting input. For each of the other signal inputs a reference signal with the threshold value for activating the rapid de-energization circuit 40 of the magnetic drive in the event of a short circuit is set for both directions of current flow. In the present example, the two reference voltage values are derived from the constantly applied supply voltage Vcc via a voltage divider 30 with permanently selected ohmic resistances provided. It will be understood that voltage divider 30 may include variable resistors, for example to adjust current thresholds for opening the contactor. Additionally or alternatively, the Hall voltage values provided to each comparator, and/or provided from each comparator, may be adjusted and/or have parallel connections with adjustments, to utilize other types of thresholds such as rates of change, accumulated time-current values, and/or for comparison with a reference value (e.g., to determine if the current value is approaching a threshold value). With a resistance value constellation of, for example, R1=R2=15 kΩ and R3=20 kΩ and a supply voltage Vcc of 5V, this is divided so that a reference voltage of 3.5 V is applied to the non-inverting input of the comparator K1 21 and a voltage of 2.0 V to the inverting input of the comparator K2 22. Accordingly, Hall sensor signal at the comparator K1 goes to the inverting input and at the same time to the non-inverting input of the comparator K2. As long as the DC current to be monitored is below the trigger threshold (e.g., a short circuit current, or other selected threshold) the input voltage difference is always greater than zero for both comparators. In the example of FIG. 2, the output signal has a status "HI" when the voltage difference is greater than zero, which does not activate the rapid de-energization circuit 40. If, however, the Hall voltage reaches the value of 3.5 V for one current flow direction with the given example values, which corresponds to the threshold value for the short-circuit case specified for this current direction, then the voltage difference at comparator K1 becomes zero, and the output signal jumps to the status "LO". In the example, the voltage difference at comparator K2 is still greater than zero due to the reference voltage value of 2.0 V at K2, so the output signal from the K2 comparator continues to have the status "HI", but the parallel arrangement of the two comparators causes an immediate activation of the rapid de-energization circuit 40, and corresponding response of the magnetic drive coil 45 of the switching device.

In the example, an increasing current intensity of current flow in the opposite direction is associated with a decrease in the Hall voltage. In the example, if the decreasing voltage reaches 2.0 V, for example corresponding to the threshold value for the short-circuit case specified for the opposite current direction, then the input of the comparator K2 drops to a voltage difference of zero, and the output signal of the comparator K2 jumps to the status "LO". In the example, the voltage difference at the comparator K1 is still positive due to the higher reference voltage, and the output of the comparator K1 remains "HI", but the parallel arrangement of the two comparators causes an immediate activation of the rapid de-energization circuit 40, and corresponding response of the magnetic drive coil 45 of the switching device.

Figure 9:
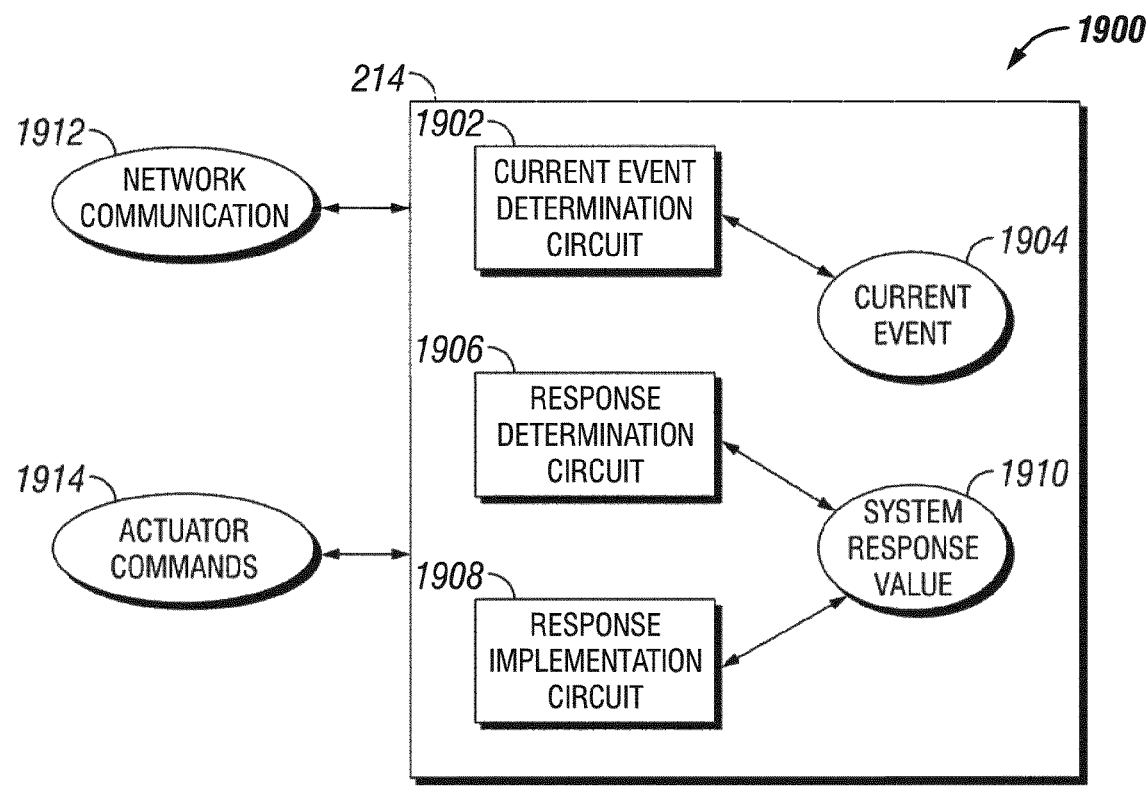
FIG. 9 shows a non-limiting example apparatus for providing additional protection against fuse nuisance faults and system failures.

An example switching device includes implementing control electronics, for example using a microcontroller-based arrangement, and/or a controller such as that depicted in reference to FIG. 9. An example input variable of such control electronics includes the Hall voltage as a measure of the momentarily flowing load current, and/or processed values thereof, such as a rate of change, accumulated time-current value, and/or comparisons of any one or more of these to a threshold.

Control electronics can also be implemented using a microcontroller-based arrangement. The input variable of such control electronics is in turn the Hall voltage as a measure of the momentarily flowing load current.

In nominal operation, the applied Hall voltage varies within a voltage interval, for which the upper and lower boundary values correspond to the switch-off threshold values in the event of a short circuit for both current directions. The level of these threshold values can in principle be set differently, but is fixed for a given application. If these threshold values are exceeded or gone below respectively, on the microcontroller output side an activation signal is sent to the rapid de-excitation circuit 40 of the drive coil 45, analogous to the comparator-based embodiment described in relation to FIG. 2. The example utilizing control electronics again ensures that the load current to the drive coil 45 is switched off quickly, avoiding a re-connection event of the contactors.

Example features of the present disclosure are set forth following, any one or more of which may be present in certain embodiments. An example system includes self-triggering, bidirectional control electronics for a DC switch, for the detection and rapid shutdown of currents at selected thresholds (e.g., a short circuit current) for both current flow directions, consisting of a threshold switch with different selectable shutdown thresholds for both current directions in the form of a parallel arrangement of two (2) comparators and/or utilizing control electronics, coupled with a bidirectional current sensor system arranged in the DC switch based on bipolar Hall sensors on the input side and a high-speed de-energizing circuit on the output side with a high non-load circuit voltage for the rapid removal of current from the magnetic coil of the switch drive. The self-triggering, bidirectional control electronics may be described alternatively as a component, an apparatus, a device, an assembly, a circuit, or a system. An example system includes bidirectionally adjustable current disconnection threshold values (e.g., short circuit currents) for the input side of the comparator circuit, in the form of a voltage divider with fixed and/or adjustable ohmic resistances, as a variably adjustable potentiometer arrangement, and/or or a comparable Zener diode circuit. An example system includes self-triggering, bidirectional control electronics for a DC switch, providing for rapid recognition of a high current event in both directions, and rapid de-activation of a magnetic coil operating contactors of a switching device (e.g., a breaker/relay), utilizing control electronics such as a microcontroller circuit. In some embodiments of the self-triggering, bidirectional control electronics, the high-speed de-energizing circuit is operable in the absence of selectable shutdown thresholds. In some embodiments, the self-triggering, bidirectional control electronics may be useful for the detection and rapid shutdown of currents at selected thresholds (e.g., a short circuit current) for one direction of a bidirectional current flow. Various embodiments of bidirectional switching include having different switching threshold values for each current direction, having the same switching threshold value for both directions, and having a switching threshold value for only one current direction and no switching threshold for the other current direction.

Certain descriptions reference a switching means for operating a threshold switch and a current removal means for operating a high-speed de-energizing circuit. The embodiments described in FIG. 1 and FIG. 2 depict non-limiting examples of the switching means and the current removal means.

Certain further example embodiments are set forth following. In the further examples, without limitation, components such as a contactor and/or a breaker/relay may be implemented utilizing a switching device having bidirectional switching control, such as described preceding and in reference to FIG. 2. Without limitation to any aspect of the present disclosure, operations described in relation to a detected current value, current threshold value, or the like, may be implemented as a bidirectional current response, including having the same or distinct operations for each current direction.

Figure 48:
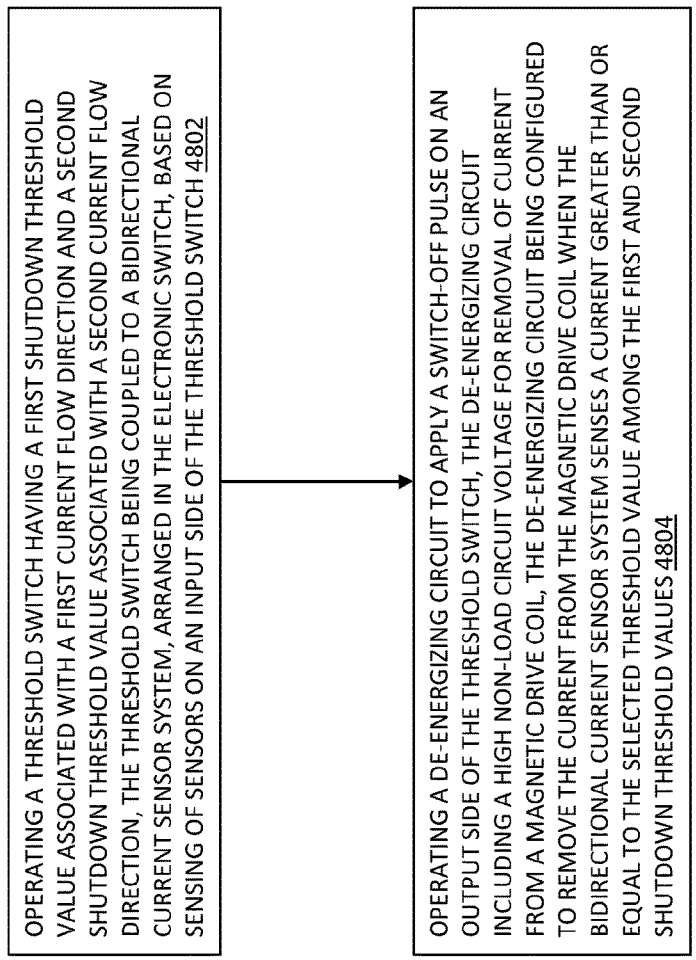
FIG. 48 depicts a method of operating a self-triggering, bidirectional control electronics apparatus.
Figure 49:
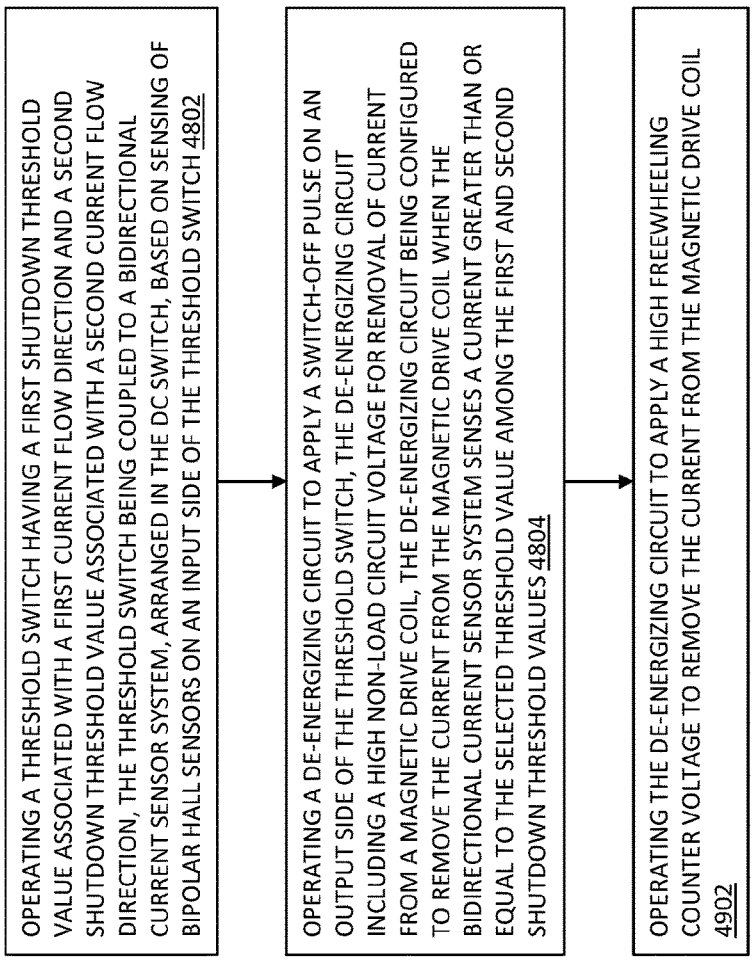
FIG. 49 depicts a method of operating a self-triggering, bidirectional control electronics apparatus.

Referring to FIG. 48, a method 4800 of operating a self-triggering, bidirectional control electronics apparatus is depicted. The method 4800 of operating self-triggering, bidirectional control electronics apparatus for an electronic switch, for detection and shutdown of currents at a selected threshold value for both current flow directions includes operating a threshold switch having a first shutdown threshold value associated with a first current flow direction and a second shutdown threshold value associated with a second current flow direction, the threshold switch being coupled to a bidirectional current sensor system, arranged in the electronic switch, based on sensing of sensors on an input side of the threshold switch 4802; and operating a de-energizing circuit to apply a switch-off pulse on an output side of the threshold switch, the de-energizing circuit including a high non-load circuit voltage for removal of current from a magnetic drive coil, the de-energizing circuit being configured to remove the current from the magnetic drive coil when the bidirectional current sensor system senses a current greater than or equal to the selected threshold value among the first and second shutdown threshold values 4804. FIG. 49 depicts a method 4900 further including operating the de-energizing circuit to apply a high freewheeling counter voltage to remove the current from the magnetic drive coil 4902.

Figure 50:
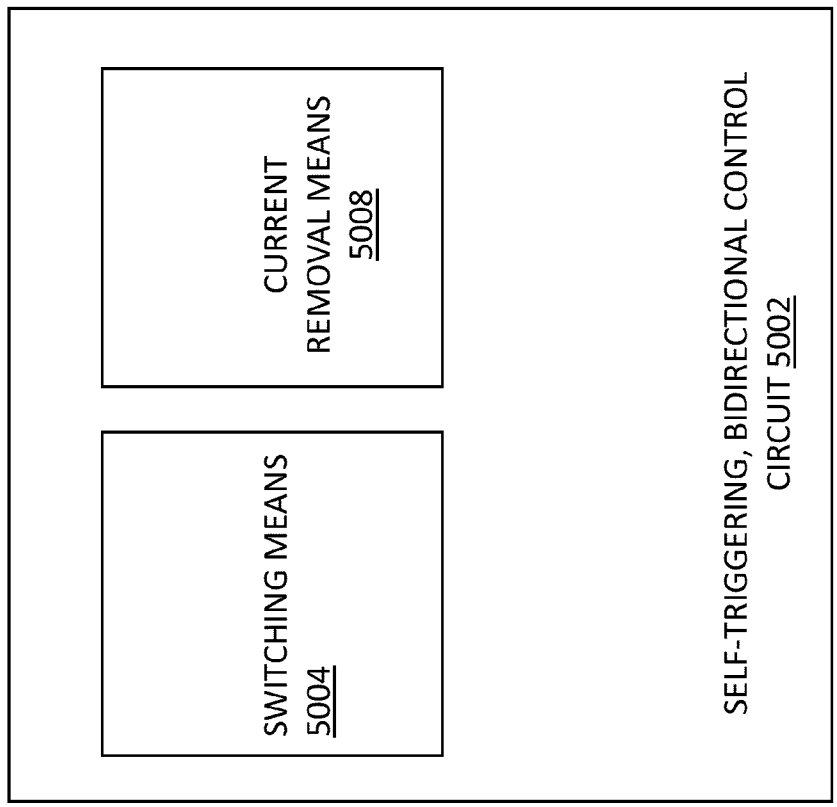
FIG. 50 depicts a self-triggering, bidirectional control circuit for an electronic switch.

FIG. 50 depicts a self-triggering, bidirectional control circuit 5002 for an electronic switch. The circuit 5002 may include a switching means 5004 for operating a threshold switch having a first shutdown threshold value associated with a first current flow direction and a second shutdown threshold value associated with a second current flow direction, the threshold switch being coupled to a bidirectional current sensor system, arranged in the electronic switch, based on sensing of sensors on an input side of the threshold switch. Embodiments of switching means 5004 are shown and described with reference to at least the embodiments depicted in FIG. 1 and FIG. 2. The circuit 5002 may also include a current removal means 5008 for operating a high-speed de-energizing circuit to apply a switch-off pulse on an output side of the threshold switch, the high-speed de-energizing circuit including a high non-load circuit voltage for rapid removal of current from a magnetic drive coil, the high-speed de-energizing circuit rapidly removing the current from the magnetic drive coil when the bidirectional current sensor system senses a current greater than or equal to the selected threshold value among the first and second shutdown threshold values. Embodiments of current removal means 5008 are shown and described with reference to at least the embodiments depicted in FIG. 1 and FIG. 2. It should be understood that the bidirectional control circuit 5002 may include both of the switching means 5004 and the current removal means 5008, or either one can be omitted.

Figure 51:
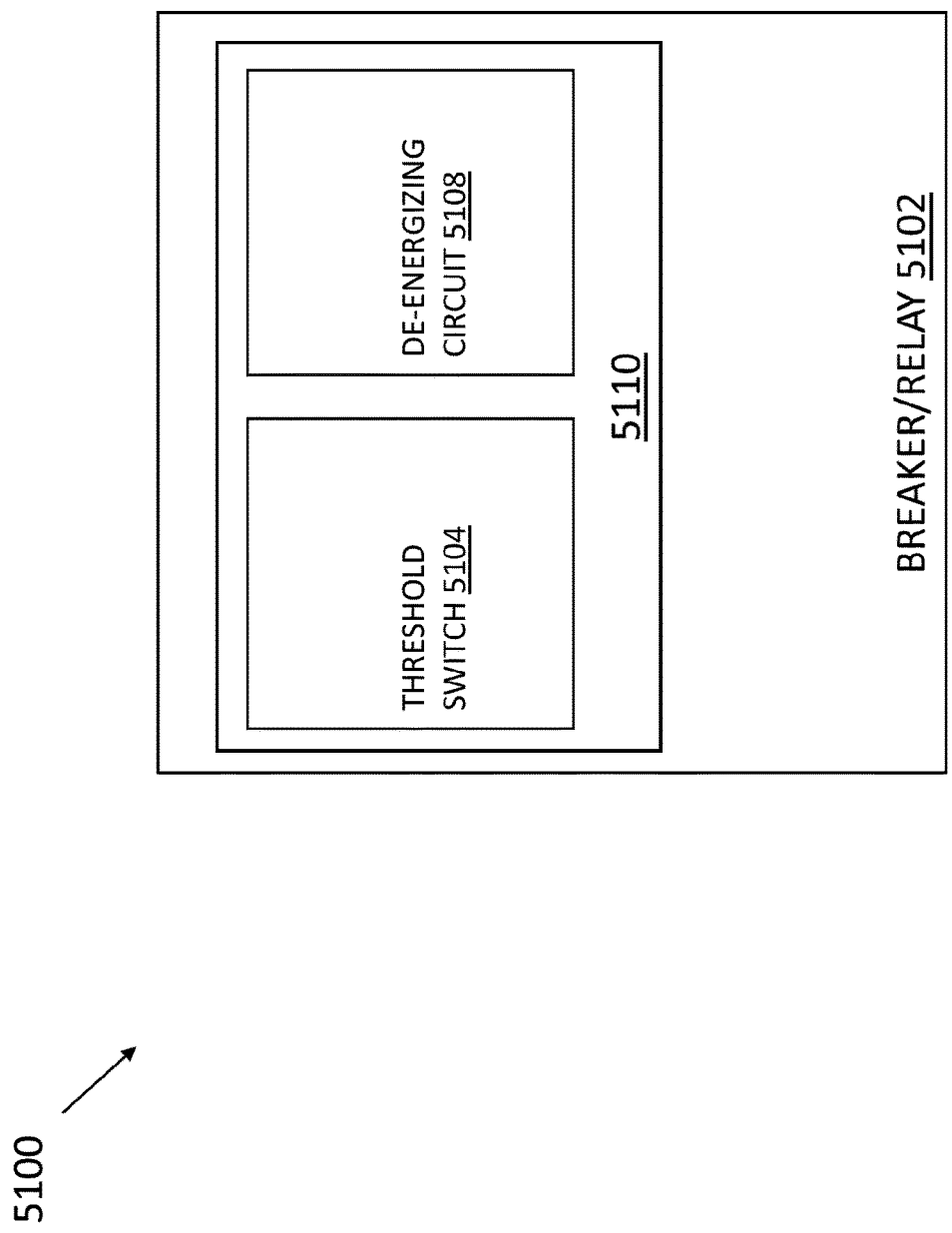
FIG. 51 depicts a system for operating a contactor of a breaker/relay.

FIG. 51 depicts a system 5100 for operating a contactor of a breaker/relay 5102, the system including the breaker/relay 5102 as described herein and a self-triggering, bidirectional control electronics component 5110 for an electronic switch in the breaker/relay 5102, for detection and rapid shutdown of currents at a selected threshold value for both current flow directions. The component 5110 may include a threshold switch 5104, as shown and described with reference to the embodiments depicted in FIG. 1 and FIG. 2, having a first shutdown threshold value associated with a first current flow direction and a second shutdown threshold value associated with a second current flow direction, the threshold switch being coupled to a bidirectional current sensor system, arranged in the electronic switch, based on sensing of sensors on an input side of the threshold switch. The component 5110 may also include a high-speed de-energizing circuit 5108, as shown and described with reference to the embodiments depicted in FIG. 1 and FIG. 2, configured to apply a switch-off pulse on an output side of the threshold switch, the high-speed de-energizing circuit including a high non-load circuit voltage for rapid removal of current from a magnetic drive coil, the high-speed de-energizing circuit 5108 being configured to rapidly remove the current from the magnetic drive coil when the bidirectional current sensor system senses a current greater than or equal to the selected threshold value among the first and second shutdown threshold values. It should be understood that the component 5110 may include both of the threshold switch 5104 and the de-energizing circuit 5108, or either one can be omitted.

An example apparatus includes a self-triggering, bidirectional control electronics apparatus for an electronic switch, for detection and shutdown of currents at a selected threshold value for both current flow directions, including: a threshold switch having a first shutdown threshold value associated with a first current flow direction and a second shutdown threshold value associated with a second current flow direction, the threshold switch being coupled to a bidirectional current sensor system, arranged in the electronic switch, based on sensing of sensors on an input side of the threshold switch, and a de-energizing circuit configured to apply a switch-off pulse on an output side of the threshold switch, the de-energizing circuit including a high non-load circuit voltage for removal of current from a magnetic drive coil, the de-energizing circuit being configured to remove the current from the magnetic drive coil when the bidirectional current sensor system senses a current greater than or equal to the selected threshold value among the first and second shutdown threshold values.

Certain further aspects of the example apparatus are described following, any one or more of which may be present in certain embodiments. The example apparatus further includes wherein the de-energizing circuit is further configured to apply a high freewheeling counter voltage to remove the current from the magnetic drive coil. The example apparatus further includes wherein the high freewheeling counter voltage comprises a flyback diode. The example apparatus further includes wherein the threshold switch comprises two comparators, wherein each of the first and second shutdown threshold values comprises a bi-directionally adjustable current disconnection threshold value for an input side of the two comparators. The example apparatus further includes wherein the threshold switch comprises a control output of a controller. The example apparatus further includes wherein one or more of the first and second shutdown threshold values corresponds to a short circuit current value. The example apparatus further includes a voltage divider electrically coupled to: the sensors in the threshold switch on a first side of the voltage divider, the sensors being bipolar Hall sensors, and two comparators in the threshold switch on a second side of the voltage divider. The example apparatus further includes wherein the voltage divider comprises at least one component selected from the components consisting of: fixed ohmic resistances, adjustable ohmic resistances, a variably adjustable potentiometer arrangement, or a Zener diode circuit. The example apparatus further includes wherein: the first side of the voltage divider is an input side, and the second side of the voltage divider is an output side. The example apparatus further includes wherein the electronic switch comprises a direct current (DC) switch.

An example method includes operating self-triggering, bidirectional control electronics apparatus for an electronic switch, for detection and shutdown of currents at a selected threshold value for both current flow directions, the method including: operating a threshold switch having a first shutdown threshold value associated with a first current flow direction and a second shutdown threshold value associated with a second current flow direction, the threshold switch being coupled to a bidirectional current sensor system, arranged in the electronic switch, based on sensing of sensors on an input side of the threshold switch, and operating a de-energizing circuit to apply a switch-off pulse on an output side of the threshold switch, the de-energizing circuit including a high non-load circuit voltage for removal of current from a magnetic drive coil, the de-energizing circuit being configured to remove the current from the magnetic drive coil when the bidirectional current sensor system senses a current greater than or equal to the selected threshold value among the first and second shutdown threshold values.

Certain further aspects of the example method are described following, any one or more of which may be present in certain embodiments. The example method further includes operating the de-energizing circuit to apply a high freewheeling counter voltage to remove the current from the magnetic drive coil. The example method further includes wherein the high freewheeling counter voltage comprises a flyback diode. The example method further includes wherein the threshold switch comprises two comparators. The example method further includes wherein each of the first and second shutdown threshold values comprises a bidirectionally adjustable current disconnection threshold value for an input side of the two comparators. The example method further includes wherein the threshold switch comprises a control output of a controller. The example method further includes wherein one or more of the first and second shutdown threshold values corresponds to a short circuit current value. The example method further includes a voltage divider electrically coupled to: the sensors in the threshold switch on a first side of the voltage divider, the sensors being bipolar Hall sensors, and two comparators in the threshold switch on a second side of the voltage divider. The example method further includes wherein the voltage divider comprises at least one component selected from the components consisting of: fixed ohmic resistances, adjustable ohmic resistances, a variably adjustable potentiometer arrangement, or a Zener diode circuit. The example method further includes wherein: the first side of the voltage divider is an input side, and the second side of the voltage divider is an output side. The example method further includes wherein the electronic switch comprises a direct current (DC) switch.

An example self-triggering, bidirectional control circuit for an electronic switch, for detection and rapid shutdown of currents at a selected threshold value for both current flow directions includes a switching means for operating a threshold switch having a first shutdown threshold value associated with a first current flow direction and a second shutdown threshold value associated with a second current flow direction, the threshold switch being coupled to a bidirectional current sensor system, arranged in the electronic switch, based on sensing of sensors on an input side of the threshold switch, and a current removal means for operating a high-speed de-energizing circuit to apply a switch-off pulse on an output side of the threshold switch, the high-speed de-energizing circuit including a high non-load circuit voltage for rapid removal of current from a magnetic drive coil, the high-speed de-energizing circuit rapidly removing the current from the magnetic drive coil when the bidirectional current sensor system senses a current greater than or equal to the selected threshold value among the first and second shutdown threshold values.

Certain further aspects of the example circuit are described following, any one or more of which may be present in certain embodiments. The example circuit further includes wherein the high-speed de-energizing circuit is further configured to apply a high freewheeling counter voltage to rapidly remove the current from the magnetic drive coil. The example circuit further includes wherein the high freewheeling counter voltage comprises a flyback diode. The example circuit further includes wherein the threshold switch comprises two comparators. The example circuit further includes wherein the selected threshold value comprises a bidirectionally adjustable current disconnection threshold value for an input side of the two comparators. The example circuit further includes wherein the threshold switch comprises a control output of a controller. The example circuit further includes wherein the selected threshold value corresponds to a short circuit current value. The example circuit further includes a voltage divider electrically coupled to: the sensors in the threshold switch on a first side of the voltage divider, the sensors being bipolar Hall sensors, and two comparators in the threshold switch on a second side of the voltage divider. The example circuit further includes wherein the voltage divider comprises at least one component selected from the components consisting of: fixed ohmic resistances, adjustable ohmic resistances, a variably adjustable potentiometer arrangement, or a Zener diode circuit. The example circuit further includes wherein: the first side of the voltage divider is an input side, and the second side of the voltage divider is an output side. The example circuit further includes wherein the electronic switch comprises a direct current (DC) switch.

An example system for operating a contactor of a breaker/relay includes a breaker/relay including: a fixed contact electrically coupled to a power bus, a movable contact selectively electrically coupled to the fixed contact, an armature coupled to the movable contact, the armature being configured to be moved into contact with the fixed contact to allow current flow through the power bus, a relay portion including a coil and a magnet core, the coil being configured to actuate the relay, such that the armature is pulled to the magnet core when the coil is energized, and a breaker portion including: a plurality of splitter plates in proximity to a body of the breaker/relay, and a permanent magnet system surrounding one or more of: the plurality of splitter plates, and an arcing path between a contact gap and the plurality of splitter plates, wherein, during engagement or disengagement of the movable contact when the power bus is energized, the body of the breaker/relay is configured to cooperate with the splitter plates, using magnetic fields provided by the permanent magnet system, to dissipate an arc, and a self-triggering, bidirectional control electronics component for an electronic switch in the breaker/relay, for detection and rapid shutdown of currents at a selected threshold value for both current flow directions, including: a threshold switch having a first shutdown threshold value associated with a first current flow direction and a second shutdown threshold value associated with a second current flow direction, the threshold switch being coupled to a bidirectional current sensor system, arranged in the electronic switch, based on sensing of sensors on an input side of the threshold switch, and a high-speed de-energizing circuit configured to apply a switch-off pulse on an output side of the threshold switch, the high-speed de-energizing circuit including a high non-load circuit voltage for rapid removal of current from a magnetic drive coil, the high-speed de-energizing circuit being configured to rapidly remove the current from the magnetic drive coil when the bidirectional current sensor system senses a current greater than or equal to the selected threshold value among the first and second shutdown threshold values.

Certain further aspects of the example system are described following, any one or more of which may be present in certain embodiments. The example system further includes wherein the high-speed de-energizing circuit is further configured to apply a high freewheeling counter voltage to rapidly remove the current from the magnetic drive coil. The example circuit further includes wherein the high freewheeling counter voltage comprises a flyback diode. The example circuit further includes wherein the threshold switch comprises two comparators. The example circuit further includes wherein the selected threshold value corresponds to a short circuit current value. The example circuit further includes wherein the electronic switch comprises a direct current (DC) switch An example system for operating a contactor of a breaker/relay includes a breaker/relay including: a fixed contact electrically coupled to a power bus, a movable contact selectively electrically coupled to the fixed contact, an armature coupled to the movable contact, the armature being configured to be moved into contact with the fixed contact to allow current flow through the power bus, a relay portion including a coil and a magnet core, the coil being configured to actuate the relay, such that the armature is pulled to the magnet core when the coil is energized, and a breaker portion including: a plurality of splitter plates in proximity to a body of the breaker/relay, and a permanent magnet system surrounding one or more of: the plurality of splitter plates, and an arcing path between a contact gap and the plurality of splitter plates, wherein, during engagement or disengagement of the movable contact when the power bus is energized, the body of the breaker/relay is configured to cooperate with the splitter plates, using magnetic fields provided by the permanent magnet system, to dissipate an arc, and a self-triggering, bidirectional control electronics component for an electronic switch in the breaker/relay, for detection and rapid shutdown of currents at a selected threshold value for both current flow directions, including a threshold switch having a first shutdown threshold value associated with a first current flow direction and a second shutdown threshold value associated with a second current flow direction, the threshold switch being coupled to a bidirectional current sensor system, arranged in the electronic switch, based on sensing of sensors on an input side of the threshold switch.

Certain further aspects of the example system are described following, any one or more of which may be present in certain embodiments. The example system further includes wherein the threshold switch comprises two comparators. The example system further includes wherein the selected threshold value corresponds to a short circuit current value. The example system further includes wherein the electronic switch comprises a direct current (DC) switch.

An example apparatus includes a self-triggering, bidirectional control electronics apparatus for a direct current (DC) switch, for detection and shutdown of currents at a selected threshold value for both current flow directions, including:

a DC switch, a threshold switch having a first shutdown threshold value associated with a first current flow direction and a second shutdown threshold value associated with a second current flow direction, the threshold switch being coupled to a bidirectional current sensor system, arranged in the DC switch, based on sensing of sensors on an input side of the threshold switch, and a de-energizing circuit configured to apply a switch-off pulse on an output side of the threshold switch, the de-energizing circuit including a high non-load circuit voltage for removal of current from a magnetic drive coil, the de-energizing circuit being configured to remove the current from the magnetic drive coil when the bidirectional current sensor system senses a current greater than or equal to the selected threshold value among the first and second shutdown threshold values.

An example apparatus includes a self-triggering, bidirectional control electronics apparatus for an electronic switch, for detection and shutdown of currents at a selected threshold value for both current flow directions, including: a bidirectional current sensor system, a threshold switch having a first shutdown threshold value associated with a first current flow direction and a second shutdown threshold value associated with a second current flow direction, the threshold switch being coupled to the bidirectional current sensor system, arranged in the electronic switch, based on sensing of sensors on an input side of the threshold switch, and a de-energizing circuit configured to apply a switch-off pulse on an output side of the threshold switch, the de-energizing circuit including a high non-load circuit voltage for removal of current from a magnetic drive coil, the de-energizing circuit being configured to remove the current from the magnetic drive coil when the bidirectional current sensor system senses a current greater than or equal to the selected threshold value among the first and second shutdown threshold values.

An example apparatus includes a self-triggering, bidirectional control electronics apparatus for an electronic switch, for detection and shutdown of currents at a selected threshold value for both current flow directions, including: a magnetic drive coil, a threshold switch having a first shutdown threshold value associated with a first current flow direction and a second shutdown threshold value associated with a second current flow direction, the threshold switch being coupled to a bidirectional current sensor system, arranged in the electronic switch, based on sensing of sensors on an input side of the threshold switch, and a de-energizing circuit configured to apply a switch-off pulse on an output side of the threshold switch, the de-energizing circuit including a high non-load circuit voltage for removal of current from the magnetic drive coil, the de-energizing circuit being configured to remove the current from the magnetic drive coil when the bidirectional current sensor system senses a current greater than or equal to the selected threshold value among the first and second shutdown threshold values.

An example apparatus includes a self-triggering, bidirectional control electronics apparatus for an electronic switch, for detection and shutdown of currents at a selected threshold value for both current flow directions, including: a threshold switch having a first shutdown threshold value associated with a first current flow direction and a second shutdown threshold value associated with a second current flow direction, the threshold switch being coupled to a bidirectional current sensor system, arranged in the electronic switch, based on sensing of sensors on an input side of the threshold switch, a sensed current, and a de-energizing circuit configured to apply a switch-off pulse on an output side of the threshold switch, the de-energizing circuit including a high non-load circuit voltage for removal of current from a magnetic drive coil, the de-energizing circuit being configured to remove the current from the magnetic drive coil when the sensed current is greater than or equal to the selected threshold value among the first and second shutdown threshold values.

Figure 3:
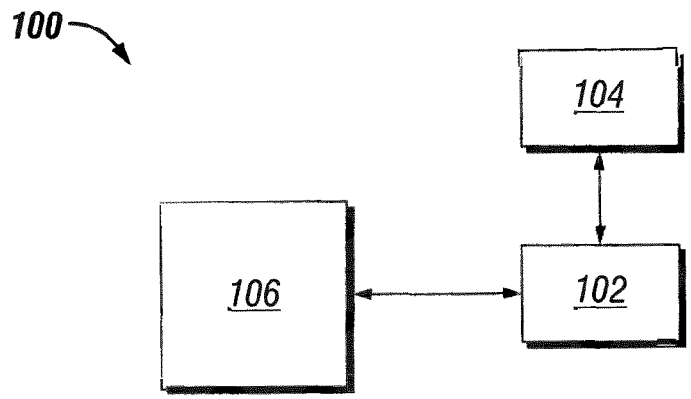
FIG. 3 shows an embodiment system schematically depicting a power distribution unit (PDU) operationally positioned between a power source and a load.

Referencing FIG. 3, an example system 100 is schematically depicted including a power distribution unit (PDU) 102 operationally positioned between a power source 104 and a load 106. The power source 104 may be any type—including at least a battery, generator, and/or capacitor. The power source 104 may include multiple sources or lines of power, which may be distributed according to the type of power (e.g., a battery input separated from a generator input) and/or may be distributed according to the devices powered (e.g., auxiliary and/or accessory power separated from main load power such as motive force power, and/or divisions within the accessories, divisions within the motive force power, etc.). The load 106 may be any type, including one or more motive force loads (e.g., to individual drive wheel motors, to a global motive drive motor, etc.), one or more accessories (e.g., on-vehicle accessories such as steering, fan, lights, cab power, etc.). In certain embodiments, the PDU 102 provides for ease of integration of the electrical system of the application including the system 100, such as by utilizing uniform input and output access, grouping all power distribution into a single box, single area, and/or to a single logically integrated group of components. In certain embodiments, the PDU 102 provides for protection of the electrical system, including fusing and/or connection or disconnection (manual and/or automated) of the electrical system or individual aspects of the electrical system. In certain embodiments, one or more power sources 104 may be high voltage (e.g., motive power sources, which may be 96V, 230V-360V, 240V, 480V, or any other value) or low voltage (e.g., 12V, 24V, 42V, or any other value). In certain embodiments, one or more power sources 104 may be a direct current (DC) power source or an alternating current (AC) power source, including multi-phase (e.g., three phase) AC power. In certain embodiments, the PDU 102 is a pass-through device, providing power to the load 106 approximately as configured by the power source 104—for example only as affected by sensing and other operations from the PDU 102 that are not provided for power configuration. In certain embodiments, the PDU 102 may include power electronics, for example rectifying, adjusting voltage, cleaning up noisy electrical power, etc. to provide selected electrical power characteristics to the load 106.

Figure 4:
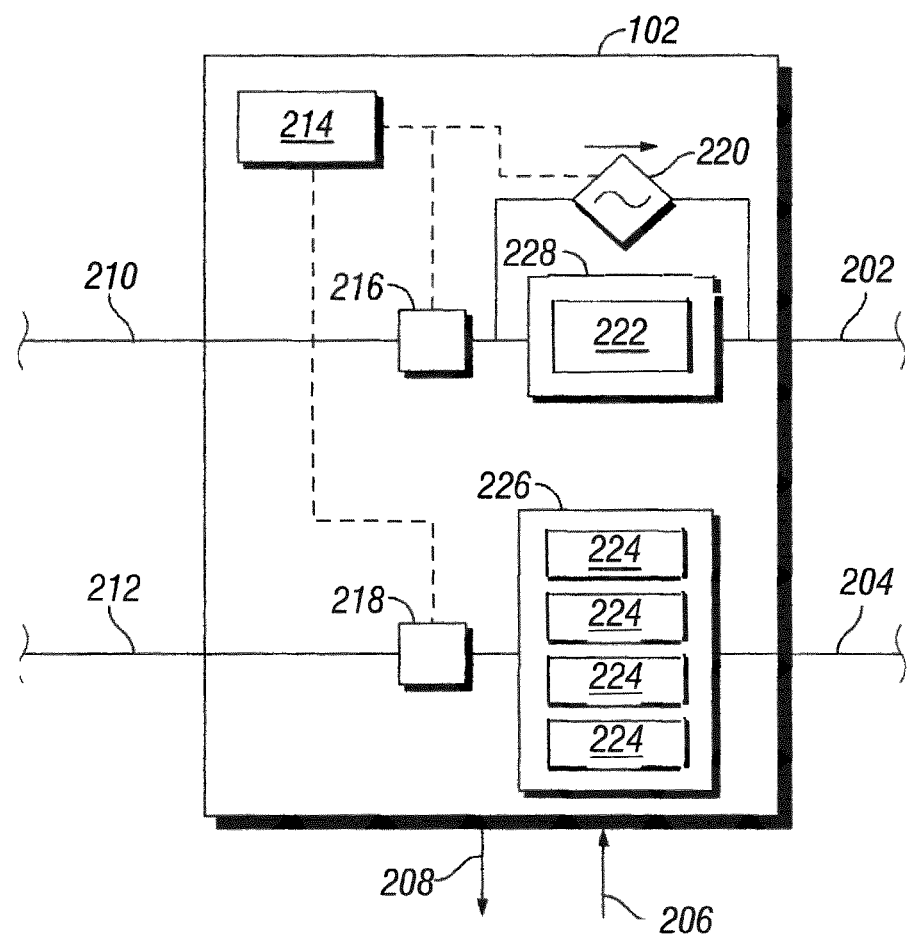
FIG. 4 depicts a more detailed embodiment system schematically depicting a PDU.

Referencing FIG. 4, a more detailed view of an example PDU 102 is schematically depicted. The example PDU 102 includes a main power source 202 (e.g., high voltage, main load power, motive power, etc.) which may be provided by one or more power sources 104, and an auxiliary power source 204 (e.g., auxiliary, accessory, low voltage, etc.) which may be provided by one or more power sources 104. The example PDU 102 depicts a single main power source 202 and a single auxiliary power source 204, but a given application may include one or more main power sources 202, and may include separated auxiliary power sources 204 and/or omit auxiliary power sources 204.

The example PDU 102 further includes a coolant inlet 206 and a coolant outlet 208. The provision of coolant to the PDU 102 is optional and may not be included in certain embodiments. The coolant may be of any type according to availability in the application, including for example an on-vehicle coolant available (e.g., engine coolant, transmission coolant, a coolant stream associated with an auxiliary device or other power components such as a power source 104, etc.) and/or may be a coolant dedicated to the PDU 102. Where present, the amount of cooling provided by the coolant may be variable—for example by changing an amount of coolant flowing through a coolant loop through the PDU 102—such as by operating hardware (e.g. a valve or restriction) within the PDU 102, providing a request for a coolant flow rate to another device in the system, etc.

The example PDU 102 further includes a main power outlet 210 and an auxiliary power outlet 212. As described preceding, the PDU 102 may include multiple main power outlets 210, and/or divided, multiple, multiplexed, and/or omitted auxiliary power outlets 212. The example PDU 102 is a pass-through power device where, except for effects on the power due to sensing and/or active diagnostics, the power outlets 210, 212 have approximately the same electrical characteristics of the corresponding power inlets 202, 204. However, the PDU 102 can include power electronics (solid state or otherwise) to configure power in any desired manner.

The example PDU 102 further includes a controller 214 configured to functionally execute certain operations of the PDU 102. The controller 214 includes and/or is communicatively coupled to one or more sensors and/or actuators in the PDU 102, for example to determine current values, voltage values, and/or temperatures of any power source or input, fuse, connector, or other device in the PDU 102. Additionally or alternatively, the controller 214 is communicatively coupled to the system 100 including the PDU 102, including for example a vehicle controller, engine controller, transmission controller, application controller, and/or network device or server (e.g., a fleet computer, cloud server, etc.). The controller 214 may be coupled to an application network (e.g., a CAN, a datalink, a private or public network, etc.), an outside network, and/or another device (e.g., an operator's portable device, an in-cab computer for a vehicle, etc.). The controller 214 is depicted schematically as a single stand-alone device for convenience of illustration. It will be understood that the controller 214 and/or aspects of the controller 214 may be distributed across multiple hardware devices, included within another hardware device (e.g., a controller for the power source, load, vehicle, application, etc.), and/or configured as hardware devices, logic circuits, or the like to perform one or more operations of the controller 214. The PDU 102 is depicted schematically as a device within a single enclosure, but may be within a single enclosure and/or distributed in two or more places within an application. In certain embodiments, the inclusion of the PDU 102 within a single enclosure provides certain advantages for integration, reduction of footprint, and/or simplification of interfaces. Additionally or alternatively, inclusion of the PDU 102 in more than one location in an application is contemplated herein, and/or the inclusion of more than one PDU 102 within an application is contemplated herein.

The example PDU 102 includes a main contactor 216 selectively controlling the main power throughput of the PDU 102. In the example, the main contactor 216 is communicatively coupled to and controlled by the controller 214. The main contactor 216 may additionally be controllable manually, and/or other main contactors 216 may be in-line for the main power that are controllable manually. An example main contactor 216 includes a solenoid (or other coil-based) contactor, such that energizing the solenoid provides for either connected main power (e.g., normally open, or power is disconnected when not energized) and/or energizing the solenoid provides for disconnected main power (e.g., normally closed, or power is connected when not energized). The characteristics of the system 100, including design choices about whether power should be active when controller 214 power fails, servicing plans, regulations and/or policies in place, the consequences of power loss for the system 100, the voltage typically carried on the main power source, the availability of a positive manual disconnect option, and the like, may inform or dictate the decision of whether the main contactor 216 is normally open or normally closed. In certain embodiments, the main contactor 216 may be a solid state device such as a solid state relay. Where more than one main contactor 216 is present, the various contactors may include the same or distinct hardware (e.g., one is a solenoid and one is a solid state relay), and/or may include the same or distinct logic for being normally open or normally closed. The main contactor 216 may be additionally controllable by devices outside the PDU 102—for example a keyswitch lockout, another controller in the system 100 having access to control the main contactor 216, etc., and/or the controller 214 may be responsive to outside commands to open or close the main contactor 216, and/or additional contactors in-line for the main power may be responsive to devices outside the PDU 102.

The example PDU 102 includes an auxiliary contactor 218 selectively controlling the auxiliary power throughput of the PDU 102. In the example, the auxiliary contactor 218 is communicatively coupled to and controlled by the controller 214. The auxiliary contactor 218 may additionally be controllable manually, and/or other auxiliary contactor 218 may be in-line for the auxiliary power that are controllable manually. An example auxiliary contactor 218 includes a solenoid (or other coil-based) contactor, such that energizing the solenoid provides for either connected auxiliary power (e.g., normally open, or power is disconnected when not energized) and/or energizing the solenoid provides for disconnected auxiliary power (e.g., normally closed, or power is connected when not energized). The characteristics of the system 100, including design choices about whether power should be active when controller 214 power fails, servicing plans, regulations and/or policies in place, the consequences of power loss for the system 100, the voltage typically carried on the auxiliary power source(s), the availability of a positive manual disconnect option, and the like, may inform or dictate the decision of whether the auxiliary contactor 218 is normally open or normally closed. In certain embodiments, the auxiliary contactor 218 may be a solid state device such as a solid state relay. The auxiliary contactor 218 may be additionally controllable by devices outside the PDU 102—for example a keyswitch lockout, another controller in the system 100 having access to control the auxiliary contactor 218, etc., and/or the controller 214 may be responsive to outside commands to open or close the auxiliary contactor 218, and/or additional contactors in-line for the auxiliary power may be responsive to devices outside the PDU 102. In certain embodiments, auxiliary contactors 218 may be provided for each auxiliary line, for subsets of the auxiliary lines (e.g., four auxiliary power inputs, with 2, 3, or 4 auxiliary contactors 218), etc.

An example PDU 102 includes a current source 220, which may be an alternating current source, and/or which may be provided as solid-state electronics on the controller 214. The current source 220 is capable of providing a selected current injection to the main power across a main fuse 222, for example as AC current, DC current, and/or controllable current over time. For example, the PDU 102 may include sensors such as voltage and/or current sensors on the main power, and the current source 220 provides an electrical connection to a power source (which may be an external power source and/or sourced through the controller) in a manner configured to inject the desired current to the main power. The current source 220 may include feedback to ensure the desired current is injected, for example to respond to system noise, variability, and aging, and/or may apply the nominal electrical connection to inject current, and the controller 214 determines sensor inputs to determine what current was actually injected on the main power. The example PDU 102 depicts a current source 220 associated with the main fuse 222, but the PDU 102 may further include one or more current sources 220 associated with any one or more of the fuses 222, 224 in the PDU 102, including across fuses individually, in subsets, or across all of the fuses (subject to compatibility of power on the fuses—for example simultaneous current injection across electrically coupled fuses should generally be avoided) at once. It can be seen that the inclusion of additional current sources 220 provides for greater resolution in injecting current across individual fuses and in managing variation of the fuses over time, which the inclusion of fewer current sources 220 reduces system cost and complexity. In certain embodiments the current source 220 is configured to selectively inject current across each fuse in the PDU 102, and/or across each fuse of interest, in a sequence or schedule, and/or as requested by a controller 214.

Figure 5:
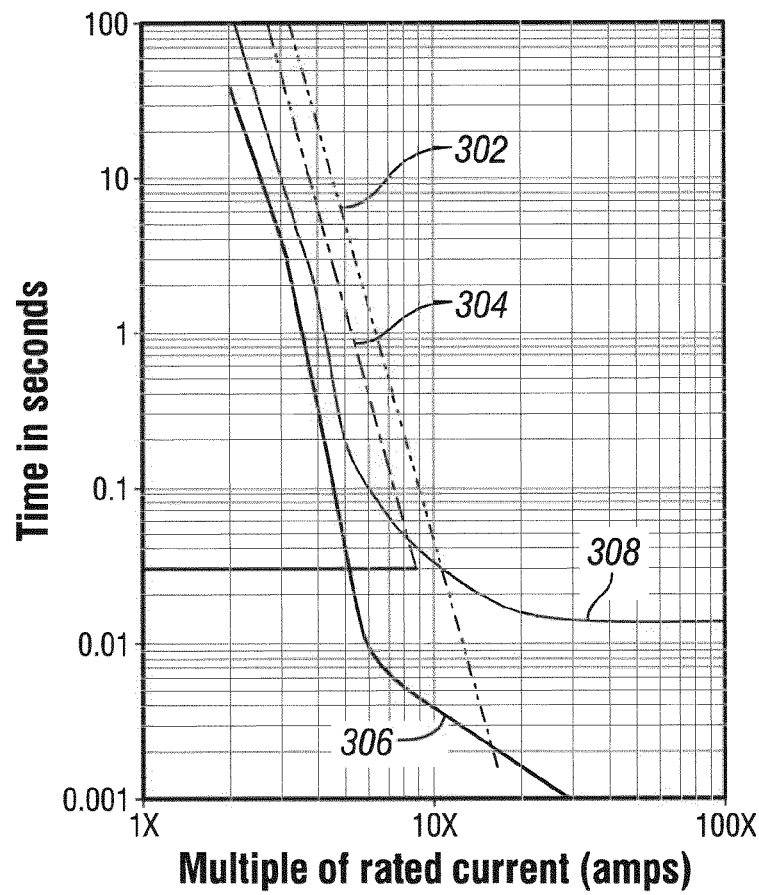
FIG. 5 depicts a non-limiting example response curve for a fuse.

The example PDU 102 includes the main fuse 222 and the auxiliary fuses 224. The main fuse 222 or fuses are associated with the main power, and the auxiliary fuses 224 are associated with the auxiliary power. In certain embodiments, the fuses are thermal fuses, such as resistive devices that exhibit heating, and are intended to fail if a given current profile is exceeded in the associated power line. Referencing FIG. 5, a typical and non-limiting example response curve for a fuse is depicted. The curve 302 represents an application damage curve, depicting a current-time space over which some aspect of the application will be damaged if the curve is exceeded. For example, in the example application damage curve 302, if 10× rated current is exceeded for about 50 milliseconds, damage to some aspect of the application will occur. It will be understood that an application may contain many components, and that the components may differ in the application damage curve 302. Additionally, each fuse 222, 224 may be associated with distinct components having a different damage curve than other components. The curve 304 represents a control space, wherein in certain embodiments, the controller 114 provides control protection to keep the system from reaching the application damage curve 302 in the event of a fuse failure or off-nominal operation. The application damage curve 302 may be a specified value, for example a system requirement to be met, where exceedance of the application damage curve 302 does not meet the system requirement, although actual damage to components may be experienced at some other value in the current-time space. The curve 306 represents the fuse melting line for an illustrative fuse. At the position of the fuse melting line 306, the fuse temperature exceeds the fuse design temperature, and the fuse melts. However, the fuse continues conducting for a period of time after melting commences, as depicted by the fuse conduction line 308 (e.g., due to conduction through the melted material before the connection is broken, arcing, and the like). When the time-current space reaches the fuse conduction line 308, the fuse is no longer conducting on the power line, and the line is disconnected. It will be understood that specific system dynamics, fuse-to-fuse variability, fuse aging (e.g., induced mechanical or thermal degradation, changes in composition or oxidation, and the like), the exact nature of the current experienced (e.g., the rise time of the current), and other real-world variables will affect the exact timing of both fuse melting and fuse disconnection. However, even with a nominal fuse as depicted in FIG. 5, it can be seen that for very high currents, the nominal fuse conduction line 308, and even the fuse melting line 306, can cross the application damage curve 302—for example because certain dynamics of the fuse disconnection operation are less responsive (in the time domain) or unresponsive to the current applied at very high current values.

The example PDU 102 further includes a conduction layer 226 associated with the auxiliary power, and a conduction layer 228 associated with the main power. The conduction layers 226, 228 include the power couplings of the power lines to the fuses. In certain embodiments, the conduction layers 226, 228 are just wires or other conductive couplings between the fuses and the power connections to the PDU 102. Additionally or alternatively, conduction layers 226, 228 may include flat or laminated portions, for example with stamped or formed conductive layers, to provide power connections within the PDU 102, and/or portions of the conduction layers 226, 228 may include flat or laminated portions. Without limitation to any other disclosures provided herein, the utilization of flat or laminated portions provides for flexibility in the manufacture of the conduction layers 226, 228, flexibility in the installation and/or a reduced installed footprint of the conduction layers 226, 228, and/or provides for greater contact area between the conduction layers 226, 228 and portions of the PDU 102—for example the fuses, controller, contactors, or other devices within the PDU 102 where thermal and/or electrical contact between the conduction layers 226, 228 and the other devices are desired. The example conduction layers 226, 228 are depicted in association with the fuses, but the conduction layers 226, 228 may additionally or alternatively be associated with the controller 214 (e.g., power coupling, communications within or outside the PDU 102, coupling to actuators, coupling to sensors, and/or thermal coupling), contactors 216, 218, and/or any other device within the PDU 102.

Figure 6:
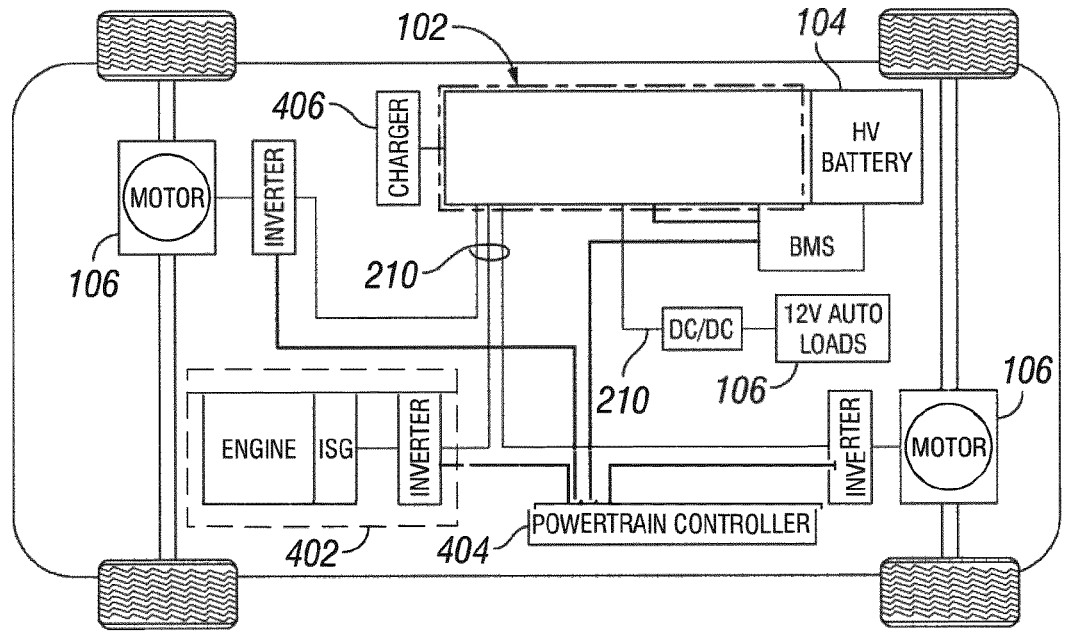
FIG. 6 depicts a non-limiting example system for mobile application such as a vehicle.

Referencing FIG. 6, an example system 400 is a mobile application such as a vehicle. The example system 400 includes the high voltage battery 104 electrically coupled to high voltage loads 106 through the PDU 102. In the example system 400, an auxiliary prime mover, such as an internal combustion engine 402 (with associated conversion electronics, such as a generator, motor-generator, and/or inverter) is additionally coupled to the PDU 102. It is understood that the high voltage battery 104 and/or the auxiliary prime mover 402 may act as a power source or a load during certain operating conditions of the system 400, and additionally the high voltage loads 106 (e.g., electric motors or motor-generators coupled to the wheels) may act as a load or a source during certain operating conditions. The description of loads 106 and sources 104 herein is non-limiting, and references only nominal operation, ordinary operation, and/or operational conditions selected for conceptual description, even if the described load 106 and/or source 104 often, usually, or always operates in a mode that is not the described name. For example, the high voltage battery 104 may operate as a power source during motive operations where net energy is being taken from the battery, and/or as a load during charging operations, motive operations where the wheels or auxiliary prime mover are charging the battery, etc.

The example system 400 further includes a powertrain controller 404 to control operations of the powertrain, which may be associated with another component in the system 400, and/or part of another controller in the system (e.g., a vehicle controller, battery controller, motor or motor-generator controller, and/or engine controller). The example system 400 further includes a charger 406 coupled to the high voltage battery 104 through the PDU 102, and low voltage loads ("12V Auto Loads" in the example of FIG. 6) representing auxiliary and accessory loads in the system 400. One of skill in the art will recognize the system 400 as including a serial hybrid powertrain for a vehicle—for example where auxiliary power (e.g., the internal combustion engine) interacts only with the electrical system to re-charge batteries and/or provide additional real-time electrical power during operations, but does not mechanically interact with the drive wheels. Additionally or alternatively, a system may include a parallel hybrid system, where auxiliary power can interact mechanically with the drive wheels, and/or interact with the electrical system (either, or both). Additionally or alternatively, a system may be a fully electric system, where auxiliary power is not present, and/or where auxiliary power is present but does not interact with the high voltage/motive power system (e.g., an alternative power unit to drive accessories, refrigeration, or the like—which power may be communicated through the PDU 102 but separated from the motive power electrical system). In certain embodiments, motive systems such as vehicles experience highly transient load cycles—for example during acceleration, deceleration, stop-and-go traffic, emergency operations, and the like—and accordingly management of power in such system is complex, and certain devices such as fuses can be vulnerable to the highly transient load cycle. Additionally or alternatively, loss of operations for vehicles can result in costs for system down-time, loss or untimely delivery of cargo, and/or significant operational risks due to failures (e.g., stranding the operator and/or vehicle, loss of operations in traffic, loss of operations on a motor-way, etc.). In certain embodiments, other systems that may be hybrid electric and/or fully electric are additionally or alternatively subject to highly variable duty cycles and/or specific vulnerabilities to operational interruptions, such as, without limitation, pumping operations, process operations for a larger process (e.g., chemical, refining, drilling, etc.), power generation operations, mining operations, and the like. System failures for these and other operations may involve externalities such as losses associated with the process failure that go beyond the down-time for the specific system, and/or down-time for such systems can incur a significant cost.

Figure 7:
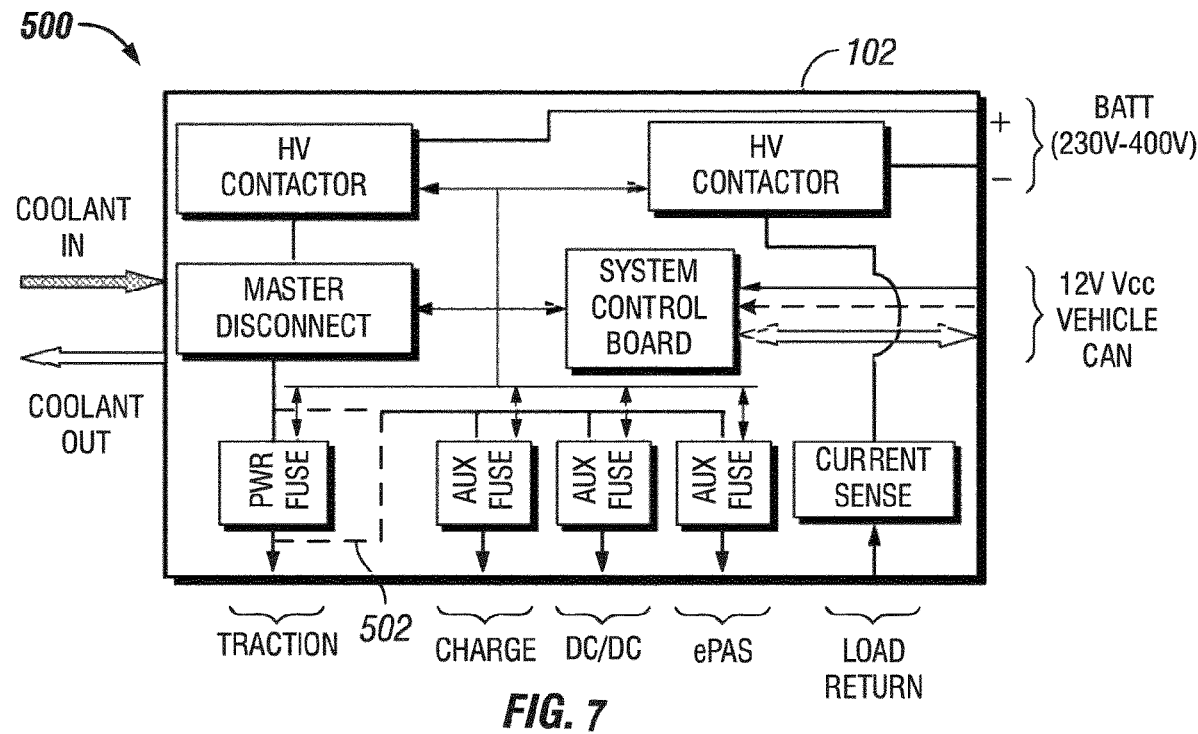
FIG. 7 depicts a non-limiting example system including a PDU.

Referencing FIG. 7, an example system is depicted including a PDU 102. The example PDU 102 has a number of auxiliary power connections (e.g., charging, power steering, vehicle accessories, and a load return for current detection, in the example), and a main motive/traction power connection. The example system 500 includes two high voltage contactors, one for each of the battery high side and low side, where in the example two high voltage contactors are controllable by the system control board but may be additionally or alternatively manual (e.g., a switch accessible by an operator). The system control board additionally can control a master disconnect that can disconnect all power through the PDU 102. The system 500 further depicts a power fuse bypass 502, controllable by the system control board, that supports certain operations of the present disclosure as described throughout. The system 500 depicts a power fuse bypass 502, but may additionally or alternatively include an auxiliary bypass for one or more of the auxiliary fuses, any subset of the auxiliary fuses, and/or for all of the auxiliary fuses together. The example system 500 includes an optional coolant supply and return coupling. The battery coupling in the system 500 depicts a 230V to 400V battery coupling, but the high voltage coupling may be any value. The system control board is depicted as communicatively coupled to a 12V CAN network, although the communicative coupling of the system control board to the surrounding application or system can be any network understood in the art, multiple networks (e.g., vehicle, engine, powertrain, private, public, OBD, etc.), and/or may be or may include a wireless network connection.

Figure 8:
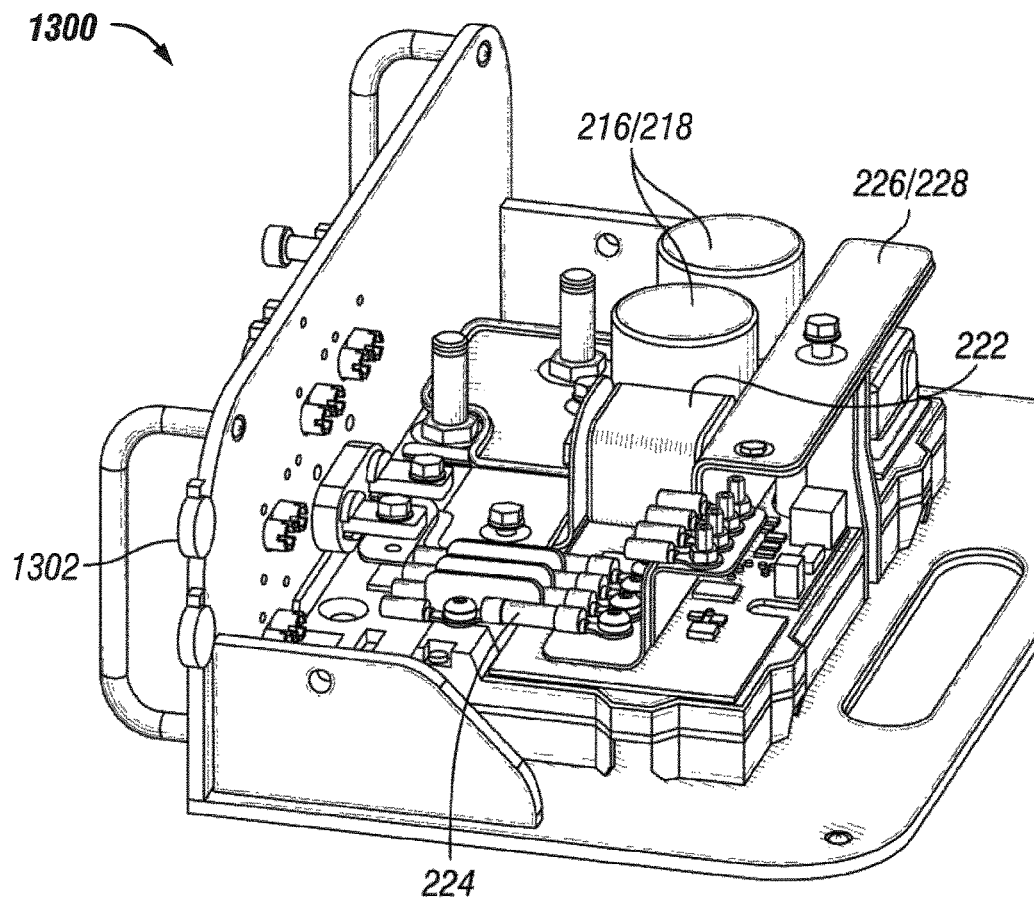
FIG. 8 depicts an embodiment apparatus including all or portions of a PDU.

Referencing FIG. 8, an illustrative apparatus 1300 is depicted, which may include all or portions of a PDU 102. Any descriptions referencing interactions between the main fuse 222 and laminated layers 226/228 herein additionally or alternatively contemplate interactions between any fuses and/or connectors in the apparatus 1300, and/or any other component of a PDU 102 as described throughout the present disclosure. The example apparatus 1300 includes contactors 216/218 which may be high voltage contactors, and/or may be associated with various ones of the fuses 222, 224 in the apparatus 1300. The apparatus 1300 includes laminated layers 226/228, which may include conductive layers for certain aspects of the conductive circuitry in the apparatus 1300. The laminated layers 226/228 may additionally or alternatively provide stiffness and/or structural support for various components in the apparatus 1300. The laminated layers 226/228 may be configured to interact with any components in a manner desired to support the functions of the laminated layers 226/228, including structural functions, heat transfer functions, and/or electrical conductivity functions. The example laminated layers 226/228 interact with all contactors and fuses in the apparatus 1300, although laminated layers 226/228 can readily be configured to interact with selected ones of the contactors and/or fuses, and/or with other components in the apparatus, for example in a manner similar to a printed circuit board (PCB) design. The example apparatus 1300 is positioned on a L-bracket, which may be a final configuration, and/or may be a test configuration. In certain embodiments, the apparatus 1300 is enclosed in a dedicated housing, and/or enclosed in a housing of another device in a system 100—such as the battery housing. In certain embodiments, the apparatus 1300 includes a removable housing portion (e.g., a top portion, lid, etc.) for service and/or maintenance access to the components of the apparatus. The example apparatus 1300 includes connectors 1302—for example to provide power, datalink access, connections to the power source 104, connections to loads 106, connections to sensors (not shown), and/or any other type of connection to the system 100 or otherwise.

Referencing FIG. 9, an example apparatus 1900 for providing additional protection against fuse nuisance faults and system failures is described. The example apparatus 1900, for example implemented on the controller 214, includes a current event determination circuit 1902 that determines a current event 1904 is active or predicted to occur, where the current event includes a component experiencing (or about to experience) a wear event—such as a current value that will cause thermal and/or mechanical stress on the component but may not cause an immediate failure or observable damage. An example component includes the fuse, but may be any other component in the system including a battery cell, a switch or connector, a motor, etc. Another example current event includes a system failure value—for example a current value that will possibly or is expected to cause a system failure (e.g., a cable failure, connector failure, etc.).

The apparatus 1900 further includes a response determination circuit 1906 that determines a system response value 1910 to the current event 1904. Example and non-limiting responses include notifying an operator to reduce power, reducing power, notifying a system controller that a current event 1904 is present or imminent, opening a contactor on the circuit related to the event, delaying circuit protection, monitoring the event and a cause for response delay and responding at a later time, and/or scheduling a response according to an operating condition in the system. The apparatus 1900 further includes a response implementation circuit 1908, where the response implementation circuit 1908 determines communications and/or actuator responses according to the system response value 1910, and provides network communications 1912 and/or actuator commands 1914 to implement the system response value 1910. Example and non-limiting actuator responses include operating a contactor, operating an active coolant actuator to modulate thermal conduction away from the fuse, or the like.

Figure 10:
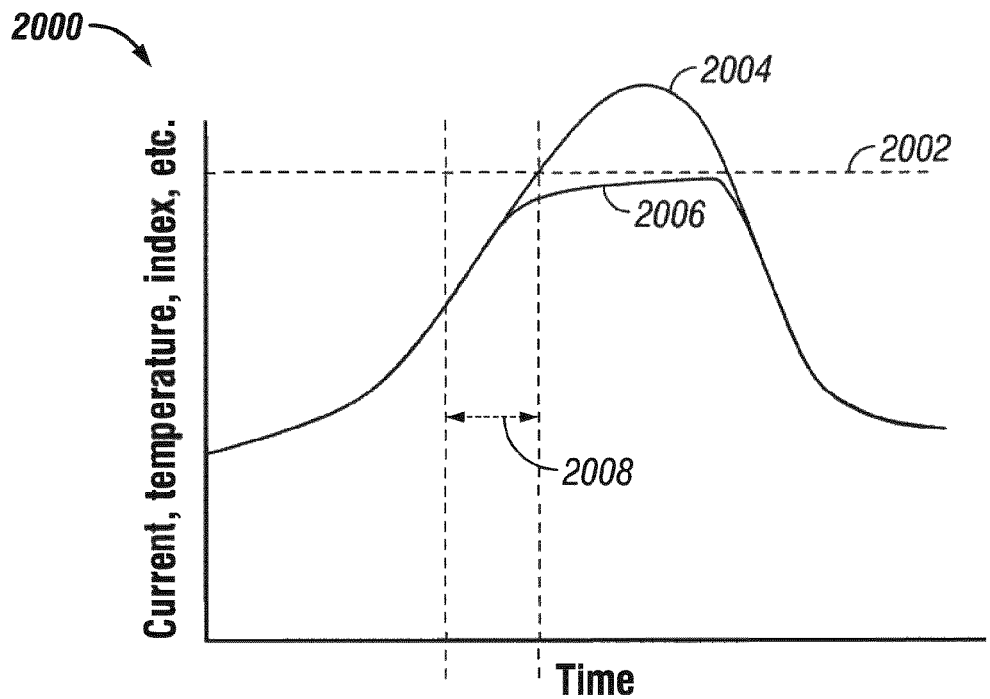
FIG. 10 depicts an embodiment illustrative data for implementing a system response value.

Referencing FIG. 10, illustrative data 2000 for implementing a system response value 1910 is depicted. The illustrative data 2000 includes a threshold value 2002—for example a current, temperature, index parameter, or other value at which component wear and/or system failure is expected to occur, and utilized as a threshold by the current event determination circuit 1902—at least under certain operating conditions at a point in time for the system. It is understood that the current event determination circuit 1902 may utilize multiple thresholds, and/or dynamic thresholds, as described throughout the present disclosure. The curve 2004 represents the nominal system performance, for example the current, temperature, index parameter, or the like that will be experienced by the system in the absence of operations of the apparatus 1900. In the example, the response determination circuit 1906 determines that the threshold value 2002 will be crossed, and accounts for a contactor disconnection time 2008 (and/or an active coolant loop response time), commanding the contactor and/or increasing thermal conduction away from the fuse, in time to avoid crossing the threshold value 2002. The illustrative data 2000 depicts a resulting system response curve 2006, wherein the resulting system performance is kept below the threshold value 2002. The system may experience alternative response trajectories (e.g., the resulting system response curve 2006 may fall well below the threshold value 2002 depending upon the dynamics of the system, how long the contactor is kept open, etc.). Additionally or alternatively, the response determination circuit 1906 may nevertheless allow the threshold value 2002 to be crossed, for example according to any operations or determinations described throughout the present disclosure. In certain embodiments, the response determination circuit 1906 allows the threshold value 2002 to be crossed, but results in a lower peak value of the response, and/or a lower area under the response curve that is above the threshold value 2002, than would occur without the operations of the response determination circuit 1906.

An example procedure, which may be performed by an apparatus such as apparatus 1900, includes an operation to determine that a current event (or other response event) is exceeding or predicted to exceed a wear threshold value, and/or determining that the current event is exceeding or predicted to exceed a system failure value. In response to determining the current event is exceeding or predicted to exceed either value, the procedure includes an operation to perform a mitigating action. The component for the wear threshold value may be a fuse (e.g., the fuse is experiencing or expected to experience a current event that will cause mechanical stress, thermal stress, or high usage of the fuse life), a component in the system (e.g., a contactor, a cable, a switch, a battery cell, etc.), and/or a defined threshold value that is nominally determined (e.g., calibration for a value that is expected to be relevant to possible component damage, without being necessarily tied to a specific component). In certain embodiments, the wear threshold value and/or the system failure value are compensated for the age or wear state of the system or a component in the system (e.g., thresholds are reduced, and/or responses are increased, as the system ages).

Non-limiting mitigating actions, which may be system response values 1910, include, without limitation: 1) disconnecting a circuit having the wear component (e.g., the fuse, system component, and/or the specific power line experiencing the event); 2) notifying an operator to reduce a power request; 3) notifying a vehicle or powertrain controller of the current event; 4) adjusting or limiting available power to the operator; 5) delaying circuit protection (disconnection and/or power reduction) in response to circumstances (e.g., in traffic, moving vehicle, application type, notification from an operator that continued operation is required, etc.)—including allowing a component in the system to experience the underlying wear event and/or failure event; 6) continued monitoring and disconnecting the circuit (or reducing power, etc.) if the event persists and if later conditions allow; 7) scheduling the response according to an operating mode of the system (e.g., sport, economy, emergency, fleet operator (and/or policy), owner/operator (and/or policy), geographic policy, and/or regulatory policy); and/or 8) bypassing the wear component (e.g., bypassing current around a fuse as a response action).

In certain embodiments, the operation to determine that the current event is exceeding the wear threshold value and/or the system failure value is based upon a calculation such as: 1) determining the current through the circuit exceeds a threshold value (e.g., an amp value); 2) determining a rate of change of the current through the circuit exceeds a threshold value (e.g., an amp/second value); and/or 3) determining that an index parameter exceeds a threshold value (e.g., the index including accumulated amp-seconds; amp/sec-seconds; a counting index for periods above a threshold value or more than one threshold value; a counting index weighted by the instantaneous current value; an integrated current, heat transfer, and/or power value; and/or counting down or resetting these based on current operating conditions).

In certain embodiments, the operation to determine that the current event is exceeding the wear threshold value and/or the system failure value includes or is adjusted based upon one or more of: 1) a trip curve (e.g., a power-time or current-time trajectory, and/or an operating curve on a data set or table such as that represented in FIG. 5); 2) a fuse temperature model, including a first or second derivative of the temperature, and one or more temperature thresholds for scheduled and/or escalating response; 3) a measured battery voltage (e.g., current values may be higher as battery voltage lowers, and/or dynamic response of current may change causing changes for the wear threshold value, system failure value, and/or current event determination); 4) a first derivative of current, temperature, power demand, and/or an index parameter; 5) a second derivative of current, temperature, power demand, and/or an index parameter; 6) information from a battery management system (e.g., voltage, current, state of charge, state of health, rate of change of any of these, which parameters may affect current values, expected current values, and/or dynamic response of current values, causing changes for the wear threshold value, system failure value, and/or current event determination); 7) determination of and monitoring of contactor disconnect times, and accounting for the contactor disconnect time in determining the response to the current event; 8) utilizing ancillary system information and adjusting the response (e.g., a power request from operations that is expected to create an upcoming change, a supplemental restraint system active/deploying—open contactors (cut power); collision avoidance system active—keep contactors closed for maximum system control; and/or an anti-lock brake system and/or traction control system active—keep contactors closed for maximum system control). In certain embodiments, a degree of activation may also be considered, and/or system status may be communicated to the PDU—for example, the system may report critical operation requiring power as long as possible, or shut-down operations requiring power to be cut as soon as possible, etc.

Figure 11:
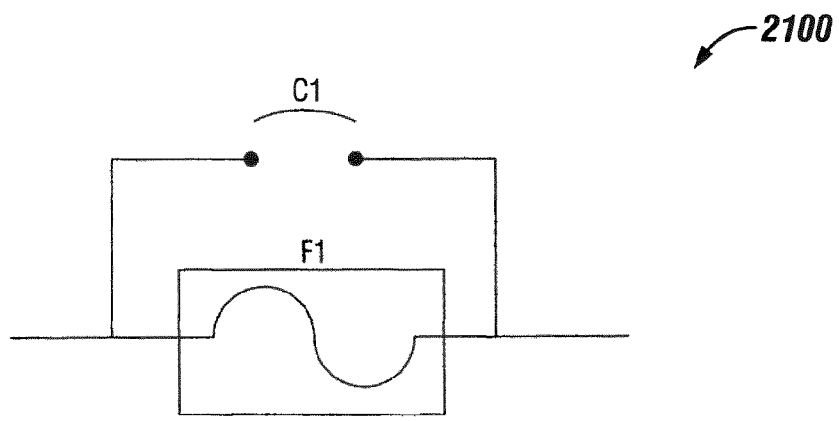
FIG. 11 depicts a non-limiting example fuse circuit that may be present on a PDU.

Referencing FIG. 11, an example fuse circuit 2100 is depicted, which may be present on a PDU 102. The example fuse circuit 2100 may be associated with a main fuse, an auxiliary fuse, and/or a group of fuses or a subset of a group of fuses. The fuse circuit 2100 includes a contactor (C1) in parallel with the fuse (F1). During normal operations the contactor is open, and the current in the fuse circuit 2100 passes through the fuse. In certain embodiments, the contactor may include physical components (e.g., a solenoid and/or coil-based switch or relay), and/or the contactor may be a solid state relay. In certain embodiments, the contactor may be normally-open (e.g., power applied closes the contactor) or normally-closed (e.g., power applied opens the contactor). The example fuse circuit 2100 allows for the contactor to selectively bypass the fuse circuit, for example in accordance with operations of an apparatus 1900 (reference FIG. 9 and the corresponding disclosure).

Figure 12:
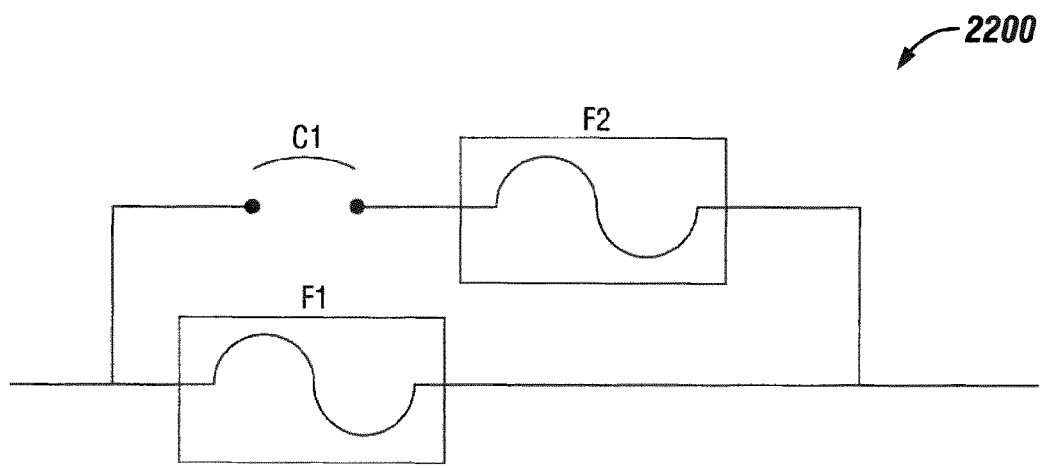
FIG. 12 depicts an embodiment of a fuse circuit with a contactor.

Referencing FIG. 12, another embodiment of a fuse circuit 2200 is disclosed, with a contactor (C1) in series with a second fuse (F2), and the C1-F2 branch in parallel with a first fuse F1. The fuse circuit 2200 provides for additional flexibility and a number of additional features for operations of an apparatus 1900. For example, normal operation may be performed with the contactor closed, dividing current between F1 and F2 (in the resistance ratios of the two fuses). An example includes a fuse F2 with a low current threshold value, set such that the divided current would fail fuse F2 if the system design current is exceeded by a designed amount (e.g., between 135% and 300% of system design current—although any value is contemplated herein). The fuse F1 may be set at a very high value, allowing for the opening of the contactor to briefly increase the fusing capacity of the circuit but still be fused. Additionally or alternatively, fuse F2 may be a relatively cheap and/or accessible fuse, and being at a lower current threshold F2 is likely to suffer greater mechanical and thermal fatigue, and act as the failure point for the fuse circuit 2200, which may greatly extend the life of the fuse F1 which may be more expensive and/or less accessible. Additionally or alternatively, normal operation may be performed with the contactor open, with fuse F1 defining the ordinary fusing of the circuit. When a high transient or other current event occurs, the contactor is closed, and the branch C1-F2 shares the current load, keeping the fuse F1 within normal or lower wear operating conditions. In certain embodiments, fuses F1 and F2 may be similarly sized—for example to allow fuse F2 to operate as a backup fuse and to keep similar failure conditions in place for F1 and F2. Alternatively, fuse F2 may be smaller than fuse F1, allowing for alternate operations as described, the intermittent use of the C1-F2 circuit to take up some current to protect fuse F1, and/or to provide back-up fusing for F1—which may be at a reduced power limit for the system if the fuse F2 is smaller (e.g., as a de-rated mode of operation, and/or a limp-home mode of operation). Alternatively, fuse F2 may be larger than fuse F1, for example to allow fuse F2 to manage very high transient current conditions where it is desired that operation still continues. The utilization of a fuse circuit 2200 allows for a high degree of control of the fusing system, to be protective of the power system during nominal operation and still provide a high degree of capability during failure modes, for off-nominal operation, and/or during transient operation. In certain embodiments, a resistor may be provided on the C1-F2 branch, for example to control the current sharing load between F1 and F2 when the contactor C1 is closed.

Figure 13:
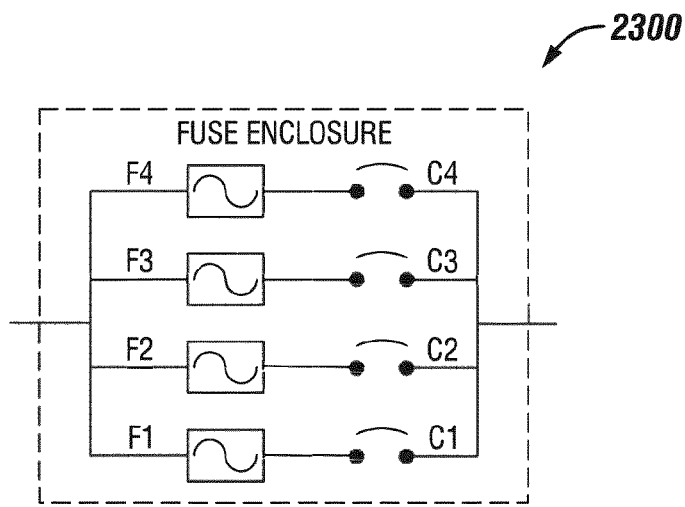
FIG. 13 depicts an embodiment fuse circuit including a plurality of fuses.

Referencing FIG. 13, a fuse circuit 2300 includes a plurality of fuses F1, F2, F3, F4 depicted in parallel, with a corresponding contactor in series with each. An example fuse circuit 2300 is for auxiliary fuses, although fuse circuit 2300 can be any fuse, including a main fuse. The example fuse circuit 2300 allows for either the removal of fuses from operation—for example where one of the fuses is experiencing a transient event—or for the addition of fuses, such as when a high transient event occurs to share the current load. In certain embodiments, one or more of the fuses in the fuse circuit 2300 does not have an associated contactor, and is a primary load bearing fuse for the fuse circuit 2300. The relative sizing of the fuses in the fuse circuit 2300 may be according to any selected values, and will depend upon the purpose of the fuse circuit 2300 (e.g., to provide a limp-home feature, to provide additional capacity, to act as a back-up, and/or to allow for the cut-off of individual fuses in the system). Additionally or alternatively, any one or more of the fuses in fuse circuit 2300 may be positioned serially with a resistor, for example to control current load balancing. In certain embodiments, the fuses F1, F2, F3, F4 are not in parallel, and/or one or more of the fuses is not in parallel. Accordingly, the opening of a contactor for such a fuse will not shunt current to another one of the fuses. An example embodiment includes the contactors for fuses individually to allow for shutting down of certain system capability (e.g., due to a failure, high transient, or the like) without shutting down all system capability (e.g., a fuse supporting braking may remain active even in a high transient event, while an accessory fuse for non-critical systems may be cut off to protect the fuse and/or the system).

Figure 14:
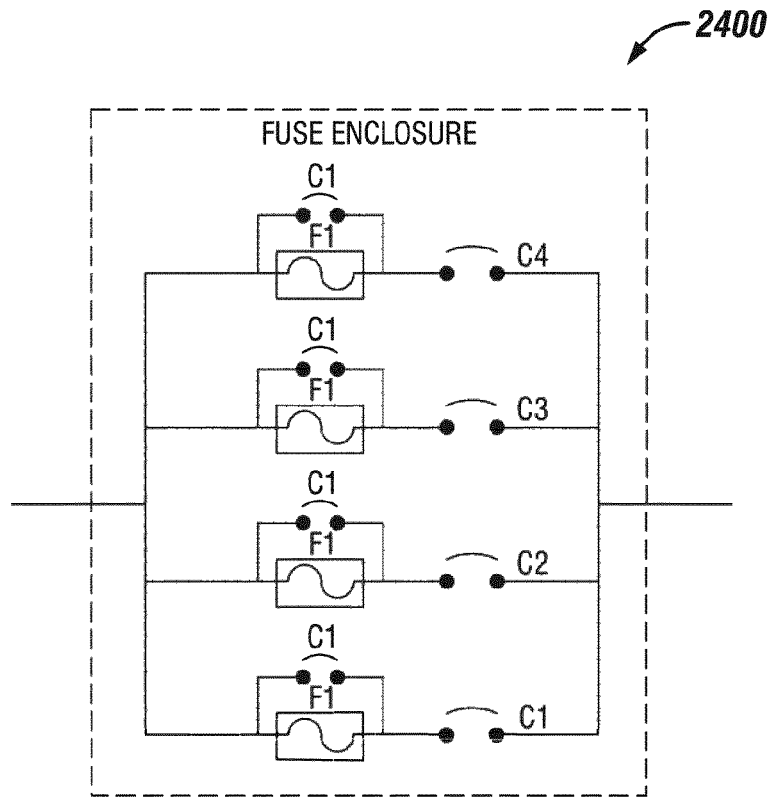
FIG. 14 depicts a fuse circuit with fuses in parallel with a contactor.

Referencing FIG. 14, a fuse circuit 2400 is depicted, similar to fuse circuit 2300, except that each fuse has a contactor in parallel, allowing for the shorting of the particular fuse while keeping current flowing on that fuse's path. In certain embodiments, the parallel path for each fuse may include an additional fuse and/or a resistor, such that when the fuses are connected in parallel, the load across each fuse circuit remains at least partially balanced. The embodiments of FIGS. 11 to 14 may be referenced as current protection circuits, and embodiments such as those depicted in FIGS. 11 to 14, and/or as described, allow for selectable configuration of the current protection circuit. Selectable configuration of the current protection circuit may include run-time operations (e.g., reconfiguring the current protection circuit in response to events or operating conditions)

and/or design-time operations (e.g., allowing a same hardware device to support multiple power ratings, electrical connection configurations, and/or service event or upgrade changes).

Figure 15:
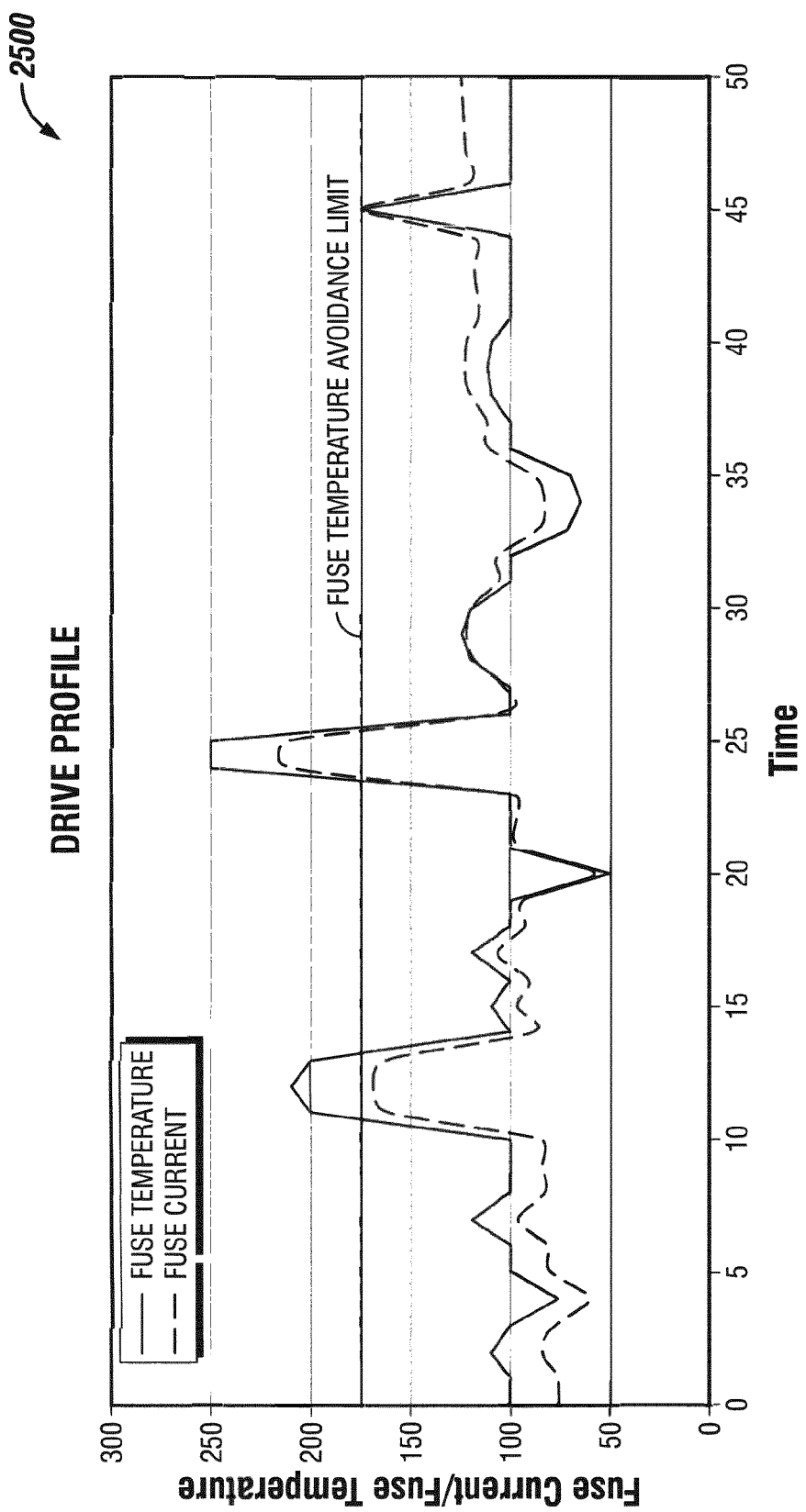
FIG. 15 depicts illustrative data showing a fuse response to a drive cycle for a vehicle.

Referencing FIG. 15, illustrative data 2500 showing a fuse response to a drive cycle for a vehicle is depicted. In the example, fuse current (e.g., the dashed line lower curve at times of 12 and 25 units) and fuse temperature (e.g., the solid line upper curve at times of 12 and 25 units) are depicted. It will be understood that another parameter describing the fuse performance and/or limits may be utilized, including at least any values described in the portion referencing FIG. 10. The operations of the drive cycle exhibit high transients where, in the example, the fuse temperature is expected to exceed the "fuse temperature avoidance limit"—for example, a temperature or temperature transient at which the fuse experiences mechanical stress. An apparatus 1900 may consider a number of thresholds for the fuse—for example a light wear threshold, a heavy wear threshold, and a potential failure threshold, which may be set at distinct values of the fuser performance indicator being utilized (e.g., temperature). In certain embodiments, more than one type of threshold value may be utilized—for example a threshold or set of thresholds for temperature, a second threshold or set of thresholds for temperature change with time (e.g., dT/dt), etc. In the example, an apparatus 1900 may take mitigating action at the transient points, for example bypassing the corresponding fuse briefly to avoid the transient and/or control the rate of transient experienced by the fuse.

Figure 16:
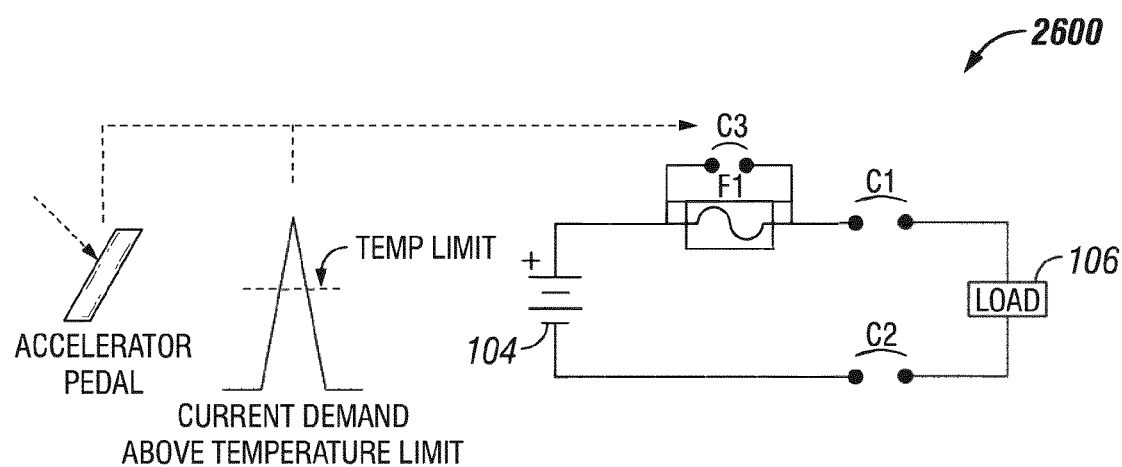
FIG. 16 depicts a non-limiting example system including a power source and s load with a fuse electrically disposed between the load and the source.

Referencing FIG. 16, an example system 2600 include the power source 104 and load 106, with a fuse (F1) electrically disposed between the load 106 and the source 104. An operator provides a power request (accelerator pedal input), and an apparatus 1900 determines that the load request will exceed a threshold for the fuse (e.g., according to the current demand above temperature limit, or some other determination) but may further determine that the transient event will not otherwise exceed system operating condition limits. In the example, apparatus 1900 commands the contactor (C3) to close for a period of time before or during the transient to protect the fuse. The system 2600 depicts the high-side (C1) and low-side (C3) high voltage contactors (e.g., 216, 218 from system 100), which are distinct from the fuse bypass contactor C3.

Referencing FIG. 10, illustrative data 2000 for implementing a system response value 1910 is depicted. The illustrative data 2000 includes a threshold value 2002—for example a current, temperature, index parameter, or other value at which fuse wear and/or failure is expected to occur, and utilized as a threshold by the current event determination circuit 1902—at least under certain operating conditions at a point in time for the system. It is understood that the current event determination circuit 1902 may utilize multiple thresholds, and/or dynamic thresholds, as described throughout the present disclosure. The curve 2004 represents the nominal system performance, for example the current, temperature, index parameter, or the like that will be experienced by the fuse in the absence of operations of the apparatus 1900. In the example, the response determination circuit 1906 determines that the threshold value 2002 will be crossed, and accounts for a contactor connection/disconnection time 2008 (e.g., to bypass the fuse, engage a second fuse branch, and/or close off a more vulnerable fuse branch), commanding the contactor to connect or disconnect in time to avoid crossing the threshold value 2002. Additionally or alternatively, the response determination circuit 1906 may nevertheless allow the threshold value 2002 to be crossed, for example according to any operations or determinations described throughout the present disclosure—for example when a more critical system parameter requires the fuse to remain connected, and the fuse is allowed to experience the wear and/or failure event.

In certain embodiments, the operation to determine that the current event is exceeding the wear threshold value and/or the fuse failure value is based upon a calculation such as: 1) determining the current through the fuse exceeds a threshold value (e.g., an amp value); 2) determining a rate of change of the current through the fuse exceeds a threshold value (e.g., an amp/second value); 3) determining that an index parameter exceeds a threshold value (e.g., the index including accumulated amp-seconds; amp/sec-seconds; a counting index for periods above a threshold value or more than one threshold value; a counting index weighted by the instantaneous current value; an integrated current, heat transfer, and/or power value; and/or counting down or resetting these based on current operating conditions).

In certain embodiments, the operation to determine that the current event is exceeding the wear threshold value and/or the fuse failure value includes or is adjusted based upon one or more of: 1) a trip curve (e.g., a power-time or current-time trajectory, and/or an operating curve on a data set or table such as that represented in FIG. 5); 2) a fuse temperature model, including a first or second derivative of the temperature, and one or more temperature thresholds for scheduled and/or escalating response; 3) a measured battery voltage (e.g., current values may be higher as battery voltage lowers, and/or dynamic response of current may change causing changes for the wear threshold value, system failure value, and/or current event determination); 4) first derivative of current, temperature, power demand, and/or an index parameter; 5) second derivative of current, temperature, power demand, and/or an index parameter; 6) information from a battery management system (e.g., voltage, current, state of charge, state of health, rate of change of any of these, which parameters may affect current values, expected current values, and/or dynamic response of current values, causing changes for the wear threshold value, fuse failure value, and/or current event determination); 7) determination of and monitoring of contactor connection or disconnection times, and accounting for the contactor connection or disconnection time in determining the response to the current event; 8) utilizing ancillary system information and adjusting the response (e.g., collision avoidance system active—allow the fuse to fail, and/or bypass the fuse allowing potential damage to the system, to keep power flowing; anti-lock brake system and/or traction control system active—keep power flowing for maximum system control (degree of activation may also be considered, and/or system status communicated to the PDU—for example the system may report critical operation requiring power as long as possible, or shut-down operations requiring power to be cut as soon as possible, etc.)).

Referencing FIG. 9, an example apparatus 1900 to reduce or prevent fuse damage and/or a fuse failure is depicted. The example apparatus 1900 includes a current event determination circuit 1902, which may determine that current event 1904 indicates that a fuse threshold value (wear, failure, fatigue, or other threshold value) is exceeded or is predicted to be exceeded. The current event 1904 may be a current, temperature, or any other parameter described, for example, in relation to FIGS. 10, 15, and 16. The example apparatus 1900 further includes a response determination circuit 1906 that determines a system response value 1910—for example opening or closing one or more contactors in a fuse circuit (e.g., 2100, 2200, 2300, 2400, or any other fuse circuit or current protection circuit). The apparatus 1900 further includes a response implementation circuit 1908 that provides network communications 1912 and/or actuator commands 1914 in response to the system response value 1910. For example, the system response value 1910 may determine to close one or more contactors, and the actuator commands 1914 provides commands to the selected contactors which are responsive to the actuator commands 1914.

In certain embodiments, operations to bypass and/or engage one or more fuses are performed in coordination with a vehicle battery management system and/or an accelerator pedal input (or other load request indicator)—for example to time inrush currents that would be experienced on the fuses, to provide an indication to the battery management system or other vehicle power systems that momentary un-fused operation is going to occur, and/or that a higher fuse limit will be briefly applicable. In certain embodiments, during un-fused operation and/or higher fuse limit operation, the apparatus 1900 may operate a virtual fuse—for example if the experienced current is higher than predicted (e.g., it was predicted to exceed a fuse wear limit but be less than a system failure limit, but in fact appears that a system failure limit will be exceeded), the apparatus 1900 may operate to open a main high voltage contactor, re-engage the fuse, or make another system adjustment to protect the system in the absence of ordinarily available fusing operations.

Figure 17:
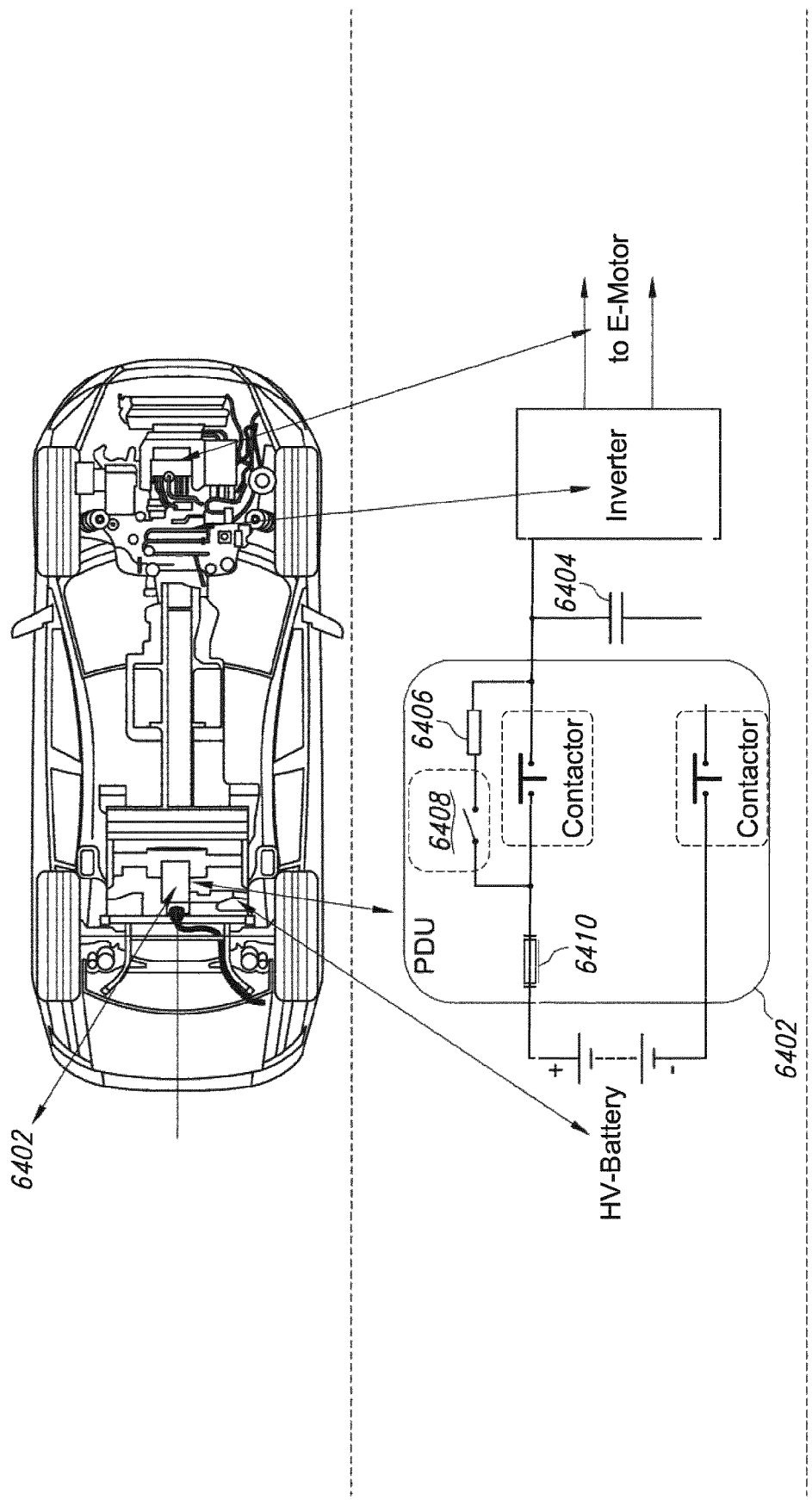
FIG. 17 depicts a schematic diagram of a vehicle having a PDU.

Referencing FIG. 17, an example previously known system is depicted having a contactor and fuse combination. The example system, for purposes of illustration, is provided as a part of a power distribution unit (PDU) 6402 for an electric or partially electric vehicle. The system includes electrical storage (e.g., a battery) and a motor providing motive power for the vehicle. The electrical storage (or power storage) device may be of any type, including a battery, a fuel cell, and/or a capacitor (e.g., a super-capacitor or a hyper-capacitor), and combinations of these (e.g., a capacitor included in the circuit to assist in peak power production or management of transient operations). In certain embodiments, the electrical storage device is rechargeable (e.g., any rechargeable battery technology such as lithium ion, nickel metal-hydride, or nickel-cadmium) or recoverable (e.g., a chemical based fuel cell having reversible chemistry to recover charge generating capability). In the example system, the battery operates as a DC device and the motor operates as an AC device, with an inverter positioned therebetween to condition power for the motor. The example system includes filter capacitors 6404 providing conditioning for the main power circuit. The example system includes a low side contactor and a high side contactor. The high side contactor is in series with a fuse 6410 providing overcurrent protection for the circuit. The example system further includes a pre-charge circuit, depicted as a pre-charge relay 6408 and a pre-charge resistor 6406. In certain embodiments, the pre-charge relay 6408 is engaged before the high side contactor is engaged, allowing capacitive elements of the overall circuit to energize through the pre-charge resistor 6406, limiting in-rush currents or other charge-up artifacts on system start-up. It can be seen that overcurrent protection is provided by the system through the fuse 6410, and the characteristics of the fuse 6410 set the overcurrent protection for the motive circuit through the PDU. Additionally, the contactors are exposed to connection and disconnection events, including arcing, heating, and other wear.

Figure 18:
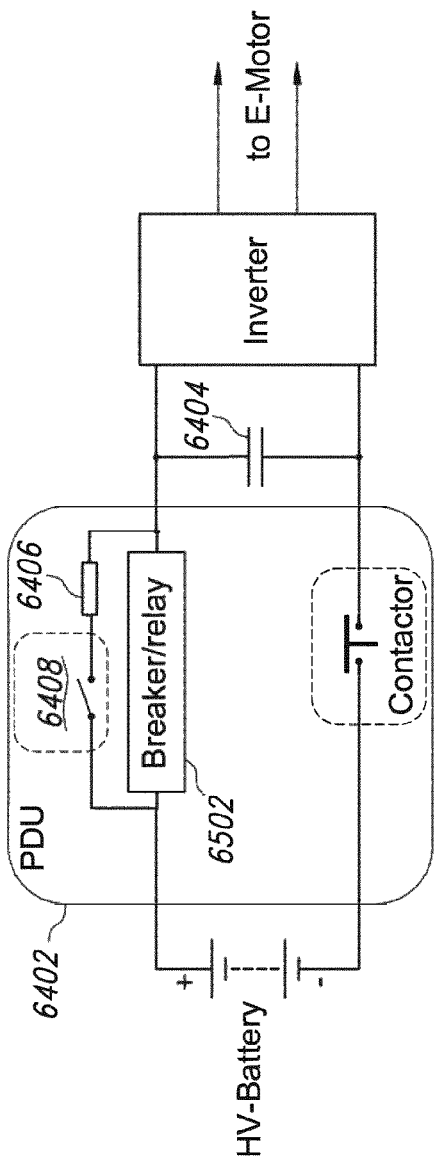
FIG. 18 depicts a schematic diagram of a breaker/relay and pre-charge relay.

Referencing FIG. 18, an example PDU 6402 of the present disclosure is schematically depicted. The example PDU 6402 is utilizable in a system such as that depicted in FIG. 17. The example PDU of FIG. 18 includes a breaker/relay 6502 component on the high side. The example arrangement of FIG. 18 is non-limiting, and any arrangement of the breaker/relay 6502 that provides designed overcurrent protection for a system using any of the principles described throughout the present disclosure is contemplated herein. The example PDU 6402 of FIG. 18 omits a fuse in series with a contactor, utilizing the breaker/relay 6502 for overcurrent protection. Any breaker/relay 6502 as described throughout the present disclosure may be utilized in a system such as that depicted in FIG. 18. The PDU 6402 of FIG. 18 additionally utilizes a pre-charge relay 6408 and a pre-charge resistor 6406, similar to that depicted in FIG. 17. In the example of FIG. 18, the breaker/relay 6502 is in parallel with the pre-charge circuit, and the relay portion of the breaker/relay 6502 may be engaged after the system has charged through the pre-charge circuit. As described throughout the present document, the breaker/relay 6502 provides for continuous and selectable overcurrent protection, while providing for full rated operation throughout range of designed operating current for the system. In previously known systems, a contactor/fuse arrangement necessarily provides for a gap in the operating range, either pushing fuse activation at least partially down into the operating current range, or moving fuse activation away from the rated range and providing for a gap in overcurrent protection above the rated current for the system. Additionally, as described throughout the present disclosure, the breaker/relay 6502 can provide for multiple current protection regimes, selectable current protection based on operating conditions, and provides for reduced wear on the contact elements of the breaker/relay relative to previously known contactors. Accordingly, a system such as that depicted in FIG. 18 can provide reliable, responsive, and recoverable overcurrent protection relative to previously known systems.

Figure 19:
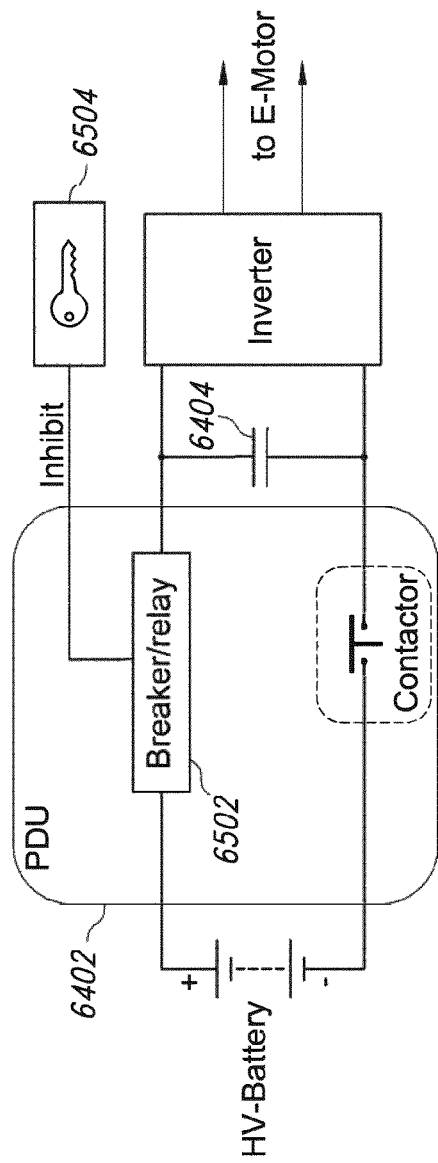
FIG. 19 depicts a schematic diagram of a breaker/relay and inhibit.

Referencing FIG. 19, an example PDU 6402 is schematically depicted. The example PDU 6402 is utilizable in a system such as that depicted in FIG. 1, and has features that may be additional to or alternative to features described with regard to FIG. 18. The example of FIG. 19 depicts an external input to the breaker/relay 6502 (Inhibit, with a schematic depiction of a keyswitch input 6504, in the example). The breaker/relay 6502 is responsive to the external signal in a configurable manner. For example, a keyswitch ON operation may be utilized to energize the breaker/relay 6502—either directly (e.g., hard-wiring the keyswitch circuit through a coil of the breaker/relay) or indirectly (e.g., receiving a network value representing the keyswitch position, receiving a voltage signal representing the keyswitch position, etc.), thereby charging the motive power circuit. In another example, a keyswitch OFF operation may be utilized to de-energize the breaker/relay 6502, thereby removing power from the motive power circuit. The external signal may be of any type or of several types, including external commands generated from any portion of the system, calculated values indicating whether power should be supplied or cut (e.g., a service event, a maintenance event, an accident indicator, an emergency shutdown command, a vehicle controller request, a device protection request for some device on the vehicle, a calculation that a temperature, voltage value, or current value has exceeded a threshold, etc.). The external signal may be supplied as a hard-wired signal (e.g., an electrical connection with a voltage representing the signal value), and/or as a communication (e.g., a datalink or network communication) which may be a wired or wireless communication, and may be generated by a controller on the PDU 6402 or external to the PDU 6402 (e.g., a vehicle controller, a power management controller, or the like). The example of FIG. 19 does not depict a pre-charge circuit for convenience of illustration, but embodiments such as those depicted in FIG. 18 or FIG. 19 may have a pre-charge circuit or omit a pre-charge circuit depending upon the characteristics of the system, the design goals and requirements for the system, and the like.

Figure 20:
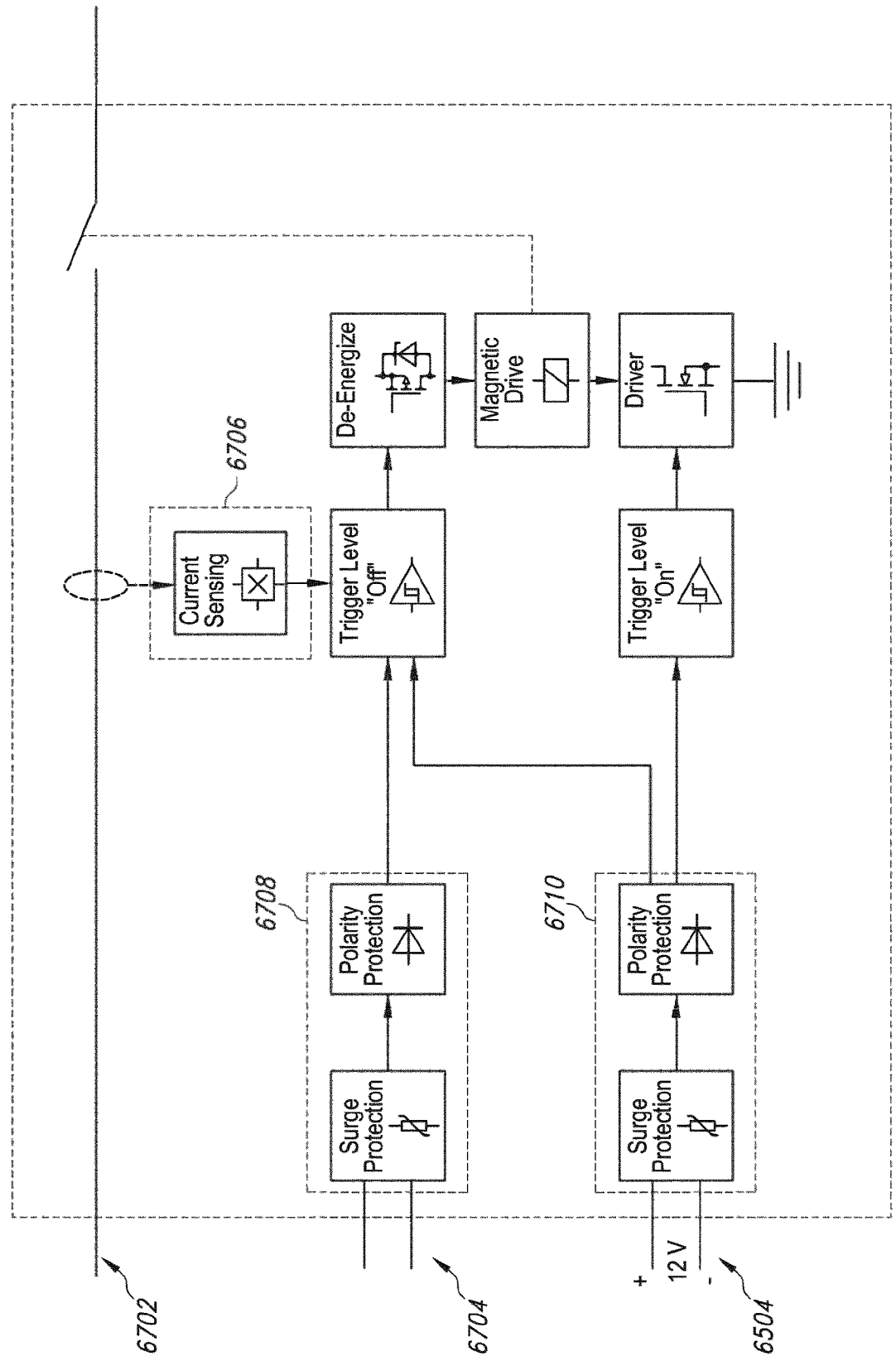
FIG. 20 depicts a schematic diagram of a power bus protection configuration.

Referencing FIG. 20, an example schematic block diagram of a breaker/relay is depicted. The example breaker/relay of FIG. 20 includes a power bus 6702 (e.g., the high voltage, motive power, load power, etc.) that operates the high voltage throughput and is connected or disconnected through a contact which is schematically depicted. A voltage that is a "high voltage" on the power bus may be any value, and depends upon the load being driven and other selection parameters for the system. In certain embodiments, a high voltage is any voltage above 42V, above 72V, above 110V, above 220V, above 300V, and/or above 360V. The voltage range may be different for a motive power load versus an auxiliary load (e.g., a PTO device, pump, or the like) and may be higher or lower than these ranges. In the example, the standard on/off 6504 or control voltage is depicted on the left side (depicted as 12 V, although any value such as 6 V, 12 V, 24 V, 42 V may be utilized). The standard voltage 6504 is depicted for purposes of illustration, although the standard voltage may additionally or alternatively be a datalink or network input (e.g., where the breaker/relay has independent access to control power) in communication with a controller of the breaker/relay. In certain embodiments, the standard voltage 6504 will be the same voltage as experienced at the keyswitch, by a vehicle controller, by auxiliary (e.g., non-motive or non-load) components in a system, or the like. In certain embodiments, the standard voltage 6504 will be the keyswitch 6504 signal. The standard voltage 6504 may be configured to be received through an input control isolation 6710.

Further in the example of FIG. 20, an auxiliary off isolation 6708 is depicted, which provides an input for auxiliary control of the breaker/relay. In certain embodiments, the auxiliary off isolation 6708 is coupled to an electrical input 6704, such as a selectable input at the standard voltage, an output from a controller (e.g., the controller providing electrical power as an output at a selected voltage to the auxiliary off isolation). In certain embodiments, the auxiliary off isolation 6708 may utilize a datalink or network input. In certain embodiments, for example where the breaker/relay has an internal controller, the standard on/off 6504 and the auxiliary off isolation input 6704 may be the same physical input—for example where a datalink input, network input, and/or controllable electrical signal (e.g., a controlled voltage value) provide the breaker/relay with information to determine the current requested state of the breaker/relay. In certain embodiments, the breaker/relay is a hardware only device that accepts a first voltage value at the standard on/off position, a second voltage value at the auxiliary off position, and responds through the hardware configuration of the breaker/relay to perform selected operations.

In the example of FIG. 20, the standard on/off input 6504 and the auxiliary off input 6704 include circuit protection components (e.g. isolations 6708, 6710), such as surge protection and polarity protection. The example breaker/relay includes a logic circuit that provides for energizing the relay (closing the contact on the power bus) when the standard on/off input 6504 is high, and de-energizing the relay (opening the contact on the power bus) when either the standard on/off input 6504 is low or the auxiliary off input is low 6704. In the example of FIG. 20, the logic circuit is depicted schematically, and may be implemented as hardware elements in the breaker/relay. Additionally or alternatively, a controller in the breaker/relay may interpret input voltages, datalink signals, and/or network communications to implement the logic and determine whether to open or close the relay. The logic in the present system is depicted as a "normally-open" relay that utilizes power to close (make contact), although the breaker/relay may be configured as a "normally-closed", latching, or any other logical configuration. Additionally or alternatively, the standard on/off inputs 6504 and/or the auxiliary off inputs 6704 may utilize logical highs or logical lows to implement operations of the breaker/relay.

The example breaker/relay of FIG. 20 additionally depicts a current sensing device 6706 ("current sensing") which may be a current sensor on the bus, a calculated current value based on other system parameters, a current value passed to the breaker/relay and/or a controller operatively coupled to the breaker/relay, or any other device, mechanism, or method to determine current values on the bus. In the example of FIG. 20, the current sensing device 6706 is coupled to the "trigger level 'off'" portion of the logical circuit, and operates to de-energize the relay when a high current value is sensed. The sensed high current value may be either a single threshold, for example as determined by the hardware in the logic circuit, and/or a selectable threshold, for example determined by a controller based on operating conditions or other values in the system. It can be seen that, either through hardware or utilizing a controller, functions of the sensed current value such as a rate of change, accumulated current value over a threshold, etc. may be utilized additionally or alternatively to the single sensed current value. It can be seen that a breaker/relay such as that depicted in FIG. 20 provides for controllable opening of the power bus circuit at a selected threshold current value and/or functions thereof, allowing for continuous operation throughout the range of rated current for the system. Additionally, a breaker/relay such as that depicted in FIG. 20 provides for a controllable disconnection of the power bus for any selected parameter which may not be current related, such as emergency shutdown operations, a request from somewhere else in the system (e.g., a vehicle controller), service or maintenance operations, or any other selected reason. Certain embodiments throughout the present disclosure provide for additional features of the breaker/relay, any one or more of which may be included in an embodiment such as that depicted in FIG. 20.

Figure 21:
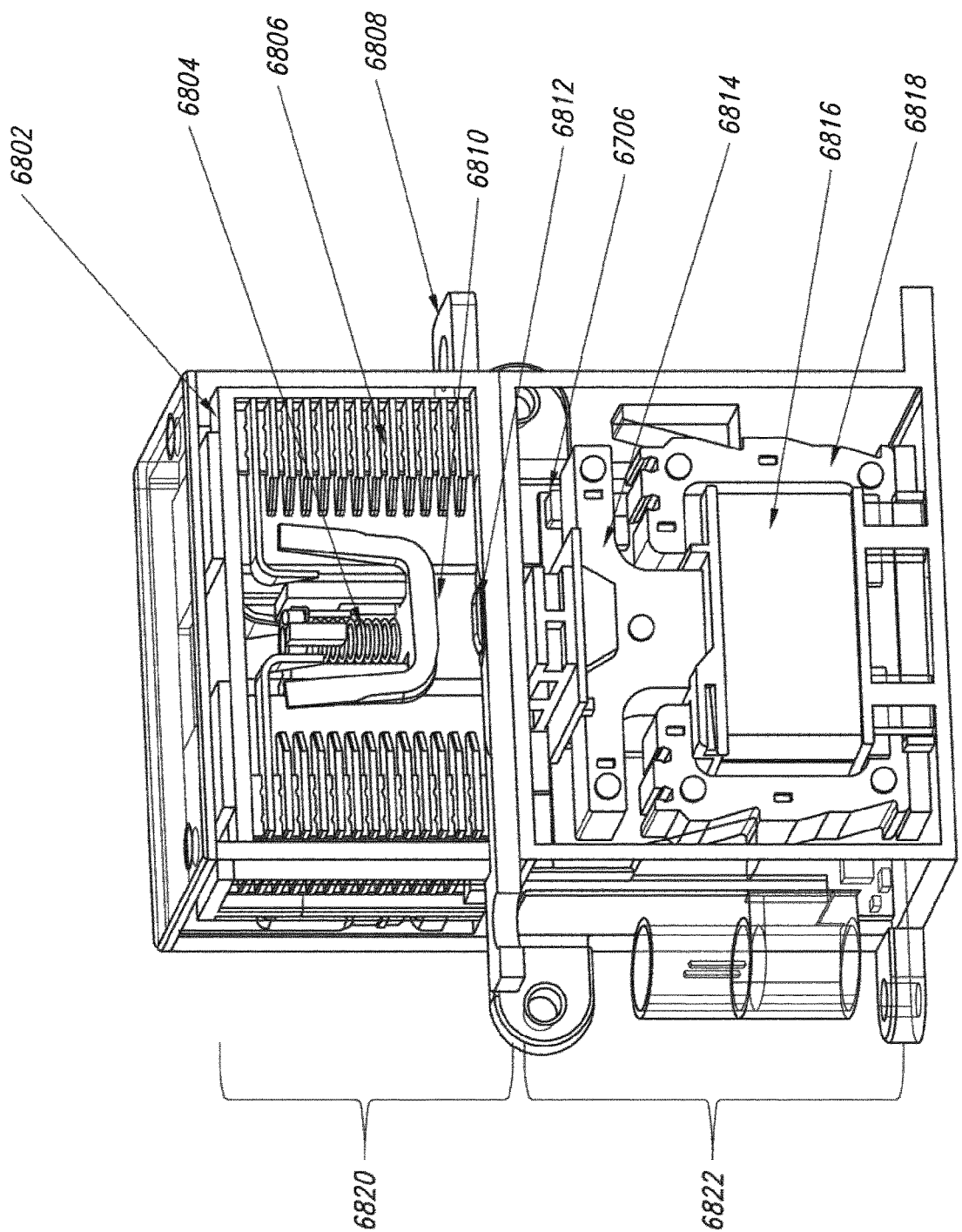
FIG. 21 depicts an embodiment detail of a breaker/relay component.

Referencing FIG. 21, an example breaker/relay is depicted schematically in a cutaway view. The example breaker/relay includes generally a switching portion 6820 (upper half, or "breaker") and an actuating portion 6822 (lower half, or "relay"). A few example components of the breaker/relay are depicted and described for illustration. The example breaker/relay includes a coil 6816 and magnet core 6818 in the relay portion. In the example, energizing the coil 6816 actuates the relay, pulling the armature 6814 down to the magnet core 6818. The armature 6814 is coupled to the movable contact 6810 in the upper portion, and is thereby moved into contact with the fixed contact 6812, completing the circuit and allowing current flow through the power bus.

In the example of FIG. 21, the movable contact 6810 is pressed into the fixed contact 6812 by a contact force, which is a biasing spring 6804 of a selectable biasing force in the example of FIG. 21. The movable contact 6810 can be lifted from the fixed contact 6812 with sufficient force, compressing the contact force spring 6804, even if the armature 6814 is in the engaged (lower) position. The example of FIG. 21 depicts the armature 6814 in the disengaged (upper) position, where the movable contact 6810 is open or not in contact with the fixed contact 6812.

The breaker portion 6820 of the breaker/relay includes a number of splitter plates 6806 in proximity to a body of the main contact, and a permanent magnet system 6802 surrounding the splitter plates 6806 and/or the arcing path between the contact gap and the splitter plates 6806. During engagement or disengagement of the movable contact 6810 when the power bus is energized, the body of the main contact cooperates with the splitter plates 6806, in the presence of the magnetic fields provided by the permanent magnet system 6802, to dissipate and distribute the resulting arc, greatly reducing wear, degradation, and damage of the contacts. It has been shown that the combined aspects of the breaker portion greatly extend the life of the contacts and the switching chamber (e.g., due to lower arcing heat load over the life of the breaker/relay).

The current passing through the power bus generates a repulsive force between the contacts, or a Lorentz force. The Lorentz force is a complex function of the contact area of the contacts and the current value through the power bus. When the current is very high, the Lorentz force between the contacts sufficiently compresses the contact force spring 6804 to force the movable contact 6810 to lift off of the fixed contact 6812 and cause the relay to momentarily open. It has been found that the contact force spring 6804 can be readily tuned to provide for a physical disconnect of the contacts at a selectable value. Additionally or alternatively, the contact area between the contacts and other geometric aspects of the contacts can be manipulated to select or adjust the physical disconnect current. However, in certain embodiments, selection of the contact force spring 6804 provides for a straightforward tuning of the physical disconnect current. In certain embodiments, selection of the contact force spring 6804 includes changing the spring to change the physical disconnect current. Additionally or alternatively, the contact force spring 6804 can be adjusted in situ (e.g., compressing or releasing the spring axially) to adjust the physical disconnect current.

In certain embodiments, after the physical disconnect event (e.g., the movable contact 6810 is forced away from the fixed contact 6812, compressing the contact force spring 6812, while the armature 6814 is in the lower or contact position), the current through the power bus falls rapidly, and the Lorentz force decreases, causing the movable contact 6810 to be pushed by the contact force spring 6804 back toward an engaged position. In certain embodiments, the current sensor 6706 will have detected the high current event, triggering the coil 6816 to de-energize, and moving the armature 6814 back up to the disengaged position. Accordingly, as the movable contact 6810 returns to the engaged position, the armature 6814 has already moved it away such that the movable contact 6810 does not touch the fixed contact 6812 after a physical disconnect event. In certain embodiments, the threshold detected by the current sensor 6706 to disengage the armature 6814 is lower than the physical disconnect current, giving the armature 6814 a "head start" and decreasing the likelihood of a re-contact of the movable contact 6810 with the fixed contact 6812. In many systems, a re-contact between the movable contact 6810 and the fixed contact 6812 during a very high current event can result in significant damage to the breaker/relay and/or welding of the contacts.

Figure 22:
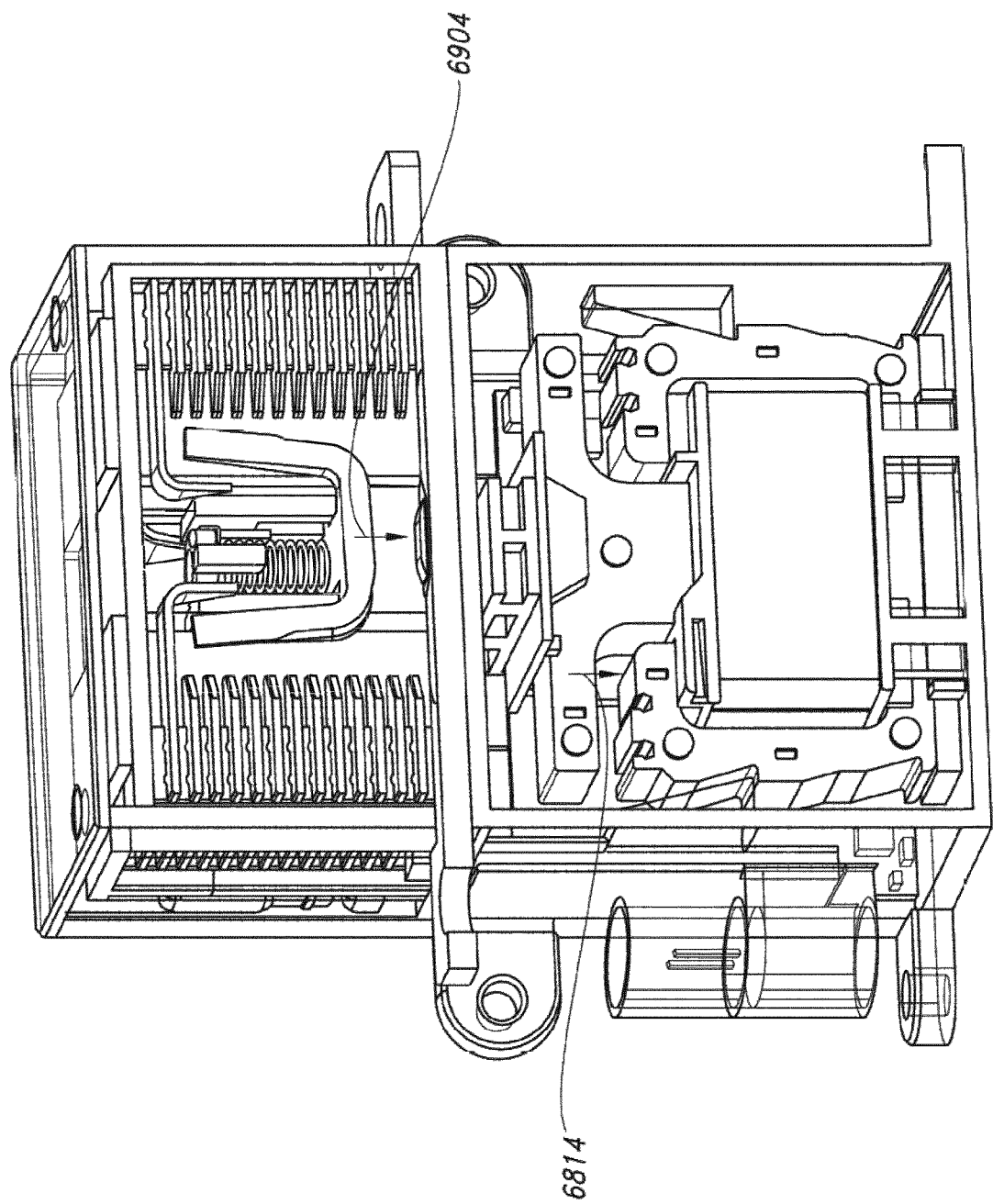
FIG. 22 depicts an embodiment detail of a breaker/relay component.

Referencing FIG. 22, an example breaker/relay is depicted showing the relative movement of the armature and the movable contact. In the example, the armature at the top enforces the movable contact away from the fixed contact, resulting in a disconnection of the power bus. The armature at the bottom pulls the moving contact down to engage the fixed contact, resulting in a connection of the power bus. The motion arrow 6904 in FIG. 22 references the movement of the armature that will occur as the armature moves from the open state to the closed state after the coil is energized. Any reference throughout the disclosure to "up" or "down" are for clarity of description, and do not reference actual vertical relationships of any components of the breaker/relay. A breaker/relay may be positioned such that movement of the armature is along any axis, including up-down, down-up, a horizontal orientation, and/or any other orientation. In certain embodiments, the armature returns to the up or disengaged position utilizing a passive element, such as a biasing spring or reverse spring (e.g., positioned between the armature and the permanent magnet, and/or a housing of one or more of these), resulting in a "normally-open" logical operation for the breaker/relay. The biasing spring or reverse spring does not appear in the schematic cutaway view of FIG. 22. As described throughout the present disclosure, the breaker/relay may be normally-open, normally-closed, latching, or in any other logical configuration, with appropriate adjustments to the hardware and/or control elements to provide such a configuration.

Figure 23:
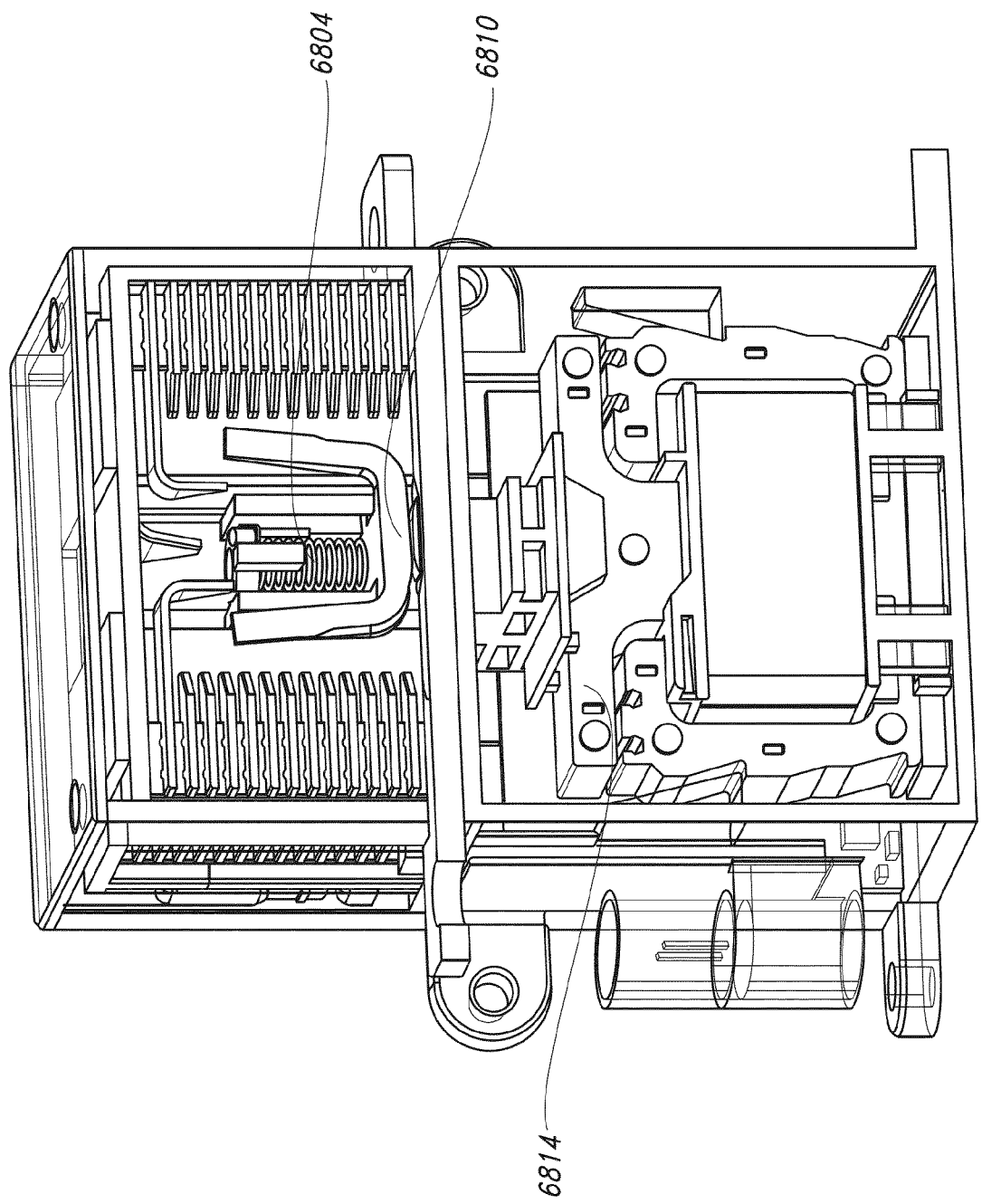
FIG. 23 depicts an embodiment detail of a breaker/relay component.

Referencing FIG. 23, an example breaker/relay is depicted in a closed position. The armature in the example of FIG. 23 has moved down, and the movable contact 6810 has additionally moved down with the armature 6814 to an engaged position with the fixed contact, closing the circuit and allowing power to pass through the power bus. The contact force spring 6804 in the position depicted in FIG. 23 is compressed, providing a contact force to the movable contact 6810 against the fixed contact. It can be seen that the movable contact is provided with movement space, where a force sufficient to overcome the contact force 6804 spring can lift the movable contact 6810 off of the fixed contact, thereby opening the circuit and preventing power to pass through the power bus.

Figure 24:
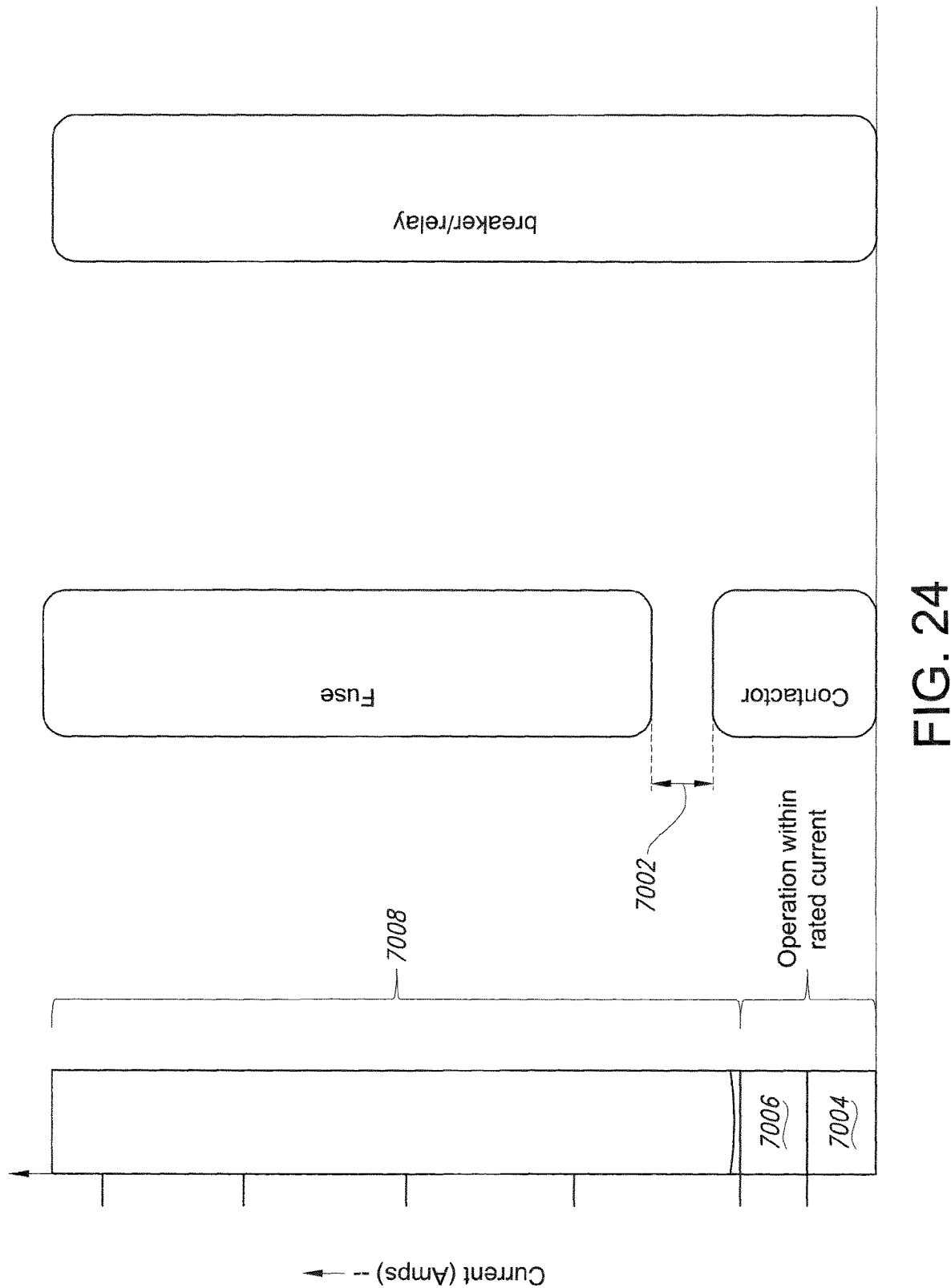
FIG. 24 depicts a current plot for a contactor-fuse and breaker/relay.

Referencing FIG. 24, an operating diagram for a previously known contactor-fuse system and a breaker/relay system consistent with embodiments of the present disclosure are depicted schematically. In the example of FIG. 24, an operating current bar is depicted at the left, having two general operating regimes—operation within rated current values (e.g., within designed current limits for a system, such as regions 7004, 7006) and operation above rated current values (e.g., region 7008). Additionally, in the example of FIG. 24, operations within the rated current are sub-divided into a lower region 7004 and an upper region 7006. In the example of FIG. 24, the lower region 7004 and upper region 7006 are illustrative examples to depict operating modes within the rated current region—for example the lower region 7004 may be associated with lower power operation such as operation of accessories and the upper region 7006 may be associated with higher power operation such as provision of motive power or pumping power. The regions 7004, 7006 provide for a notional distinction between operating conditions, and the actual operations that occur within the lower region 7004 and upper region 7006 are not important for the illustration of FIG. 24. For example, an upper region 7006 for one illustrative system may be motive power to move a vehicle (e.g., where the lower region 7004 is another function such as power to communications or accessories), where a lower region 7004 for another illustrative system may be motive power to move a vehicle (e.g., where the upper region 7006 is another function such as charging or high performance motive power).

In the example of FIG. 24, an operation region for the contactor-fuse system is depicted in the middle. The contactor provides for full operation up to the rated power. A design choice may allow for the contactor to provide operation slightly above rated power (e.g., where system risk is accepted to provide higher capability) or slightly below rated power (e.g., where system performance is compromised to protect the system components). The contactor-fuse system further includes an operating region for the fuse, where the fuse activates at a selected current value. It can be seen that an operational gap 7002 occurs, where the fuse does not activate due to the low current value, but the contactor also does not support operations in the gap 7002 region. The gap 7002 can only be closed by overlapping operation of the contactor and/or the fuse, necessarily compromising the system risk profile or performance. If the fuse region is extended lower, then rated operation under certain duty cycles may trigger a fuse event and loss of mission. Additionally, as the contactor and fuse experience wear or degradation, the operating region for the contactor-fuse system will move, resulting in inconsistent system performance, loss of protection, and/or unnecessary fuse events. Additionally, the failure mode of a fuse results in extended exposure of the system to high currents due to the fuse melt period and extended arcing time through the activating fuse. Finally, operations of the contactor at the upper range of the contactor operating region results in undesirable heating and degradation of the contactor.

In the example of FIG. 24, an operating region for a breaker/relay consistent with certain embodiments of the present disclosure is depicted. The breaker/relay provides for a smooth and selectable functionality throughout the operating current bar. The breaker/relay provides for a highly capable contact that does not operate near the upper region of its current capacity, reducing heating and degradation from high, within rated range, operations, such as in the upper region 7006. Additionally, the current sensor and related disconnect operations allow for a selectable disconnection when operation is above the rated current for the system. Further, a physical disconnect current is available (e.g., reference FIG. 21 and the associated disclosure) that provides for immediate disconnection of the power bus at very high current values. In certain embodiments, arc dissipation features of the breaker/relay additionally provide for a faster and less damaging disconnect event than experienced by previously known contactor-fuse arrangements. Additionally, the breaker/relay provides for a recoverable disconnect operation, where a mere command to the breaker/relay will again provide connection without a service event. Accordingly, if the system failure causing the high current event is resolved or consistent with a restart, the system can resume operations with the breaker/relay as soon as desired, without having to diagnose a fuse event or change out the fuse.

Figure 25:
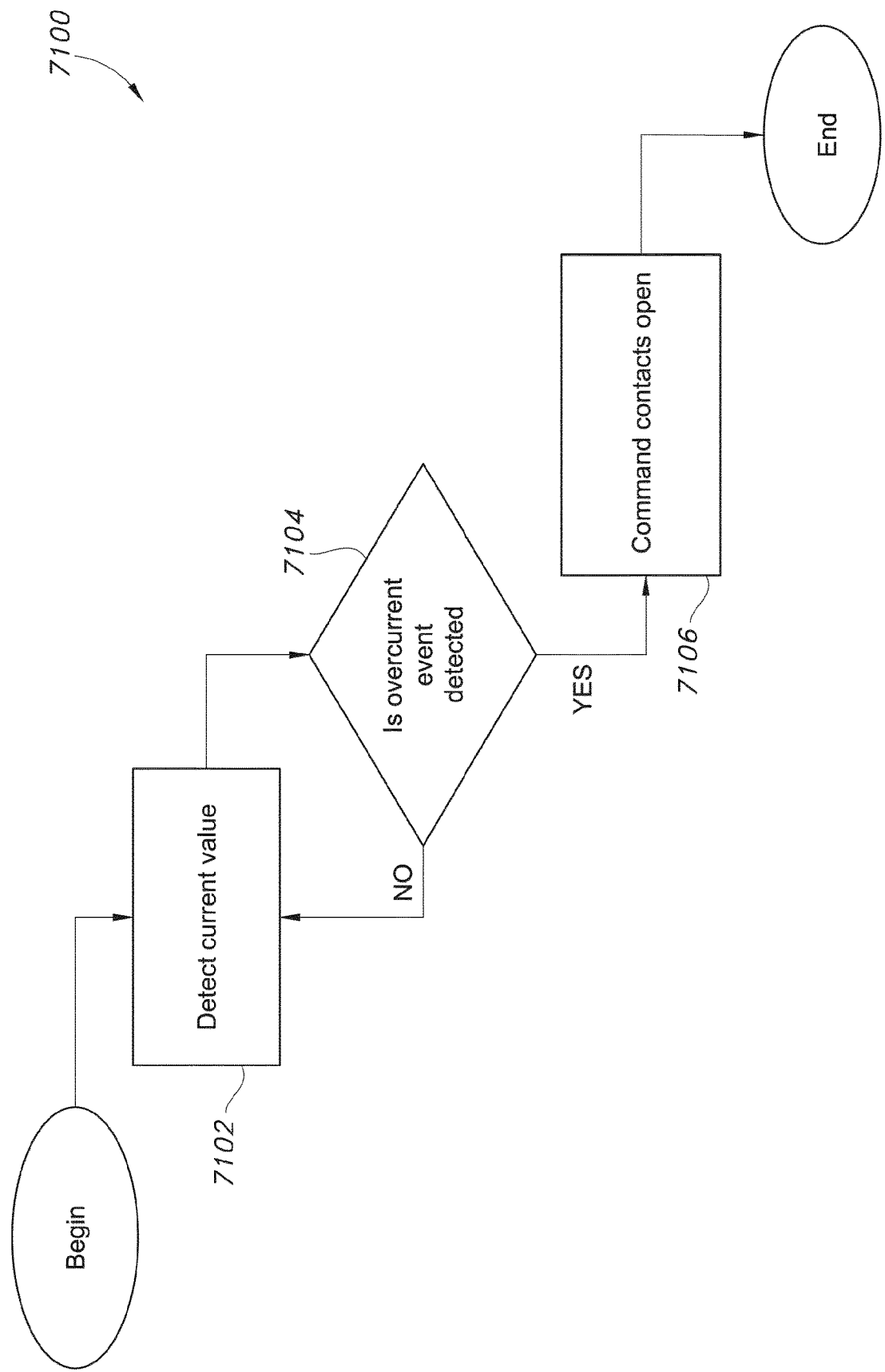
FIG. 25 depicts an embodiment flow diagram for current protection.

Referencing FIG. 25, an example procedure 7100 is depicted to disconnect a power bus. The example procedure 7100 includes an operation 7102 to detect a current value, for example utilizing a current sensor (reference FIG. 21). The procedure 7100 further includes an operation 7104 to determine if an overcurrent event is detected. For example, the detected current value, a function thereof, or a calculated parameter determined in response to the current value, can be compared to a threshold value to determine if an overcurrent event is detected. The example procedure 7100 further includes an operation 7106 to command the contacts open, for example by de-energizing a coil and thereby moving an armature to a position that opens the contacts. The overcurrent threshold may be any value, and may be modified in real-time and/or in accordance with operating conditions. The value for the overcurrent threshold depends upon the application and the components in the system. Example and non-limiting overcurrent values include 100 A, 200 A, 400 A, 1 kA (1,000 amps), 1.5 kA, 3 kA, and 6 kA.

Figure 26:
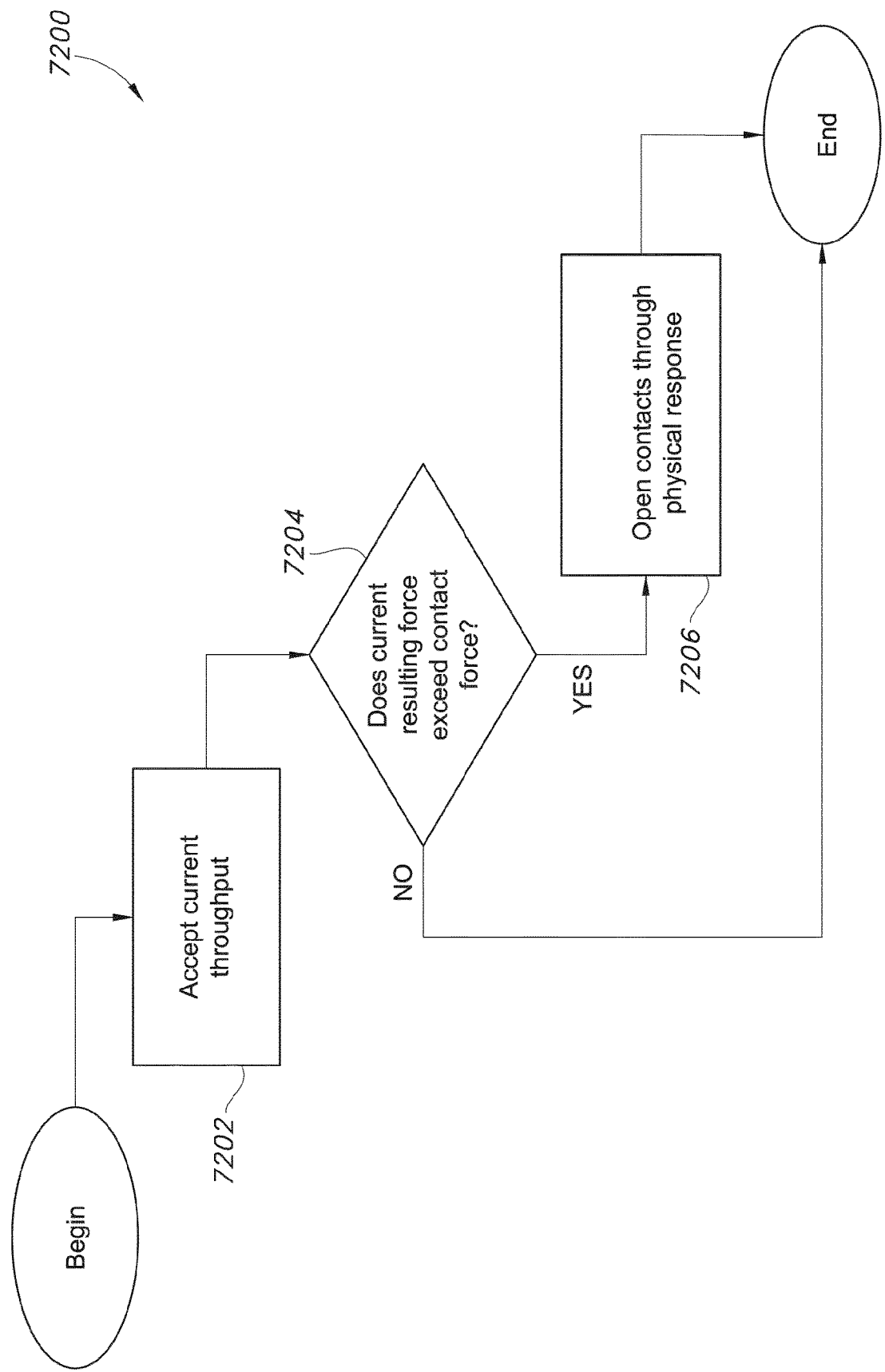
FIG. 26 depicts an embodiment flow diagram for current protection.

Referencing FIG. 26, an example procedure 7200 is depicted to perform a physical disconnect. The example procedure 7200 includes an operation 7202 to accept current throughput, for example as current passing through coupled contacts in a power bus. The example procedure 7200 further includes an operation 7204 to determine whether the current resulting force (e.g., a Lorentz force between a movable contact and a fixed contact) exceeds a contact force (e.g., as provide by a contact force spring). The example procedure 7200 further includes an operation 7206 to open the contacts through a physical response—for example as the Lorentz force overcoming the contact force spring and moving the movable contact away from the fixed contact. The physical disconnect current may be any value, and depends upon the application and the components in the system. Example and non-limiting physical disconnect currents include 400 A, 1 kA, 2 kA, 4.5 kA, 9 kA, and 20 kA.

Figure 27:
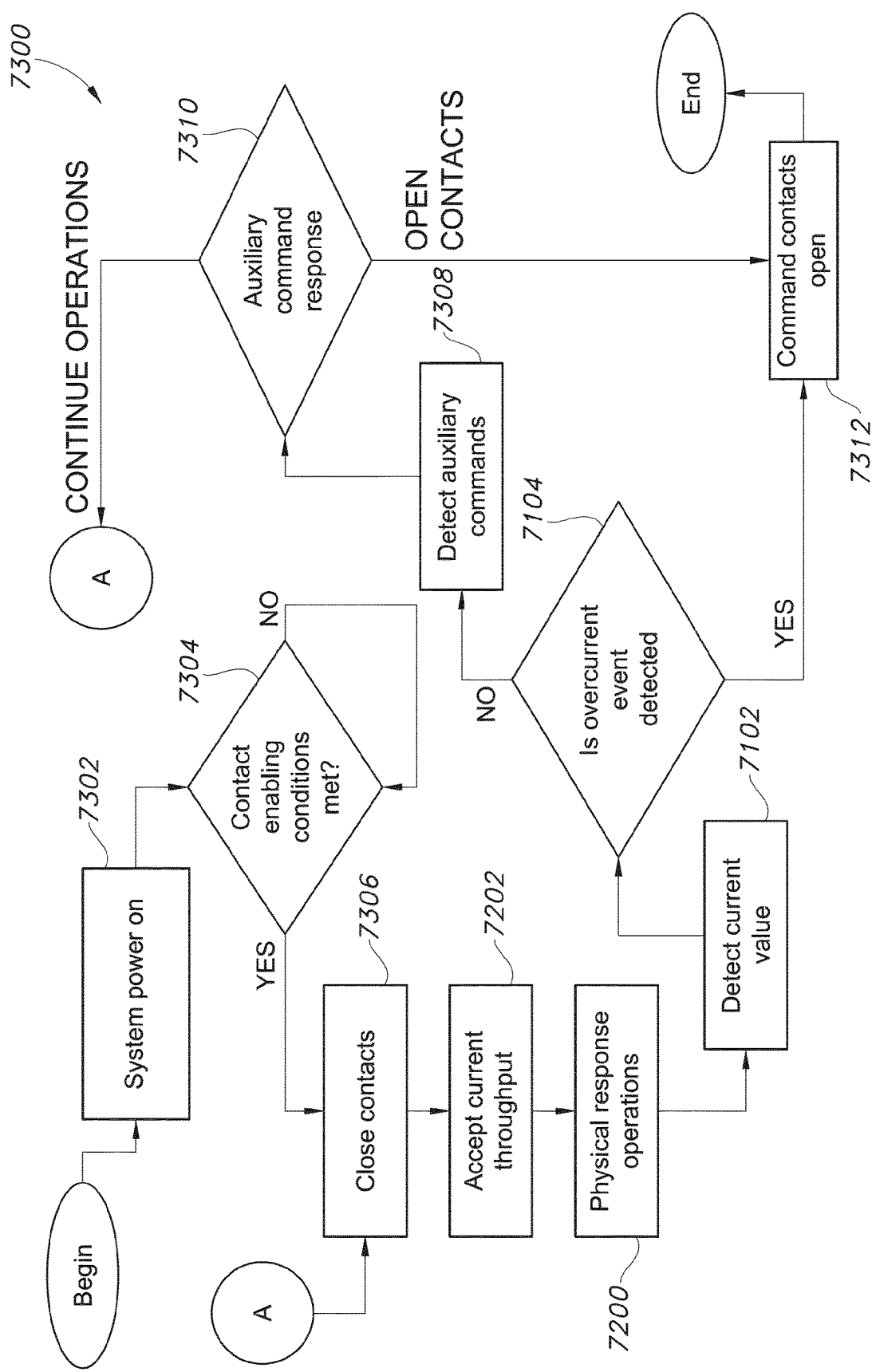
FIG. 27 depicts an embodiment flow diagram for current protection.

Referencing FIG. 27, an example procedure 7300 is depicted to open contacts in response to an overcurrent event, and/or in response to any other selected parameters. The example procedure 7300 includes an operation 7302 to power a system on, for example via a keyswitch or other circuit, and/or via recognition of a keyswitch ON condition. The procedure 7300 further includes an operation 7304 to determine whether contact enabling conditions are met, for example immediately after the keyswitch ON, after a selected time period, after a system pre-charge event is determined to be completed, and/or according to any other selected conditions. In certain embodiments, where the operation 7304 determines that contact enabling conditions are not met, the procedure 7300 holds on operation 7304 until contact enabling conditions are met. Any other response to operation 7304 determining that contact enabling conditions are not met is contemplated herein, including requesting a permission to enable contact conditions, setting a fault code, or the like. In response to operation 7304 determining that contact conditions are met, procedure 7300 further includes an operation 7306 to close the contacts (e.g., energizing a coil to move an armature), and an operation 7202 to accept current throughput. The example procedure 7300 further includes operation 7200 performing a physical disconnect if the accepted current is high enough, and proceeds to operation 7102 to detect a current value through the power bus. The procedure 7300 further includes an operation 7104 to determine if an overcurrent event is detected (operation 7104, in certain embodiments, may be set at a lower current value than the physical disconnect current tested at operation 7200). In response to the operation 7104 determining that an overcurrent event is detected, procedure 7300 includes an operation 7312 to command the contacts open. In response to operation 7104 determining that an overcurrent event is not detected, procedure 7300 includes an operation 7308 to detect auxiliary commands (e.g., an auxiliary off input), and an operation 7310 to determine if an auxiliary command is present to open the contacts (e.g., a logical high, logical low, specified value, lack of a specified value, etc.). In response to the operation 7310 determining that an auxiliary command is present to open the contacts, procedure 7300 includes the operation 7312 to command the contacts open. In response to the operation 7310 determining that an auxiliary command is not present to open the contacts (e.g., branch "CONTINUE OPERATIONS" in the example of FIG. 27) procedure returns to operation 7306.

Figure 28:
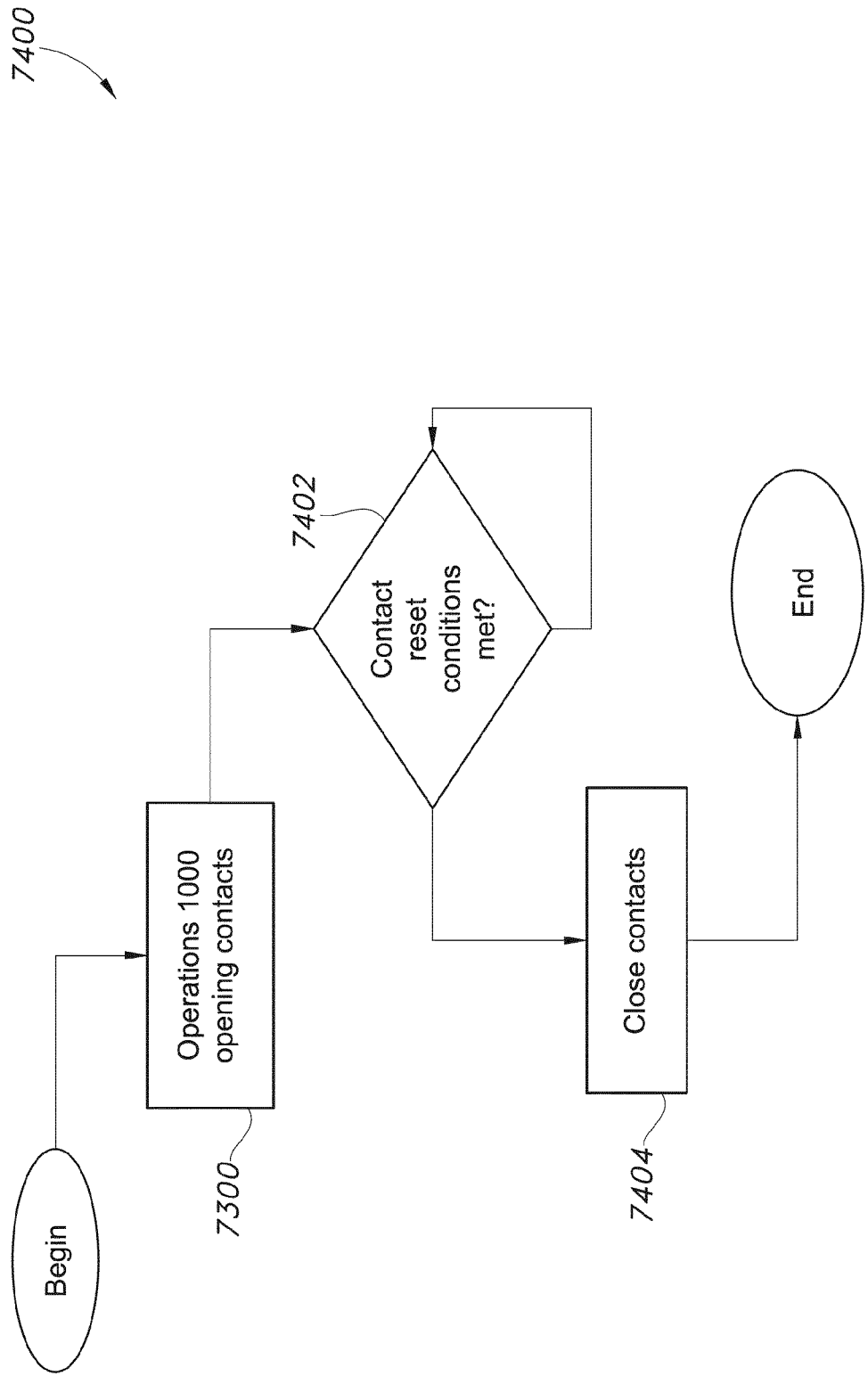
FIG. 28 depicts an embodiment flow diagram for current protection.

Referencing FIG. 28, an example procedure 7400 to restore operations of a breaker/relay after a contact opening event. The example procedure 7400 includes an operation 7300 to open the contacts of the breaker/relay, for example an operation wherein the contacts are opened due to a physical disconnect, an overcurrent detection, and/or an auxiliary off command. The procedure 7400 further includes an operation 7402 to determine if contact reset conditions are present. Example and non-limiting operations 7402 include determining that contact enabling conditions are met, determining that a fault code value has been reset, determining that a system controller is requesting a contact reset, and/or any other contact reset conditions. The procedure 7400 further includes an operation 7404 to close the contacts, for example by providing power to the coil to move the armature.

Figure 29:
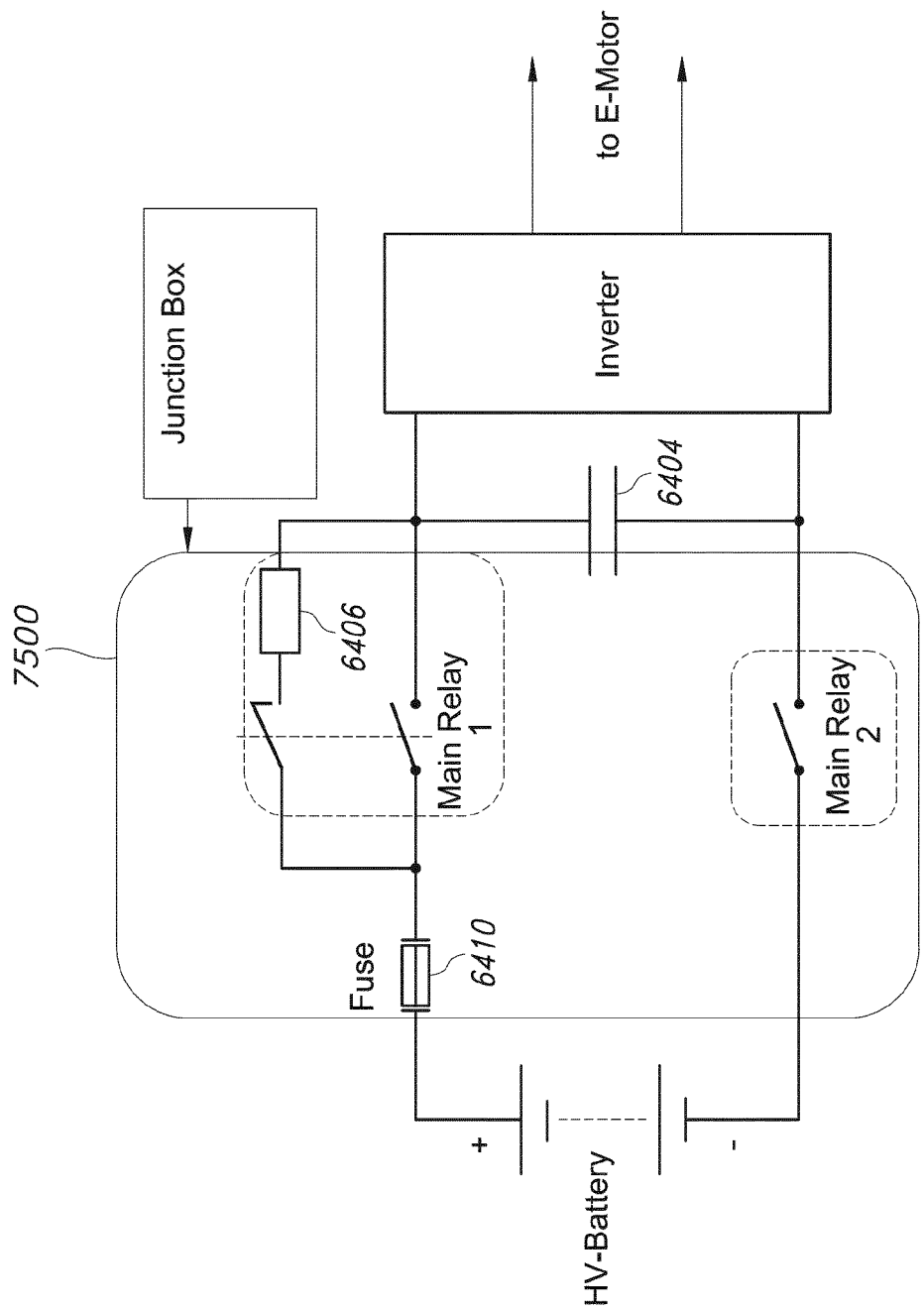
FIG. 29 depicts a schematic diagram of a power protection configuration between a battery and an inverter.

Referencing FIG. 29, an example previously known mobile power circuit is depicted. The example mobile power circuit is similar to the mobile power circuit depicted in FIG. 17. The example of FIG. 29 includes a junction box housing the pre-charge circuit, a high side relay, and a low side relay. In certain embodiments, the pre-charge circuit and the high side relay are provided in a housing within the junction box. In the example of FIG. 29, a fuse 6410 provides overcurrent protection on the high side, and is housed with the main relays and the precharge resistor 6406 within a PDU housing 7500.

Figure 30:
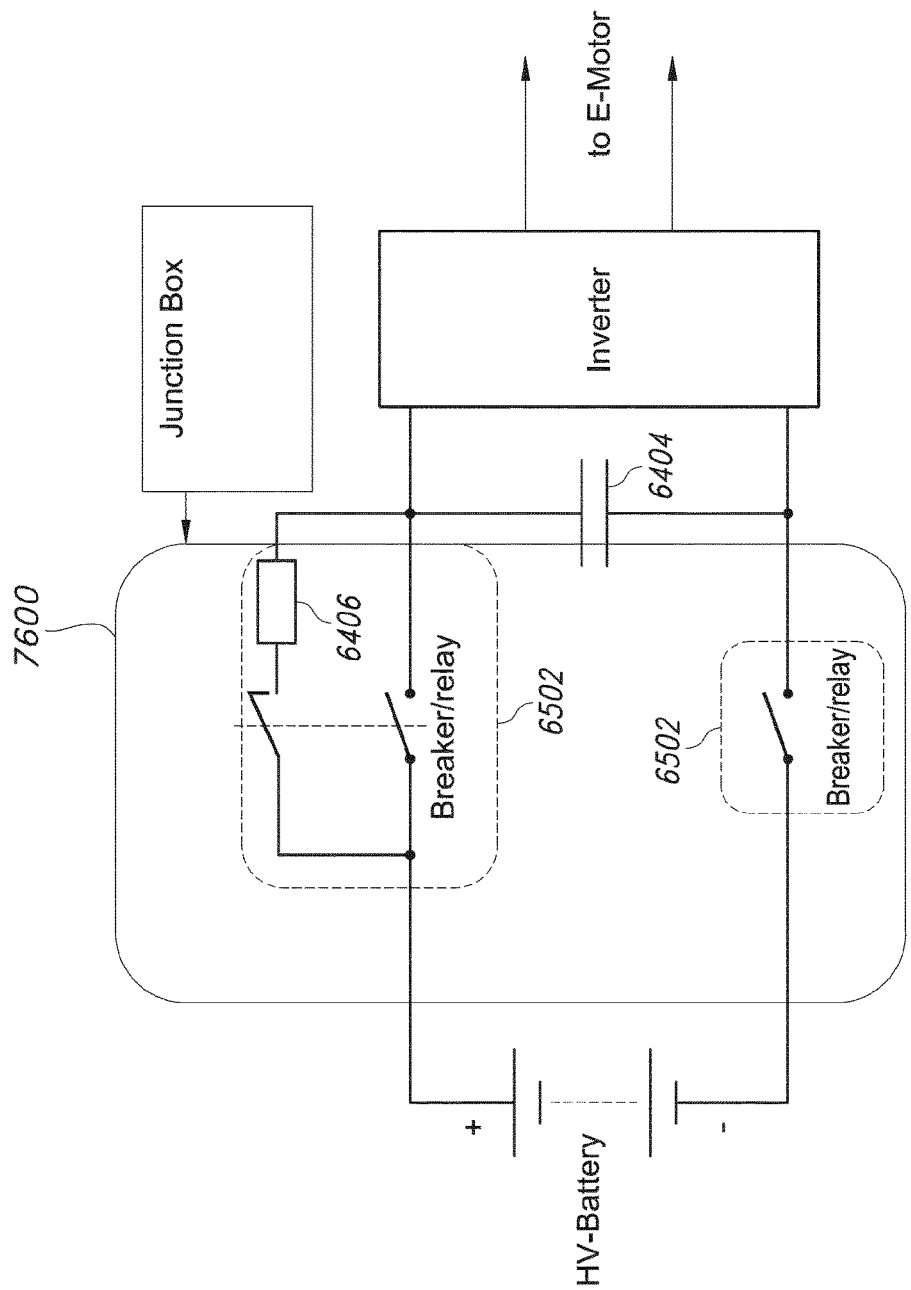
FIG. 30 depicts a schematic diagram of a power protection configuration between a battery and an inverter.

Referencing FIG. 30, an example mobile power circuit including a breaker/relay 6502 disposed in the high side circuit, and a second breaker/relay 6502 positioned in the low side circuit. Each breaker/relay 6502, in certain embodiments, provides continuous overcurrent control throughout the operating region of the mobile application as described throughout the present disclosure. Additionally, it can be seen that the low side breaker/relay 6502 provides for overcurrent protection in all operating conditions, including during a pre-charge operation when the high side breaker/relay 6502 may be bypassed so the mobile power circuit can pre-charge through the pre-charge resistor 6406. In certain embodiments, both the high side breaker/relay 6502 and the low side breaker/relay 6502 provide additional benefits such as rapid arc dispersion, low wear during connection and disconnection events, and improved heating characteristics during high, but in rated range, current operation of the mobile circuit.

Figure 31:
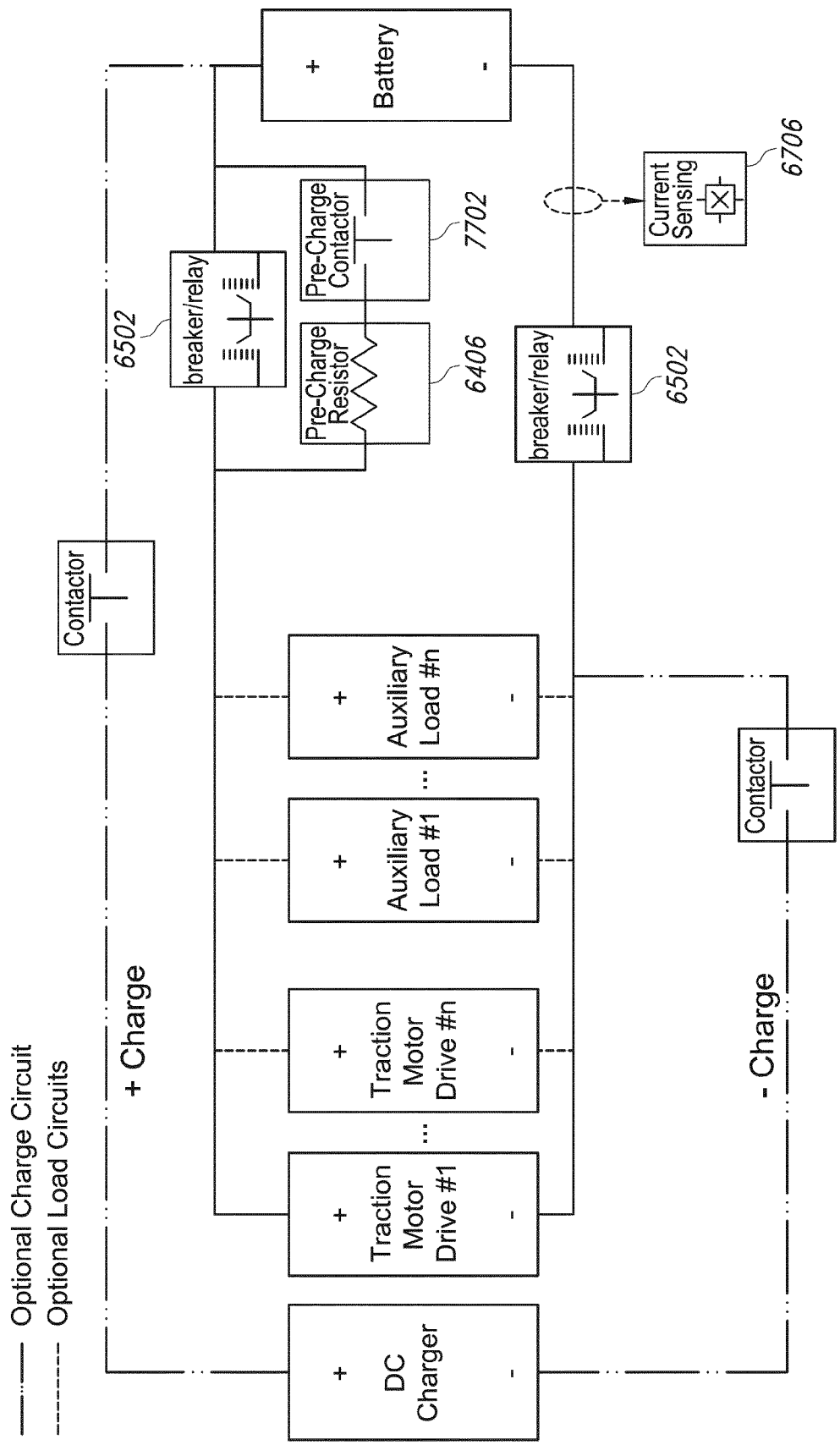
FIG. 31 depicts a schematic diagram of a power protection configuration between a battery and loads.

Referencing FIG. 31, an example power distribution arrangement for a mobile application is depicted. The embodiment of FIG. 31 is similar to the embodiment of FIG. 30, with a high side breaker/relay 6502 and a low side breaker/relay 6502. Four operating regimes of the embodiment of FIG. 31 are described herein, including pre-charge operations (e.g., at system power-on for the mobile application), powering operations for loads (e.g., providing motive power or auxiliary power for the mobile application), regeneration operations (e.g., recovering power from a motive load or auxiliary load), and charging operations (e.g., connection of a dedicated charger to the system). In the example of FIG. 31, the low side breaker/relay 6502 has an associated current sensor 6706. In the example of FIG. 31, the low side breaker/relay 6502 is in the loop during all operations, and can provide current protection for any operating conditions. To save costs, a current sensor for the high side breaker/relay 6502 can be omitted. In certain embodiments, for protection of the breaker/relay contacts 6502, a local current sensor may be included for each breaker/relay 6502, to provide for operations to protect the contacts in the event of a physical current disconnection (e.g., reference FIG. 24). It can be seen that additional contactors and/or breaker/relays may be provided beyond those shown—for example to isolate the charge circuit, to route power through selected ones of the motive loads and/or auxiliary loads, and/or to prevent power flow through an inverter (not shown) during charging operations. Additionally or alternatively, certain components depicted in FIG. 31 may not be present in certain embodiments. For example, a low-side contactor on the charge circuit may not be present, and any one or more of the motive loads (traction motor drive) or auxiliary loads may not be present. During a pre-charge operation, a pre-charge contactor 7702 may be closed while the high-side breaker/relay 6502 is open, where the low-side breaker/relay 6502 provides for current protection (in addition or as an alternative to a pre-charge fuse) during pre-charge operations. During charging operations, the low-side breaker/relay 6502 provides current protection, while the high-side breaker/relay 6502 is bypassed by the charging circuit.

Figure 32:
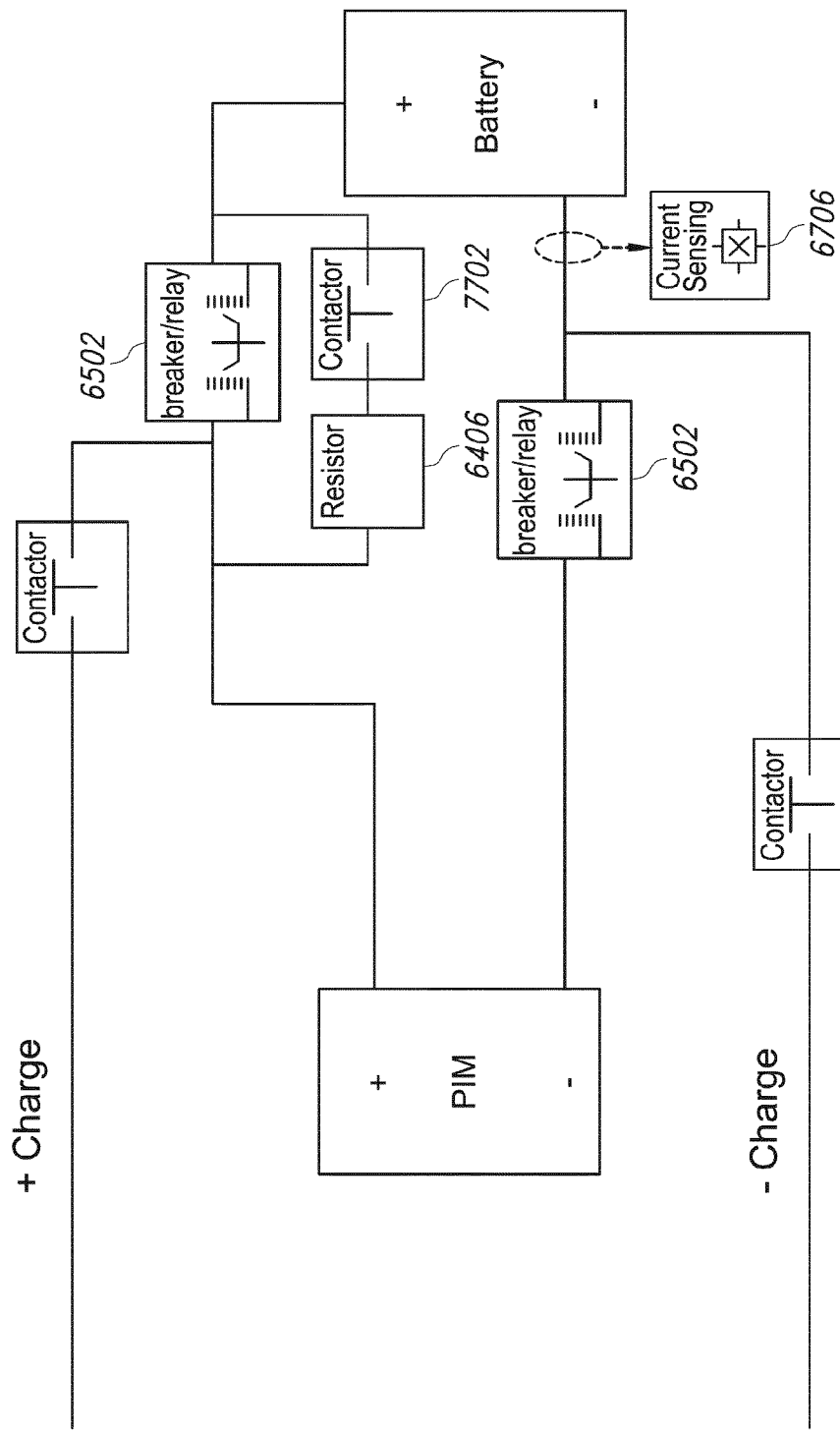
FIG. 32 depicts a schematic diagram of a power protection configuration.

Referencing FIG. 32, an example power distribution management for a mobile application is depicted. The embodiment of FIG. 32 is similar to the embodiment of FIG. 31, except that the high side breaker/relay 6502 is in the loop during all operations, and the low side breaker/relay 6502 is not in the loop during charging operations. In the example of FIG. 32, the high side breaker/relay 6502 may include current sensing associated therewith to provide protection for the contacts during a physical current disconnection. In certain embodiments, depending upon the circuit dynamics of the mobile application, the current sensor 6706 depicted on the low side may be sufficient to provide protection for the contacts of the high side breaker/relay 6502 without a dedicated current sensor for the high side breaker/relay 6502. During pre-charge operations for the embodiment of FIG. 32, current protection is not present, or is provided by a pre-charge fuse. During charging operations for the embodiment of FIG. 32, current protection is provided by the high-side breaker/relay 6502.

Figure 33:
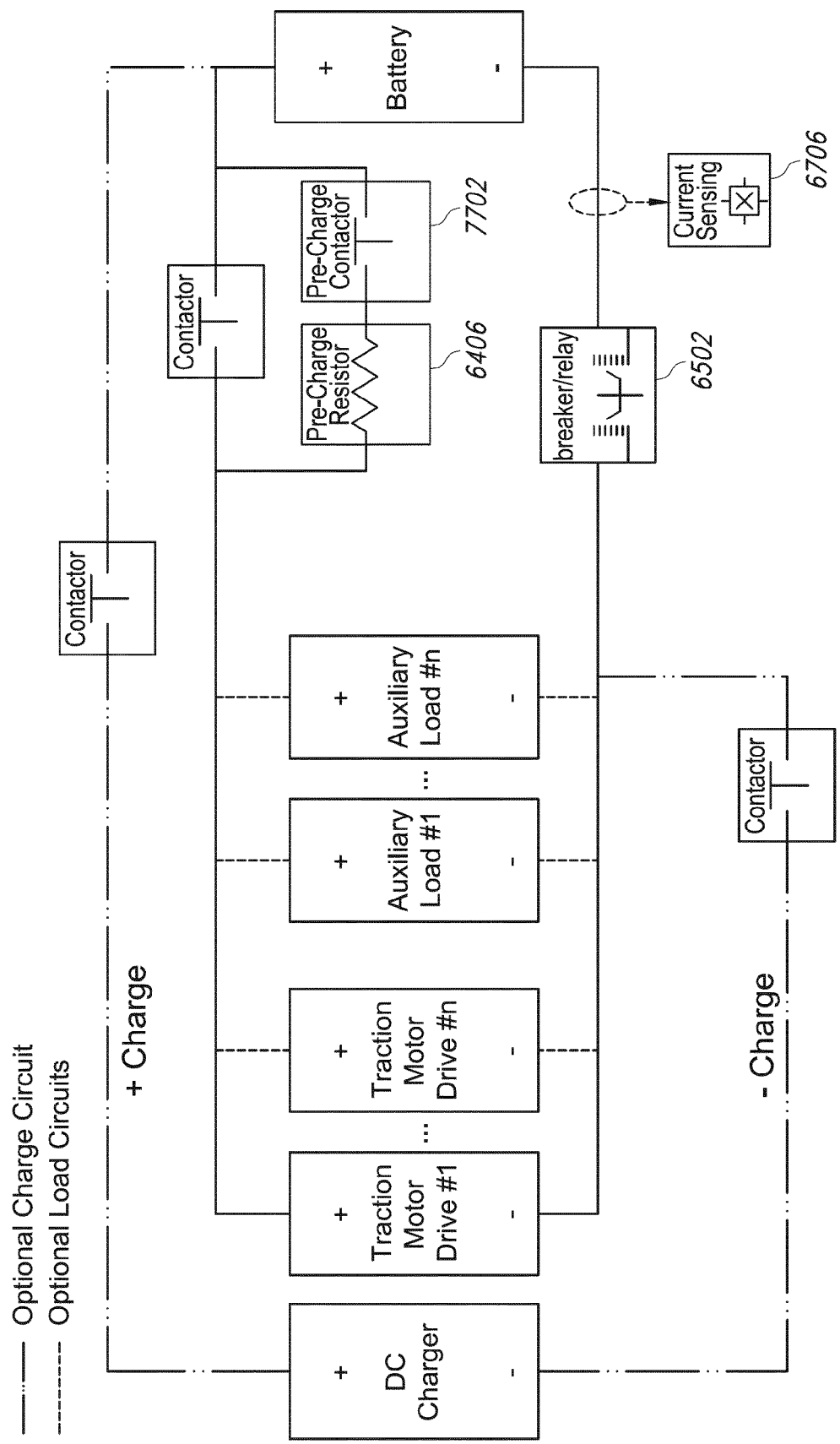
FIG. 33 depicts a schematic diagram of a power protection configuration between a battery and loads.

Referencing FIG. 33, an example power distribution management for a mobile application is depicted. The embodiment of FIG. 33 is similar to the embodiment of FIG. 31, except that the high side breaker/relay 6502 is exchanged for a standard contactor. In the example of FIG. 33, the low side breaker/relay 6502 provides for current protection during all operating conditions, and the system otherwise uses conventional components. In certain embodiments, improved current protection capability is desirable, but contactor wear may not be as much of a concern, and a trade-off for inexpensive contactors at other positions in the mobile power circuit away from the low side breaker/relay 6502 may be an acceptable solution. Additionally, the presence of the low side breaker/relay 6502 in the circuit for all operating conditions can reduce the wear on the conventional contactors in the mobile power circuit through timing of connections such that the low side breaker/relay 6502 reduces the number of connection and disconnection events on other contactors while the system is charged.

Figure 34:
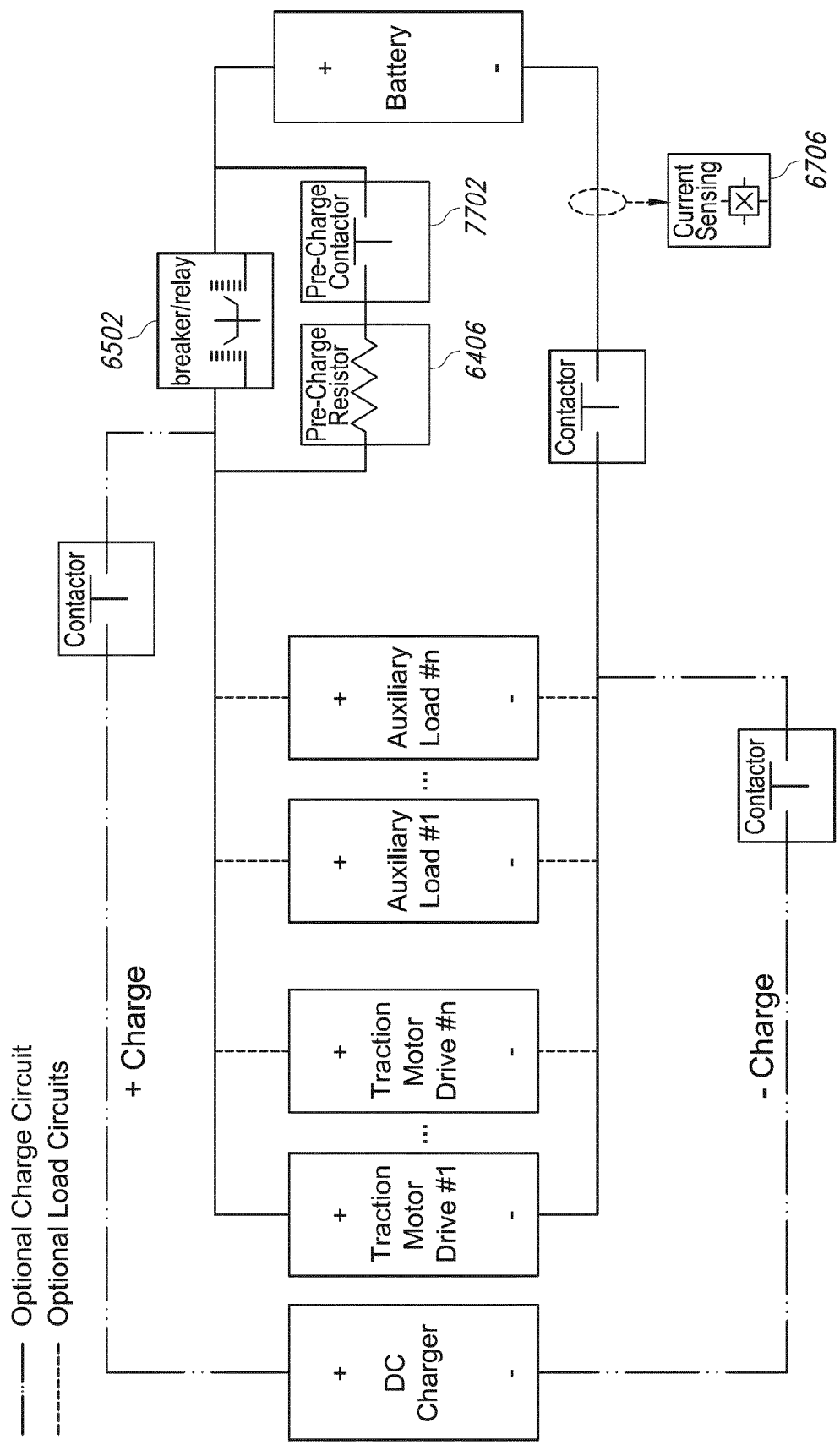
FIG. 34 depicts a schematic diagram of a power protection configuration between a battery and loads.

Referencing FIG. 34, an example power distribution management for a mobile application is depicted. The embodiment of FIG. 34 is similar to the embodiment of FIG. 32, except that the low side breaker/relay is replaced with a contactor, and the low side charging circuit is routed through the low side contactor. The low side charging circuit may bypass the low side contactor in certain embodiments, similar to the embodiment of FIG. 32. It can be seen in FIG. 34 that a circuit path lacking short-circuit protection exists through the pre-charge circuit during pre-charging operations when the high side breaker/relay 6502 is being bypassed, unless protection is provided by a pre-charge fuse. In certain embodiments, a fuse in the pre-charge circuit (not shown) may be provided to provide for short-circuit protection during the pre-charge operating condition, and/or the unprotected pre-charge operation may be an acceptable risk. In any of the embodiments depicted throughout the present disclosure, fuses may be included, potentially in-line with a breaker/relay 6502, depending upon the benefits sought from the breaker/relay 6502 for the particular embodiment. In certain embodiments, an included fuse with a breaker/relay 6502 may be configured to activate at a very high current value that is expected to be higher than the physical disconnection current of the breaker/relay 6502, for example as a redundant protection for the circuit, and/or to provide for a long-life fuse that is expected to last for a selected period, such as the service life of the electric mobile application.

Figure 35:
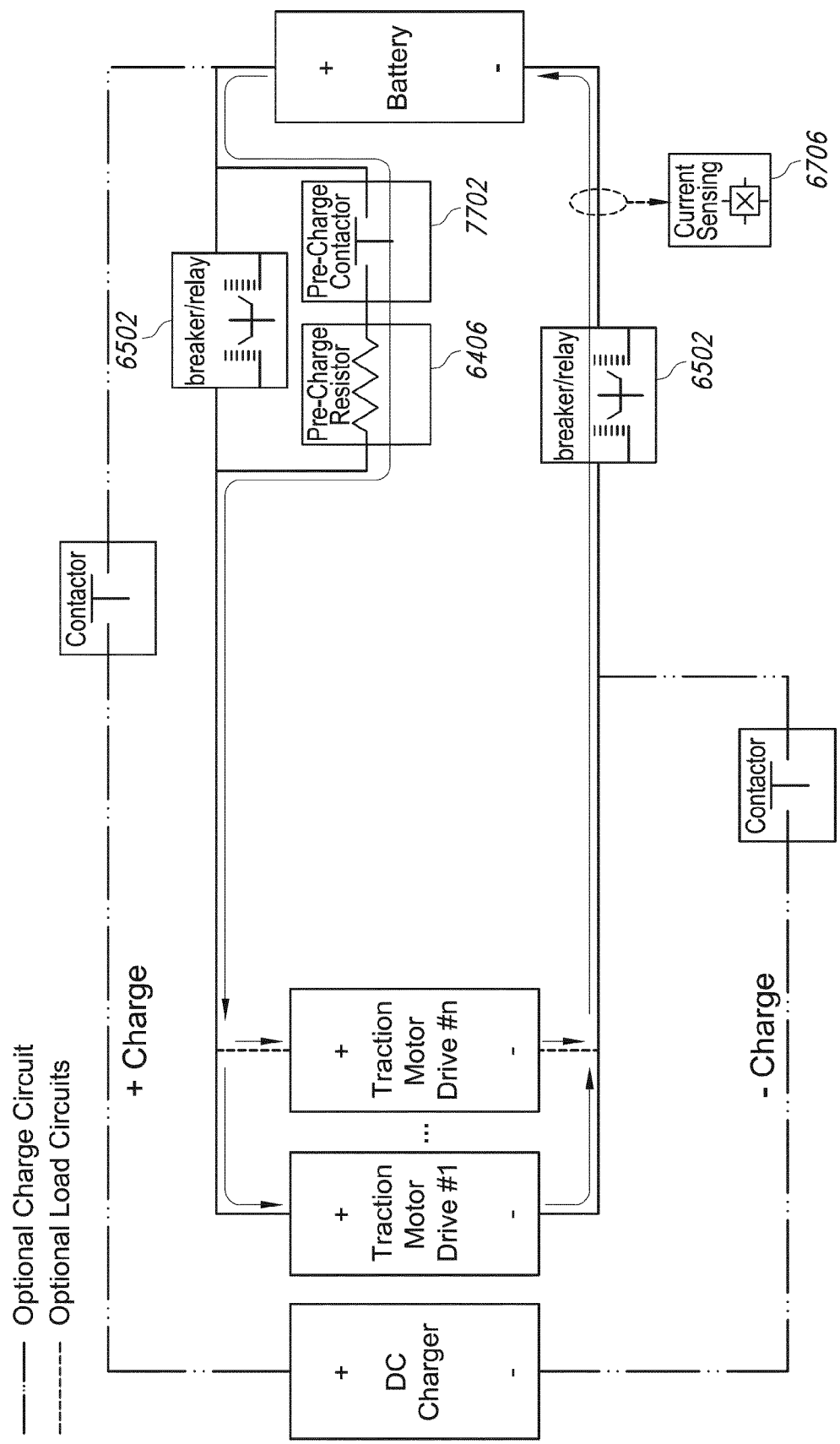
FIG. 35 depicts a schematic diagram of a power protection configuration between a battery and loads with current path depiction.

Referencing FIG. 35, an example power distribution management for a mobile application is depicted, consistent with the embodiment depicted in FIG. 31. Power flow during pre-charge operations is depicted schematically in FIG. 35, with arrows showing the power flow path. The operations described in relation to FIG. 35 can be understood in the context of any of the embodiments described throughout the present disclosure. During pre-charge operations, the pre-charge contactor 7702 is closed and the low side breaker/relay 6502 is closed, providing power through the mobile circuit and through the pre-charge resistor 6406. The pre-charge operation allows for capacitive elements of the mobile circuit to be charged before the high side breaker/relay 6502 is closed. During pre-charge operations in the embodiment of FIG. 35, the low side breaker/relay 6502 provides for overcurrent protection of the circuit. After the pre-charge operation is complete, which may be determined in an open loop (e.g. using a timer) manner or in a closed loop (e.g., detecting a voltage drop across the batter terminals, or detecting the current through the circuit), the high side breaker/relay 6502 is closed and the pre-charge contactor 7702 may be opened.

Figure 36:
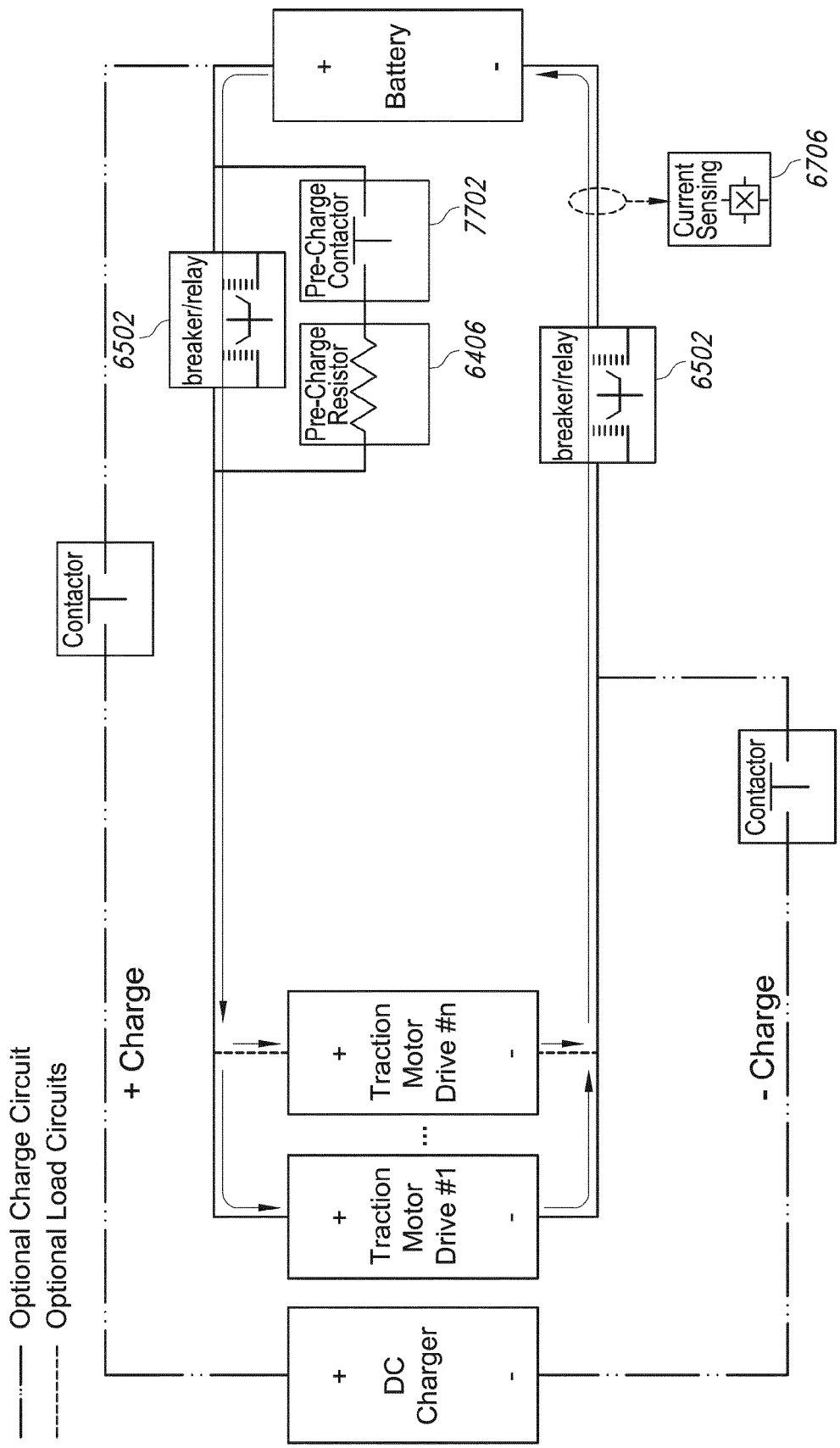
FIG. 36 depicts a schematic diagram of a power protection configuration between a battery and loads with current path depiction.

Referencing FIG. 36, an example power distribution management for a mobile application is depicted, consistent with the embodiment depicted in FIG. 31. Power flow during load powering operations is depicted in FIG. 36, with arrows showing the power flow path. The operations described in relation to FIG. 36 can be understood in the context of any of the embodiments described throughout the present disclosure. During load powering operations, in the example the pre-charge contactor 7702 is open, and power flows through the high side breaker/relay 6502 and the low side breaker/relay 6502. The embodiment of FIG. 36 depicts a traction motor load being powered, but one or more auxiliary loads may additionally or alternatively be powered in a similar manner. During load powering operations, both the high side breaker/relay 6502 and the low side breaker/relay 6502 provide overcurrent protection. In certain embodiments, the high side breaker/relay 6502 and the low side breaker/relay 6502 may have the same or distinct current ratings. For example, where one of the high side breaker/relay 6502 or low side breaker/relay 6502 are easier to service or less expensive, that one of the breaker/relays 6502 may have a lower overall current rating to provide for a system where a predictable one of the breaker/relays 6502 fails first. Additionally or alternatively, certain operations on the system may have a higher current rating—for example charging operations where the charging circuit is routed only through one of the breaker/relays 6502 (e.g., the low side breaker/relay in the embodiment of FIG. 36), and thus one of the breaker/relays 6502 may have a higher current rating than the other. In certain embodiments, a breaker/relay 6502 current rating may be reflected in the contact materials of the movable contact and the fixed contact, by a contact surface area of the movable contact and the fixed contact, by threshold settings for the controlled operations in response to detected current, by a number or arrangement of splitter plates, by splitter plate materials and geometry, by the magnet strength and geometry of the permanent magnet system around the splitter plates, by the contact force of the contact force spring, and/or by the breaker/relay design elements (e.g., contact surface area and contact spring force) determining the physical disconnection current due to the Lorentz force on the contacts.

Figure 37:
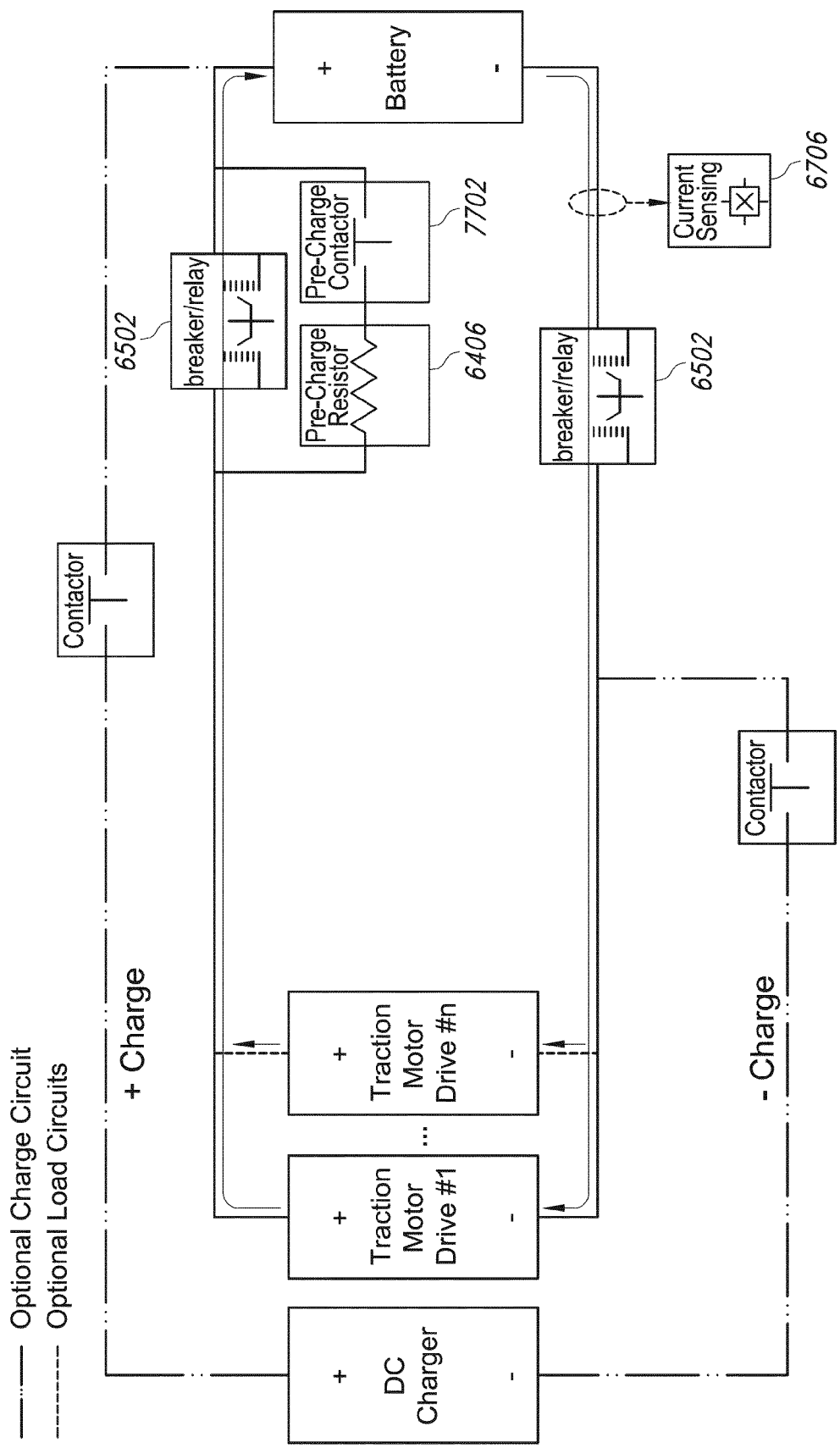
FIG. 37 depicts a schematic diagram of a power protection configuration between a battery and loads with current path depiction.

Referencing FIG. 37, an example power distribution management for a mobile application is depicted, consistent with the embodiment depicted in FIG. 31. Power flow during regeneration operations is depicted in FIG. 37, with arrows showing the flow path. Regenerative operations from motive loads are depicted, for example as might be experienced during regenerative braking, but any regenerative operations from any loads in the system are contemplated herein. During regeneration operations, the high side breaker/relay 6502 and the low side breaker/relay 6502 are closed, and the pre-charge contactor 7702 may be open. Accordingly, both the high side breaker/relay 6502 and the low side breaker/relay 6502 provide overcurrent protection during regeneration operations of the system.

Figure 38:
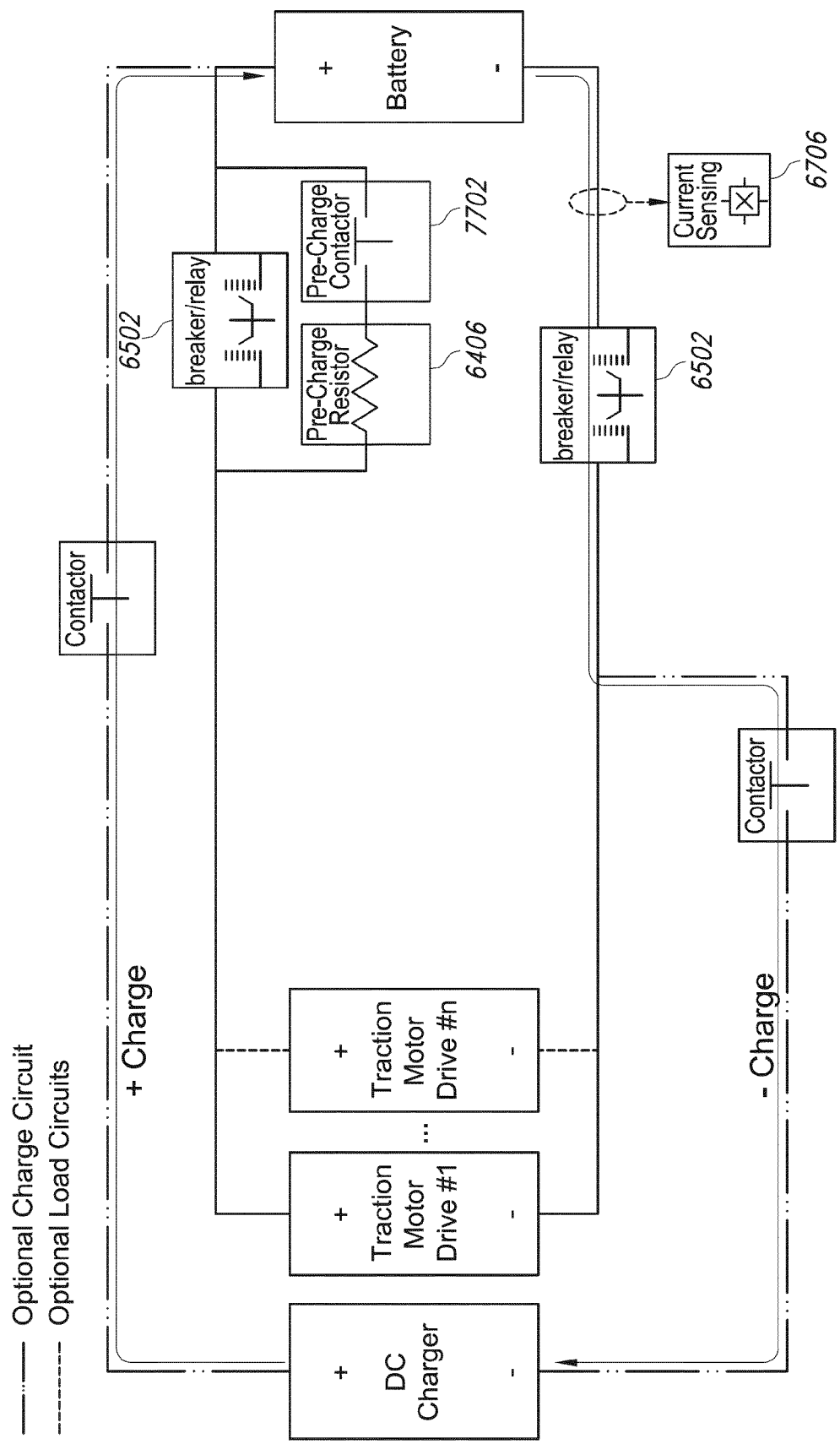
FIG. 38 depicts a schematic diagram of a power protection configuration between a battery and loads with current path depiction.

Referencing FIG. 38, an example power distribution management for a mobile application is depicted, consistent with the embodiment depicted in FIG. 31. Power flow during charging operations is depicted in FIG. 38, with arrows showing the flow path. Charging may be with an external charging device, and may include a high current quick charging operation which may provide for higher current operations than is associated with a rated power for the load(s). In the operations depicted in FIG. 38, the low side breaker/relay 6502 is closed, and contactors in the charging circuit are closed, providing the power flow path as depicted. In certain embodiments, the high side breaker/relay 6502 and the pre-charge relay 7702 may be open, for example to isolate an inverter (not shown) from the circuit during charging operations. In certain embodiments, the high side breaker/relay 6502 may be closed, for example where isolation of the inverter during charging operations is not required, and/or where rapid operation without a pre-charging cycle after the charging may be desired. During charging operations, the low side breaker/relay 6502 provides overcurrent protection in the example of FIG. 38.

Figure 39:
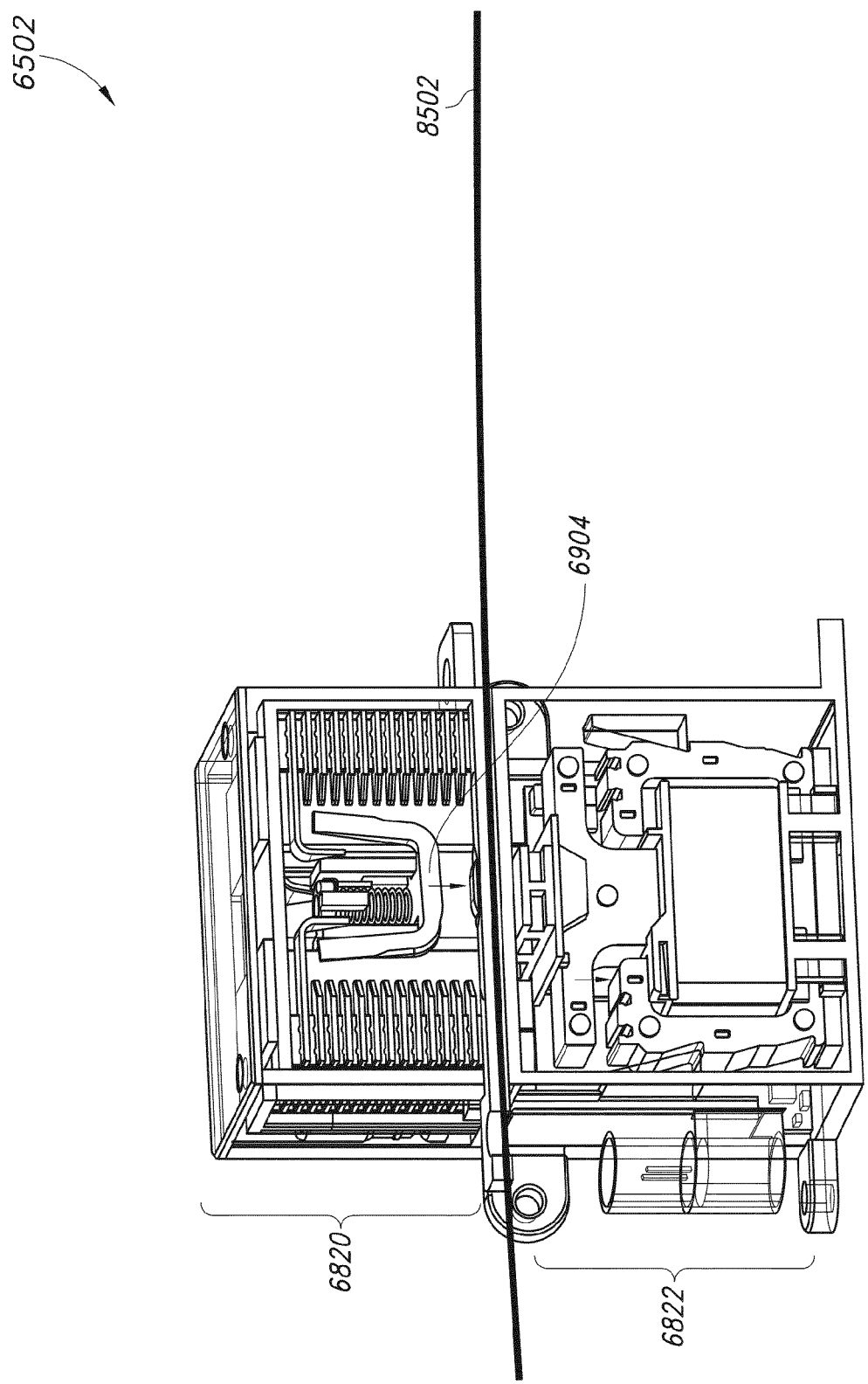
FIG. 39 depicts an embodiment detail of a breaker/relay component.

Referencing FIG. 39, another cutaway schematic view of a breaker/relay is depicted. In the example of FIG. 39, circuit breaking and connecting components are depicted on the breaker side 6820, and contactor operation components are depicted on the relay side 6822. The depicted breaker/relay is an example and depicts a single pole, single throw breaker relay. Additionally or alternatively, a breaker/relay may be a dual pole (e.g., operating two distinct circuits, a parallel path for one of the circuits to provide additional current capability, and/or one pole providing high-side coupling and the other pole providing low-side coupling). In certain embodiments, a breaker/relay having more than one pole can control the poles independently, or they may be operated together utilizing the same armature. In certain embodiments, both poles have arc diffusion protection provided by the same splitter plates, or by independent sets of splitter plates. In certain embodiments, both poles have arc diffusion protection provided by the same permanent magnet system, or by independent permanent magnet systems.

Figure 40:
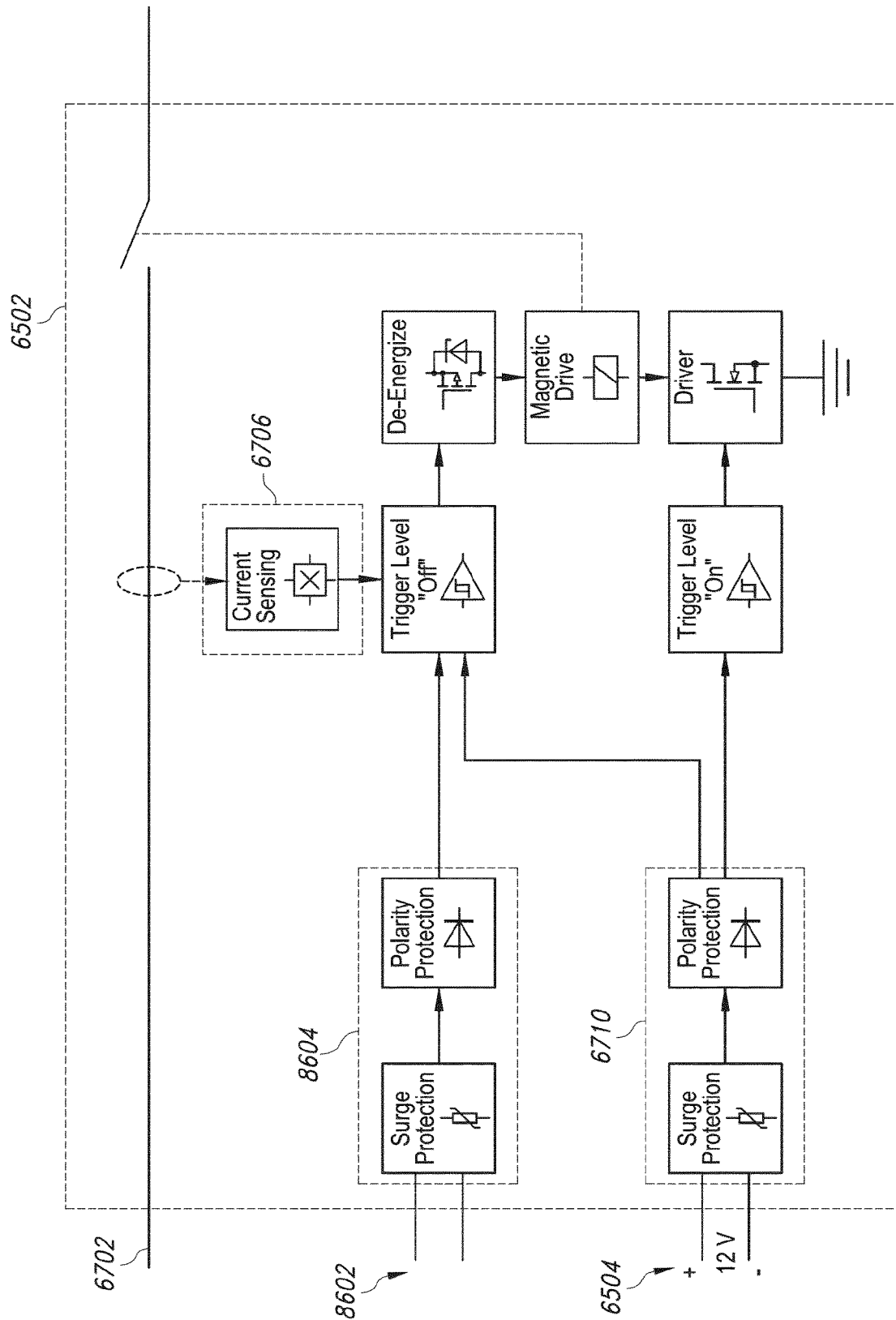
FIG. 40 depicts a schematic diagram of a power bus protection configuration.

Referencing FIG. 40, another example of a schematic logic diagram for a breaker/relay is depicted. The example of FIG. 40 includes an emergency or auxiliary input 8602, which is processed by an input isolation 8604. The emergency or auxiliary input 8602 may replace or be in addition to any other auxiliary input, and provides for the capability of a particular application to control operations of the breaker/relay for a selected response to any desired aspect of the system—including without limitation, allowing for a disconnect assurance during service, during an emergency, and/or according to any desired control logic.

Figure 41:
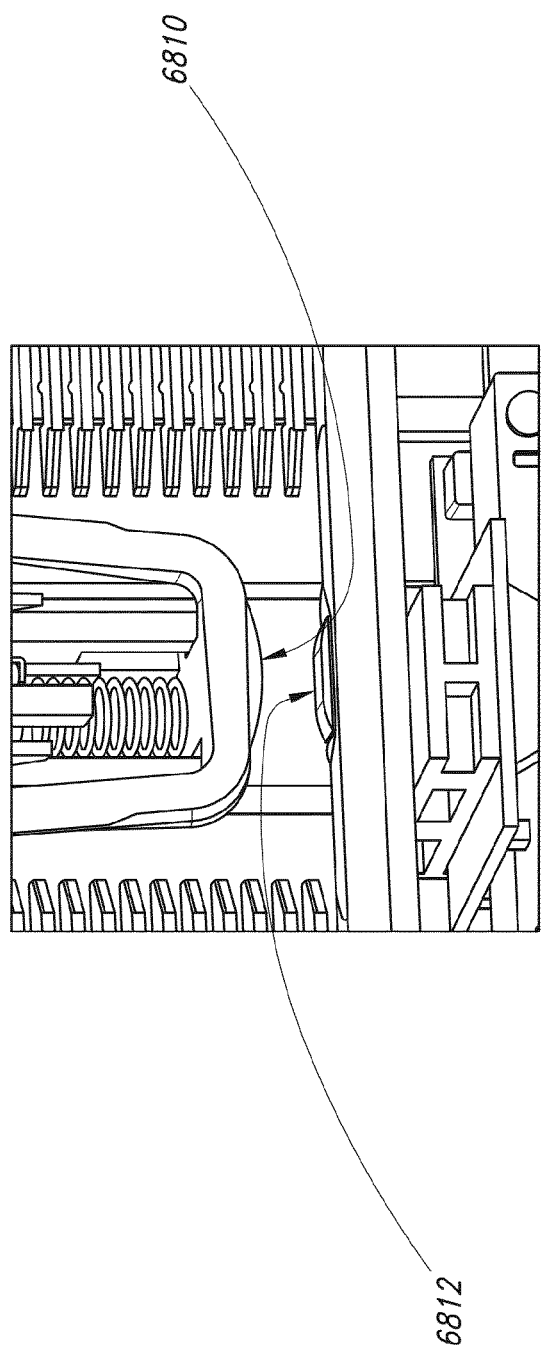
FIG. 41 depicts an embodiment detail of a contact in a breaker/relay component.

Referencing FIG. 41, a detailed cutaway view of a contact portion of an example breaker/relay is depicted. The contact portion of FIG. 41 includes an example configuration for the contact surface of the moveable contact 6810 and the fixed contact 6812. The configuration of the contacts is a part of the system that contributes to the physical opening force of the contacts, and can be configured with any shape or area to provide the desired response to high currents occurring in the associated circuit.

Figure 42:
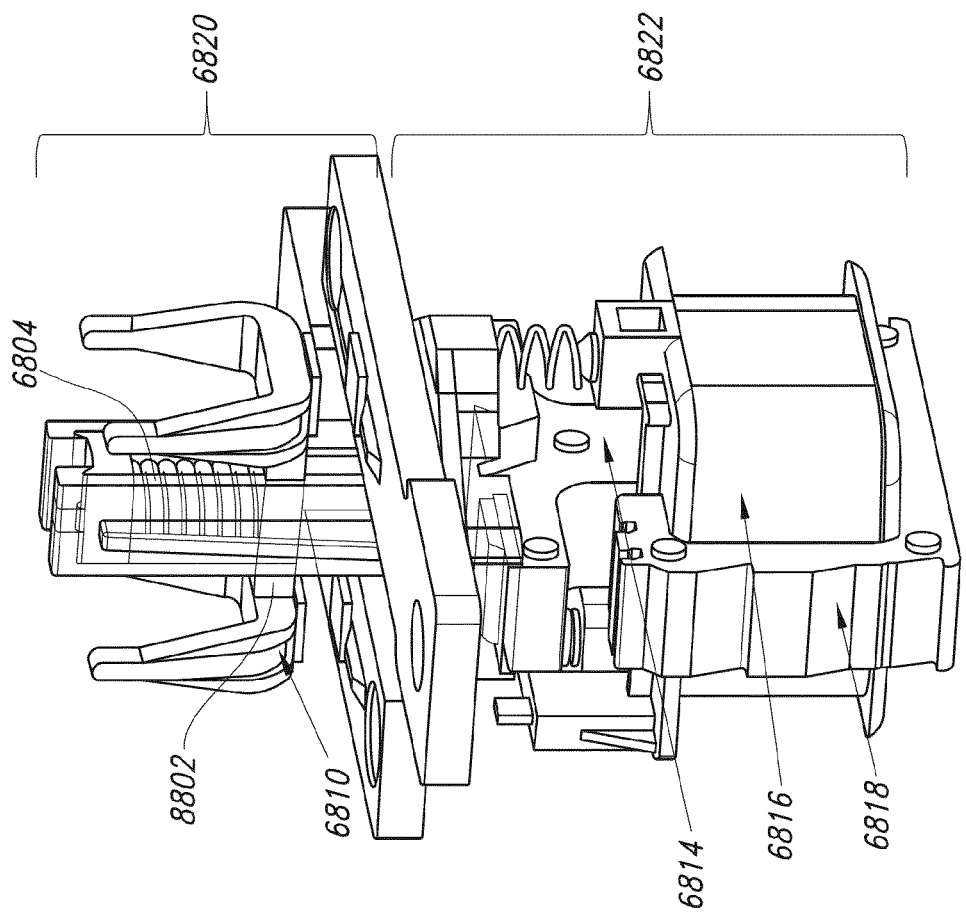
FIG. 42 depicts an embodiment detail of a breaker/relay component.

Referencing FIG. 42, an example breaker/relay is depicted with portions of the housing removed for illustration. The example breaker/relay includes two moveable contacts engaging two fixed contacts. In the example of FIG. 42, the moveable contacts are coupled and operated by the same armature 6814, with contact force provided by the contact spring 6804. In the example of FIG. 42, the contacts are electrically coupled through a bus bar 8802. In the example, the bus bar 8802 transitions directly between the contacts, and is not significantly exposed to the current carrying portion of the bus bar including the fixed contacts. In certain embodiments, the bus bar 8802 can include a trajectory that exposes a portion of the bus bar 8802 into proximity with the current carrying member of the fixed contacts, thereby contributing to the Lorentz force that provides the physical disconnect of the breaker/relay. In certain embodiments, both of the area of the bus bar 8802 exposed to the fixed contact current carrying portion, and the proximity of the bus bar 8802 to the fixed contact current carrying portion are design elements that allow for configuration of the Lorentz force response.

Figure 43:
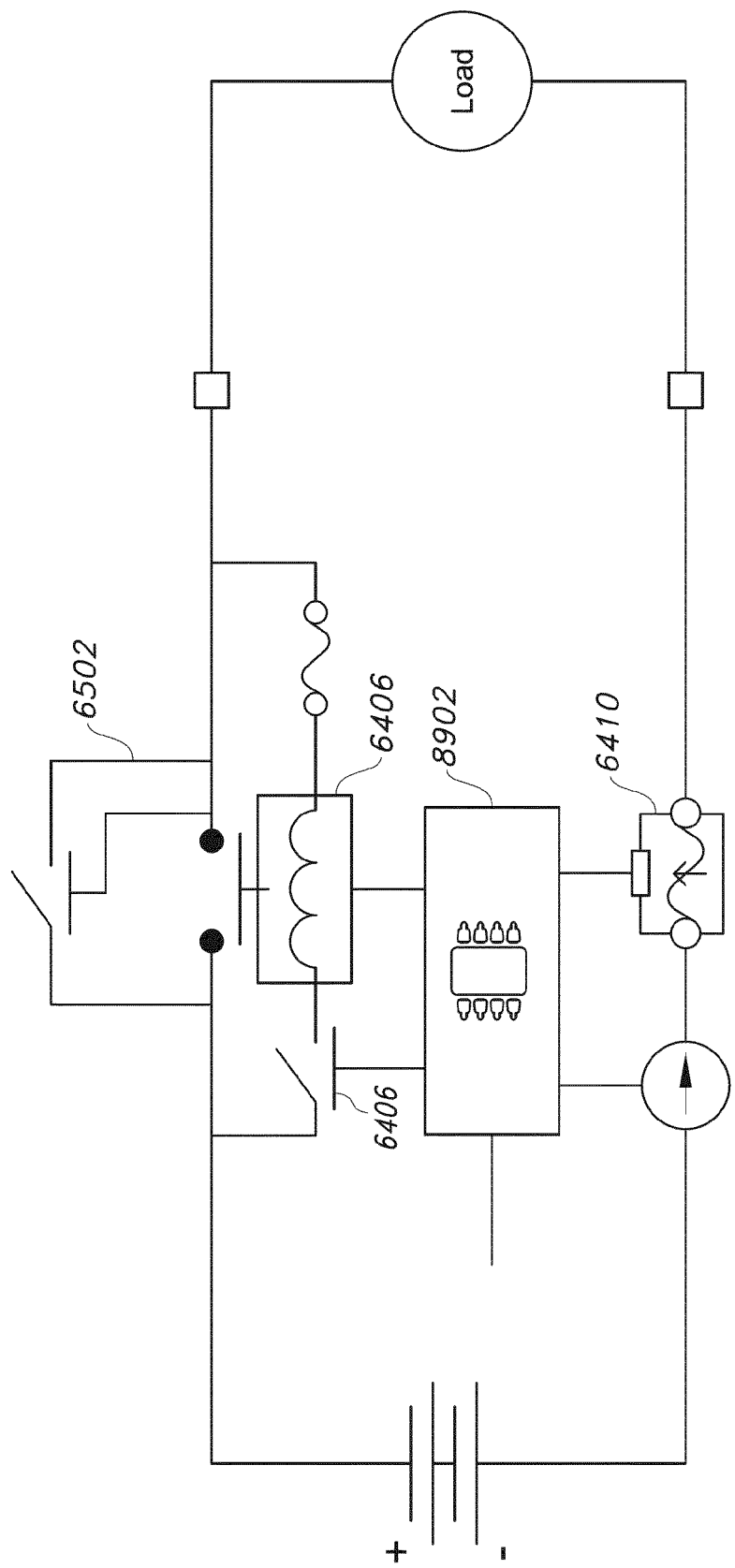
FIG. 43 depicts a schematic diagram of a power protection configuration with controller.

Referencing FIG. 43, an example power management arrangement for a mobile application is depicted. The example of FIG. 43 includes a breaker/relay 6502 disposed on the high side of the power circuit, and a pre-charge contactor, resistor, and fuse, coupled in parallel to the high side breaker/relay 6502. In the example of FIG. 43, the breaker/relay 6502 is a dual pole breaker/relay 6502, for example to provide additional current capability through the contacts for the power circuit. In the example of FIG. 43, a controller 8902 is depicted that performs control functions for the breaker/relay 6502 and for the power management arrangement. For example, the controller 8902 receives a keyswitch input, performs pre-charge operations, operates the closing of the breaker/relay, and responds to a high current event by opening the contacts of the breaker/relay. In another example, the controller 8902 performs shutdown operations of the power management arrangement, such as opening the breaker/relay after the keyswitch is off, or in response to an auxiliary, emergency, or other input requesting that power be disconnected.

Further referencing FIG. 43, an example power distribution management for a mobile application is depicted schematically, which may be utilized in whole or part with any other systems or aspects of the present disclosure. An example power distribution management system includes a dual pole breaker/relay—the example of FIG. 43 includes a dual pole breaker/relay (e.g., using one set of contacts per pole) having a single magnetic drive (e.g., a magnetic actuator). In certain embodiments, both contacts are mechanically linked such that they open or close together (e.g., operating as a dual pole single throw contactor). In certain embodiments, the contactors may share one or more arc suppression aspects (e.g., splitter plates and/or permanent magnet), and/or may have individual arc suppression aspects. In certain embodiments, arc suppression aspects may be partially shared (e.g., some splitter plates in proximity to both contacts) and/or partially individual (e.g., some splitter plates in proximity to only one or the other of the contacts). In certain embodiments, various features of the contactors may be shared and other features of the contactors individually supplied—such as control commands or actuation (e.g., a dual pole, dual throw arrangement), arc suppression aspects, and/or housings. The example of FIG. 43 additionally depicts a separate contactor (e.g., the lower left of the three (3) depicted contacts) which is separately controllable to provide contact management for a pre-charge circuit for the power distribution management system. In certain embodiments, the pre-charge contactor may be integrated with the dual pole contacts—for example within a same housing as the dual pole contacts and/or with pre-charge coupling provided as one of the dual pole contacts. The example of FIG. 43 depicts a fuse on the pre-charge circuit, and a further overall fuse on a battery low side. The presence of fuses depicted is optional and non-limiting, and fuses may be present in other locations, omitted, and/or replaced (e.g., by a breaker/relay as described throughout the present disclosure, and/or as a pole on a dual pole or multi-pole breaker/relay). In certain embodiments, a pre-charge circuit may be contained within a power distribution unit separate from the breaker/relay and/or containing the breaker/relay, as a solid state pre-charge circuit, and/or as a mechanical/electrical circuit positioned elsewhere in the system and/or within the breaker/relay housing.

The electrical arrangement of poles in FIG. 43 is a schematic example, and not limiting to arrangements of the system for particular embodiments. In certain embodiments, each pole of the dual pole breaker/relay (and/or each pole or a subset of poles in a multi pole breaker/relay) may provide selectable electrical coupling for a same circuit, for separate circuits, and/or for a selected circuit (e.g., using controllable switches or connectors elsewhere in the system—not depicted). In certain embodiments, the power distribution management system further includes a high resolution current sensor, and/or current sensing on more than one pole of the dual pole or multi pole breaker/relay. In certain embodiments, a controller is communicatively coupled to the one or more high resolution current sensors, and utilizes the one or more high resolution current sensors for any operations described throughout the present disclosure (e.g., to command one or more of the contacts to an open position to avoid re-contact after opening) and/or to communicate information determined from the current sensor (e.g., the electrical current, or other information derived therefrom) to another controller in the system such as a vehicle controller. In certain embodiments, each contactor of the dual pole or multi-pole breaker/relay includes an arrangement configured to open the contact with a Lorentz force response due to high current through the circuit of the contactor as described throughout the present disclosure. In certain embodiments, one contact has an arrangement to open with a Lorentz force response, and the other contactor opens due to mechanical linkage to the responding contactor. In certain embodiments, each contact has an arrangement to open with a Lorentz force response, for example to provide circuit protection redundancy. In certain embodiments, each contact has an arrangement to open with a Lorentz force response, where each contact has a separate configured threshold for opening response, and/or where each contact is separably controllable (e.g., with a separate magnetic actuator or other controlled actuator).

Figure 44:
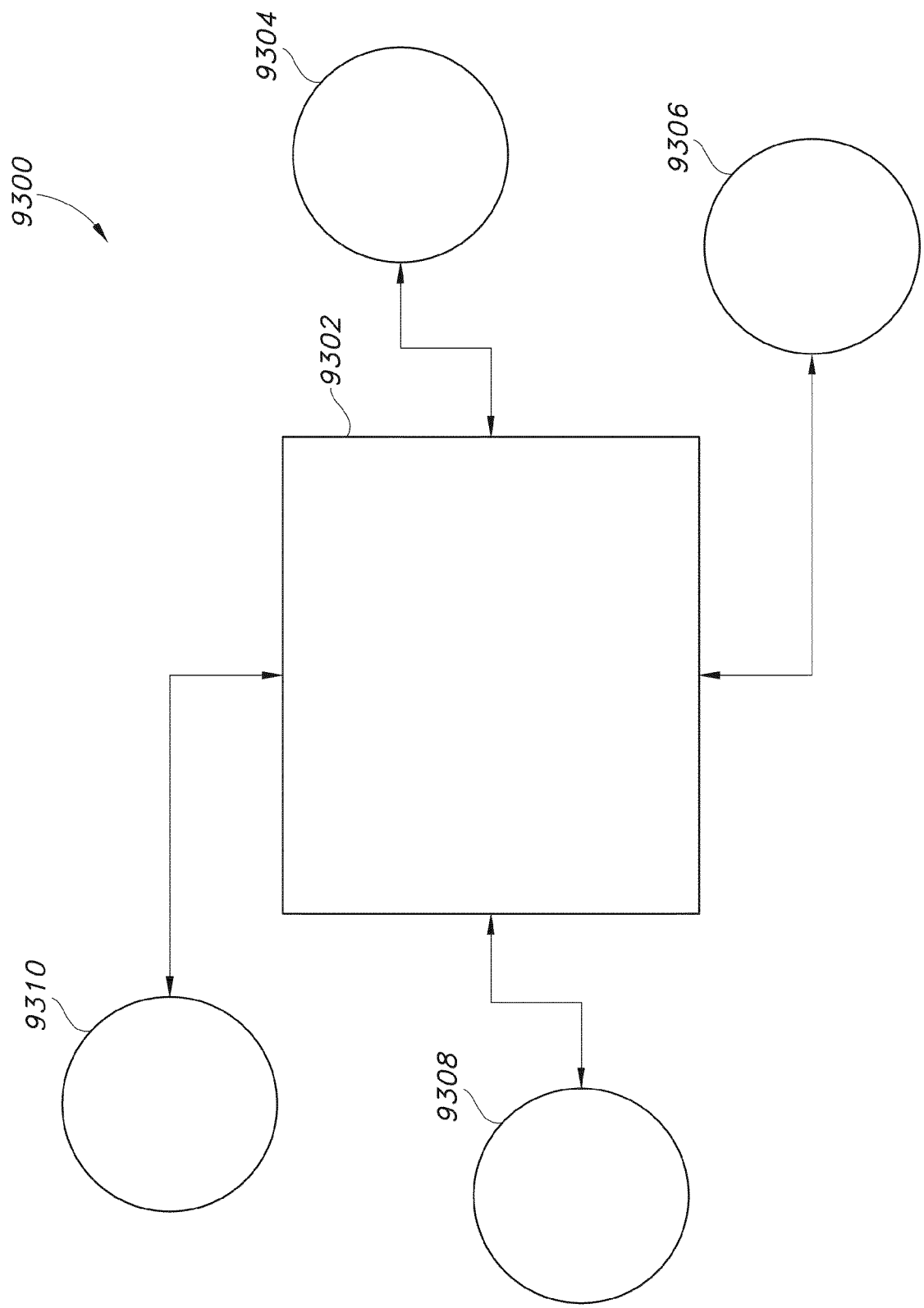
FIG. 44 depicts an embodiment functional diagram of a breaker/relay.

Referencing FIG. 44, an example breaker/relay 9302 is schematically depicted in a context 9300. The example context 9300 includes a regulatory interface 9304, for example including legal or industry regulations, policies, or other enforceable frameworks for which the breaker/relay 9302 is responsible to maintain certain performance characteristics. The example regulatory interface 9304 may be physically manifested during run-time operations of an application having the breaker/relay 9302 thereon—for example as a network communication, calibrated value for a response, selection of a sizing of a component of the breaker/relay 9302 or the like, and/or the regulatory interface 9304 may represent one or more design time considerations made during the selection, installation, repair, maintenance, and/or replacement of a breaker/relay 9302 that are not physically manifested during run-time operations of the application having the breaker/relay 9302 thereon.

The example context 9300 further includes a command and/or control interface 9306, which may include signals, voltages, electrical couplings, and/or network couplings over which commanded functions (e.g., connector open or closed commands) are received by the breaker/relay 9302. In certain embodiments, the breaker/relay 9302 includes only electromechanical components—for example where the breaker/relay 9302 does not include a microprocessor, controller, printed circuit board, or other "intelligent" features. In certain embodiments, the breaker/relay 9302 includes some functions controller locally on the breaker/relay 9302, and other functions controller elsewhere on an application having the breaker/relay 9302 thereon—for example on a battery management system controller, vehicle controller, power electronics controller, and/or having aspects distributed across one or more controllers. In certain embodiments, certain command or control aspects are provided as physical or electrical commands, and other command or control aspects are provided as communicative elements (e.g., data-link or network commands) and/or as intelligent aspects of the breaker/relay 9302 determined in accordance with programmed logic in response to detected or otherwise determined parameters during run-time operations.

The example context 9300 further includes an environmental interface 9308, such as the vibration, temperature events, shock, and other environmental parameters experienced by the breaker/relay 9302. Aspects of the environmental interface 9308 may be physically manifested in the breaker/relay 9302, for example through material design selections, sizing and location of parts, connector selections, active or passive cooling selections, and the like. Additionally or alternatively, the planned or experienced duty cycle, power throughput, or the like may be a part of the environmental interface 9308 of the breaker/relay 9302.

The example context 9300 further includes a high voltage interface 9310, for example a coupling to the high voltage battery of a system, to system loads, to a charger, or the like. In certain embodiments, the high voltage interface 9310 is physically manifested on the breaker/relay 9302, for example with voltage ratings, sizes of components, ratings of current sensors (where present), material selections, and the like. Any example features of a breaker/relay as described throughout the present disclosure may be included herein for an example breaker/relay 9302, including without limitation arc extinguishing features, contactor design elements, connector contact force affecting aspects, and the like. Any aspects of the context 9300 may be included or omitted, and the described aspects of the context 9300 are not limiting to the contemplated context 9300 of a particular breaker/relay 9302. Additionally, it will be understood that the organization of context 9300 aspects is an example for clarity of description, but that particular aspects 9304, 9306, 9308, 9310 may be omitted, separated, and/or present on other aspects 9304, 9306, 9308, 9310 in certain embodiments. For example, a voltage limit, time limit for response, etc. may be understood to originate from a regulatory interface 9304 in one embodiment, from a command/control interface 9306 in another embodiment, and from both interfaces 9304, 9306 in yet another embodiment.

Figure 45:
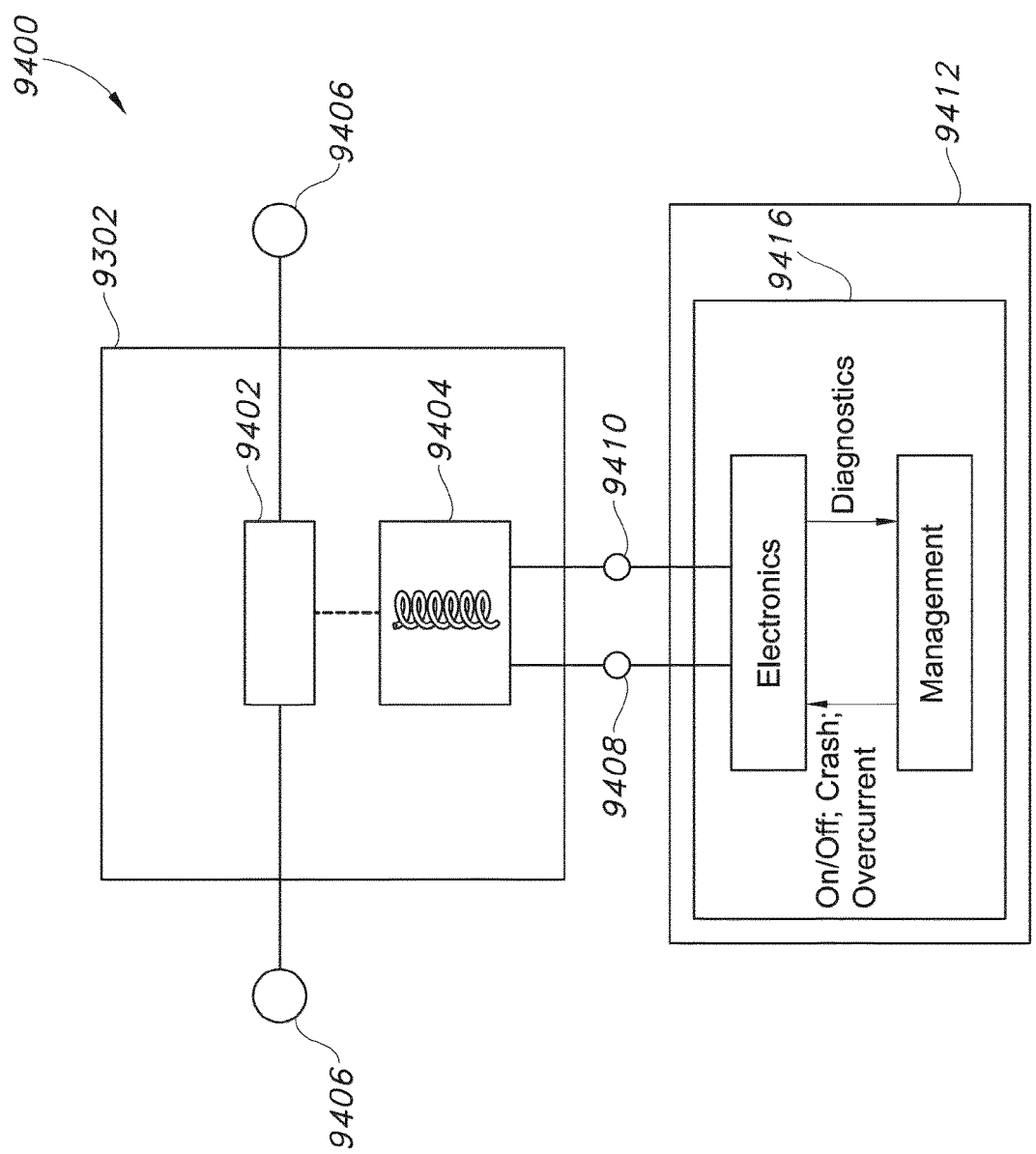
FIG. 45 depicts an embodiment schematic diagram of a breaker/relay.
Figure 47:
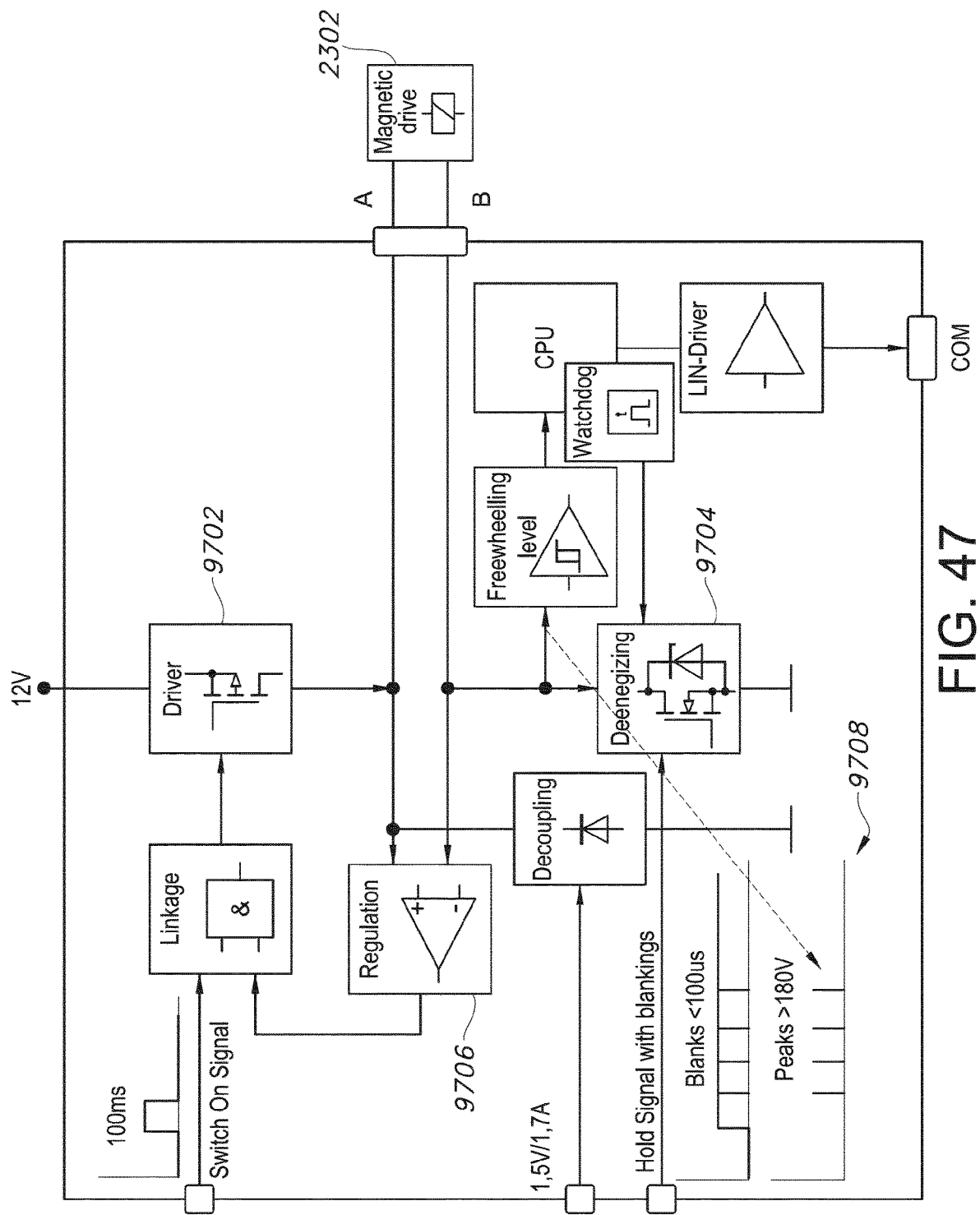
FIG. 47 depicts an embodiment schematic diagram of breaker/relay operations.

Referencing FIG. 45, an example breaker/relay architecture 9400 is depicted. The example breaker/relay 9302 includes all electronic control functions positioned away from the breaker/relay 9302, with only electro-mechanical hardware remaining on the breaker/relay 9302. The example breaker/relay 9302 includes a contactor 9402 movably operated by a coil 9404, for example a high voltage contactor that is normally open or normally closed, and wherein power to the coil 9404 provides for opening or closing force to the contactor 9402. In certain embodiments, the contactor 9402 is normally open, and power to the coil 9404 closes the contactor 9402. The example architecture 9400 further includes a high voltage circuit 9406 switched by the contactor 9402, and a pair of input signals—for example an A input 9408 and a B input 9410, although any number and type of input signal is contemplated herein. An example system is depicted in FIG. 47 showing example operations of the Electronics to control the example breaker/relay 9302 (Magnetic drive 2302 in the depiction of FIG. 47). The example architecture 9400 further includes an external controller 9412, for example a battery management controller, vehicle controller, or other controller present on an application, the external controller 9412 including the Electronics portion and a Management portion. For the example architecture 9400, the Electronics portion schematically depicts a controller configured to manage direct opening and closing control of the breaker/relay 9302 and to communicate diagnostic information about the breaker/relay 9302. The Management portion schematically depicts the sourcing of external commands to the breaker/relay 9302, for example to command the breaker/relay 9302 on or off, to implement an over-current shutdown, and/or to implement an auxiliary or safety shutdown (e.g., a crash signal, service event signal, or the like). The Electronics and Management portions are depicted in an arrangement for clarity of description, but it is understood that aspects of the Electronics and Management portions may be distributed throughout a system, and/or portions of the Electronics may be positioned on a breaker/relay 9302.

Figure 46:
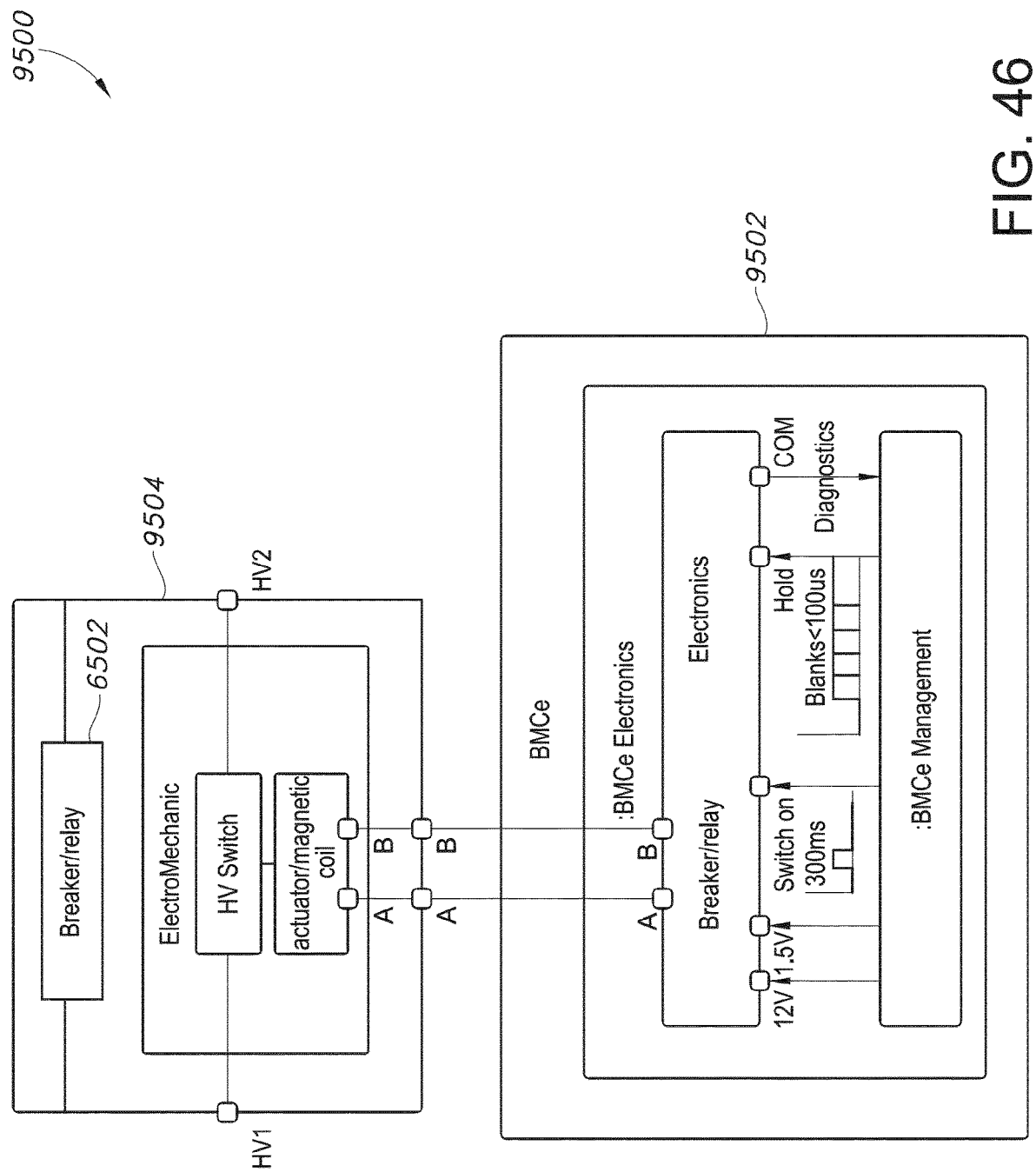
FIG. 46 depicts an embodiment schematic diagram of a breaker/relay configuration showing certain voltage, amperage, and time-based values.

Referencing FIG. 46, an example system 9500 is depicted showing certain voltage, amperage, and time-based values for an example system. The example system 9500 includes a switch on signal having certain electrical characteristics and a hold signal having certain electrical characteristics, which are non-limiting examples. The example system 9500 is consistent with certain embodiments of the architecture 9400 depicted in FIG. 45. An example breaker/relay consistent with certain embodiments of the system of FIG. 46 is responsive to an 8.2V switch-on voltage, a holding voltage of 1.5V, and includes a 3 Ohm resistance in the actuating coil.

Referencing FIG. 47, operations of an example Electronics portion of an architecture 9400 such as that depicted in FIG. 45 are shown for purposes of illustration. It will be understood that components of a system such as in FIG. 47 may be implemented in hardware, software, logic circuits, and/or may be combined or distributed about a system. The example Electronics include a Switch On response, with a 12 V control voltage applied to the module. The actual drive coil of the breaker/relay can be switched to the control voltage via a deenergizing circuit and driver. The switch-on driver 9702 is controlled at approximately 65% of the minimum nominal voltage (e.g., rated value <70% or 8.2 V) for 100 ms. The timing, voltage, and switching logic of Switch On operations are non-limiting examples. During Switch On operations, the drive coil is energized with the pull-in current, so that the drive can switch on.

An example Electronics includes a Regulation response. An example Regulation response includes linearly regulating the voltages during the Switch On process, for example using a control circuit (Regulation) and Linkage for the duration of the switch-on process (e.g., 100 ms) thereby applying a selected actuating voltage to the drive coil.

An example Electronics includes a Hold response. The example Hold response includes disabling the Driver after the Switch-on time period, and providing the drive coil with a hold signal (e.g., 1.5 V) that remains on constantly, and/or constantly with diagnostic interruptions (e.g., see schematic voltage graph 9708).

In certain embodiments, the deenergizing transistor is checked at selected intervals (e.g., depending upon the Fault Tolerant Time Interval, a regulatory or policy interval, and/or an interval of interest). If the deenergizing transistor is defective (e.g., if it is permanently conductive), the breaker/relay will be reliant on turning off the 1.5V supply to de-energize the magnetic drive. While the system can still be turned off, the operations with a defective deenergizing relay may be slower than anticipated, and/or too slow for the breaker/relay to be compliant. In certain embodiments, the frequent blanking pulses (or diagnostic interruptions) lead to cut-off voltage peaks at the coil connection (Freewheeling level, approx. 180V in the example system). If the voltage peaks remain off, the deenergizing transistor can be diagnosed as defective. In certain embodiments, the blanking pulses are kept short, thereby keeping the energy in the freewheeling circuit low, reducing waste energy and heating, and also keeping the holding energy low to reduce noise emissions. In certain embodiments, 100 micro-second blanking pulses are sufficient. In certain embodiments, faster or slower blanking pulses may be utilized. In certain embodiments, diagnostics of the deenergizing relay and/or system responses (e.g., a more conservative shut-off to account for slower response) may be utilized, in the Electronics, the Management, or elsewhere in the system.

An example Electronics includes a Switch-off and/or deenergizing response. In the example, turning off the 1.5V holding voltage deactivates the deenergizing circuit above a trigger voltage of about 4.5V (nominal <50%*Urated=6V).

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The programmed methods and/or instructions described herein may be deployed in part or in whole through a machine that executes computer instructions on a computer-readable media, program codes, and/or instructions on a processor or processors. "Processor" used herein is synonymous with the plural "processors" and the two terms may be used interchangeably unless context clearly indicates otherwise. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, Internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The computer readable instructions may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of a program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, LTE, EVDO, mesh, or other networks types.

The methods, programs, codes, and instructions described herein and elsewhere may be implemented on or through mobile devices. The mobile devices may include navigation devices, vehicle remote network access devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM, and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer instructions, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in procedure descriptions, methods, flow charts, and block diagrams imply logical boundaries between the elements. However, any operations described herein may be divided in whole or part, combined in whole or part, re-ordered in whole or part, and/or have certain operations omitted in certain embodiments. As such, the depiction and/or description of an order for various steps should not be understood to require a particular order of execution for those steps, unless required by a particular application, or explicitly stated or otherwise clear from the context. Operations described herein may be implemented by a computing device having access to computer executable instructions stored on a computer readable media, wherein the computing device executing the instructions thereby performs one or more aspects of the described operations herein. Additionally or alternatively, operations described herein may be performed by hardware arrangements, logic circuits, and/or electrical devices configured to perform one or more aspects of operations described herein. Examples of certain computing devices may include, but may not be limited to, one or more controllers positioned on or associated with a vehicle, engine, transmission, and/or PTO device system, personal digital assistants, laptops, personal computers, mobile phones, other handheld computing devices, wired or wireless communication devices, transducers, chips, calculators, satellites, tablet PCs, electronic books, gadgets, electronic devices, devices having artificial intelligence, networking equipment, servers, routers, and the like. Thus, while the foregoing drawings and descriptions set forth functional aspects of the disclosed systems, the descriptions herein are not limited to a particular arrangement of computer instructions, hardware devices, logic circuits, or the like for implementing operations, procedures, or methods described herein, unless explicitly stated or otherwise clear from the context.

The methods and/or processes described above, and steps thereof, may be realized in hardware, instructions stored on a computer readable medium, or any combination thereof for a particular application. The hardware may include a general-purpose computer, a dedicated computing device or specific computing device, a logic circuit, a hardware arrangement configured to perform described operations, a sensor of any type, and/or an actuator of any type. Aspects of a process executed on a computing device may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine-readable medium.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the methods and systems described herein have been disclosed in connection with certain example embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

The invention claimed is:

1. An apparatus comprising:
  a threshold switch coupled to a bidirectional current sensor system for an electronic switch, wherein the threshold switch has a first shutdown threshold value associated with a first current flow direction and a second shutdown threshold value associated with a second current flow direction; and a de-energizing circuit for a magnetic drive coil that operates the electronic switch, wherein the de-energizing circuit is coupled to an output of the threshold switch, wherein the de-energizing circuit is configured to apply a switch-off pulse to remove the current from the magnetic drive coil in response to the output of the threshold switch when the bidirectional current sensor system senses a current greater than or equal to a selected threshold value among the first and second shutdown threshold values.

2. The apparatus of claim 1, wherein the threshold switch comprises two comparators.

3. The apparatus of claim 2, wherein each of the first and second shutdown threshold values comprises a bidirectionally adjustable current disconnection threshold value for an input side of the two comparators.

4. The apparatus of claim 1, wherein one or more of the first and second shutdown threshold values corresponds to a short circuit current value.

5. The apparatus of claim 4, further comprising a voltage divider electrically coupled to the threshold switch, the voltage divider providing reference values for the first and second shutdown threshold values.

6. The apparatus of claim 5, wherein the voltage divider comprises at least one component selected from the components consisting of: fixed ohmic resistances, adjustable ohmic resistances, a variably adjustable potentiometer arrangement, or a Zener diode circuit.

7. The apparatus of claim 1, further comprising the bidirectional current sensor system.

8. The apparatus of claim 7, wherein the bidirectional current sensor system comprises bipolar Hall sensors.

9. The apparatus of claim 1, wherein the de-energizing circuit is further configured to apply a high freewheeling counter voltage to remove the current from the magnetic drive coil.

10. The apparatus of claim 9, wherein the de-energizing circuit comprises a flyback diode for applying the high freewheeling counter voltage.

11. The apparatus of claim 1, wherein the electronic switch comprises a direct current (DC) switch.

12. The apparatus of claim 1, further comprising the electronic switch, wherein the electronic switch is electrically coupled to a power bus.

13. The apparatus of claim 1, wherein the electronic switch is a contact in a breaker/relay.

14. The apparatus of claim 1, further comprising:
a breaker/relay comprising:
 a fixed contact electrically coupled to a power bus;
 the electronic switch as a movable contact selectively electrically coupled to the fixed contact;
 an armature coupled to the movable contact, the armature being configured to be moved into contact with the fixed contact to allow current flow through the power bus;
 a relay comprising a coil and a magnet core, the coil being configured to actuate the relay, such that the armature is pulled to the magnet core when the coil is energized; and
 a breaker comprising a plurality of splitter plates in proximity to a body of the breaker; and
a permanent magnet system surrounding one or more of: the plurality of splitter plates, and an arcing path between a contact gap and the plurality of splitter plates,
 wherein, during engagement or disengagement of the movable contact when the power bus is energized, the body of the breaker/relay is configured to cooperate with the splitter plates, using magnetic fields provided by the permanent magnet system, to dissipate an arc.

15. Control electronics for a DC switching device, comprising:
a bidirectional current sensor system for a power bus;
a threshold switch comprising two comparators, each of the two comparators receiving an output of the bidirectional current sensor system, wherein the threshold switch has a first shutdown threshold value associated with a first current flow direction and a second shutdown threshold value associated with a second current flow direction;
a voltage divider electrically coupled to the threshold switch, the voltage divider providing reference values to the two comparators for the first and second shutdown threshold values; and
a de-energization circuit for a magnetic drive coil that operates the DC switching device, wherein the de-energizing circuit is coupled to receive an output of the threshold switch such that the de-energizing circuit is configured to apply a switch-off pulse to remove the current from the magnetic drive coil when the bidirectional current sensor system senses a current greater than or equal to a selected threshold value among the first and second shutdown threshold values.

16. A system comprising:
a fixed contact electrically coupled to a power bus;
a movable contact selectively electrically coupled to the fixed contact;
an armature coupled to the movable contact, the armature being configured to be moved into contact with the fixed contact to allow current flow through the power bus;
a relay comprising a coil and a magnet core, the coil being configured to actuate the relay, such that the armature is pulled to the magnet core when the coil is energized;
a breaker comprising a plurality of splitter plates in proximity to a body of the breaker; and a permanent magnet system surrounding one or more of: the plurality of splitter plates, and an arcing path between a contact gap and the plurality of splitter plates, wherein, during engagement or disengagement of the movable contact when the power bus is energized, the body of the breaker is configured to cooperate with the splitter plates, using magnetic fields provided by the permanent magnet system, to dissipate an arc;
a bidirectional current sensor system for detecting current on the power bus;
a threshold switch coupled to the bidirectional current sensor system, wherein the threshold switch has a first shutdown threshold value associated with a first current flow direction and a second shutdown threshold value associated with a second current flow direction; and
a de-energizing circuit for a magnetic drive coil that operates the movable contact,
wherein the threshold switch comprises two comparators, each of the two comparators receiving an output of the bidirectional current sensor system and a reference value for the first and second shutdown threshold values from a voltage divider electrically coupled to the threshold switch,
wherein the de-energizing circuit is coupled to receive an output of the threshold switch such that the de-energizing circuit is configured to apply a switch-off pulse to remove the current from the magnetic drive coil when the bidirectional current sensor system senses a current greater than or equal to a selected threshold value among the first and second shutdown threshold values.

* * * * *